United States Patent
Nara et al.

(10) Patent No.: US 12,136,402 B2
(45) Date of Patent: Nov. 5, 2024

(54) IMAGE PROCESSING DEVICE, IMAGE DISPLAY DEVICE, AND IMAGE PROCESSING METHOD

(71) Applicant: SHARP KABUSHIKI KAISHA, Sakai (JP)

(72) Inventors: Tomoyuki Nara, Sakai (JP); Naoko Goto, Sakai (JP); Tatsunori Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/242,141

(22) Filed: Sep. 5, 2023

(65) Prior Publication Data

US 2024/0096296 A1    Mar. 21, 2024

(30) Foreign Application Priority Data

Sep. 16, 2022    (JP) ................. 2022-147489

(51) Int. Cl.
  *G09G 3/36*     (2006.01)
  *G02F 1/1333*   (2006.01)
  *G02F 1/13357*  (2006.01)

(52) U.S. Cl.
  CPC ..... *G09G 3/3644* (2013.01); *G02F 1/133606* (2013.01); *G02F 1/13336* (2013.01); *G02F 1/133617* (2013.01); *G09G 2300/023* (2013.01); *G09G 2300/0465* (2013.01); *G09G 2320/066* (2013.01)

(58) Field of Classification Search
  CPC .. G09G 3/3648; G09G 3/3666; G09G 3/3406; G09G 3/3426; G09G 3/342; G09G 2320/0233; G09G 2320/0646; G09G 2300/023; G09G 3/3644; G09G 2320/066; G02F 1/133606
  See application file for complete search history.

(56) References Cited

U.S. PATENT DOCUMENTS

| | | | |
|---|---|---|---|
| 10,451,936 B1* | 10/2019 | Montgomery | G02F 1/134309 |
| 11,094,270 B2* | 8/2021 | Gao | G09G 3/3611 |
| 2022/0114983 A1* | 4/2022 | Lee | G09G 3/3696 |
| 2022/0283466 A1* | 9/2022 | Xi | G02F 1/133607 |

FOREIGN PATENT DOCUMENTS

WO    2008053724 A1    5/2008

* cited by examiner

*Primary Examiner* — Xuemei Zheng
(74) *Attorney, Agent, or Firm* — ScienBiziP, P.C.

(57) ABSTRACT

Image processing device comprises a maximum luminance setting unit that associates a maximum luminance value included in a corresponding area of a luminance image with each of a plurality of areas obtained by classifying a display area of a second liquid crystal panel into multiple areas to include an overlapping area overlapping a plurality of first pixels of a first liquid crystal panel for one pixel, an order setting unit that sets the order of the plurality of areas in descending order of maximum luminance values, and a transmittance setting unit that sets the transmittance of the pixel of interest based on the maximum luminance value are provided. The transmittance setting unit sets the transmittance of the pixel of interest based on a transmittance coefficient indicating a proportion at which each of the plurality of first pixels overlapping the overlapping area influences the overlapping area with transmitted light.

11 Claims, 34 Drawing Sheets

PX2(x,y) 57

| | x=0 | x=1 | x=2 | x=3 | x=4 |
|---|---|---|---|---|---|
| y=0 | 100.0% | 100.0% | 95.1% | 90.1% | 90.1% |
| y=1 | 100.0% | 100.0% | 95.1% | 90.1% | 90.1% |
| y=2 | 70.3% | 70.3% | 60.4% | 50.5% | 50.5% |
| y=3 | 40.6% | 40.6% | 25.8% | 10.9% | 10.9% |
| y=4 | 40.6% | 40.6% | 25.8% | 10.9% | 10.9% |

| | x=0 | x=1 | x=2 | x=3 | x=4 |
|---|---|---|---|---|---|
| y=0 | 1.00 | 0.00 | 0.00 | 0.00 | 0.00 |
| y=1 | 0.00 | 0.00 | 0.00 | 0.00 | 1.00 |
| y=2 | 1.00 | 0.00 | 0.99 | 0.00 | 0.00 |
| y=3 | 0.00 | 0.00 | 0.00 | 0.00 | 0.00 |
| y=4 | 0.00 | 0.00 | 0.00 | 0.00 | 0.00 |

| | x=0 | x=1 | x=2 | x=3 | x=4 |
|---|---|---|---|---|---|
| y=0 | 100.0% | 100.0% | 95.1% | 90.1% | 90.1% |
| y=1 | 100.0% | 100.0% | 95.1% | 90.1% | 90.1% |
| y=2 | 85.2% | 85.2% | 80.2% | 75.3% | 75.3% |
| y=3 | 70.3% | 70.3% | 65.4% | 60.4% | 60.4% |
| y=4 | 70.3% | 70.3% | 65.4% | 60.4% | 60.4% |

| | x=0 | x=1 | x=2 | x=3 | x=4 |
|---|---|---|---|---|---|
| y=0 | 1.00 | 0.00 | 0.00 | 0.00 | 0.00 |
| y=1 | 0.00 | 0.00 | 0.00 | 0.00 | 1.00 |
| y=2 | 0.82 | 0.00 | 0.75 | 0.00 | 0.00 |
| y=3 | 0.00 | 0.00 | 0.00 | 0.00 | 0.00 |
| y=4 | 0.00 | 0.00 | 0.00 | 0.00 | 0.00 |

| | x=0 | x=1 | x=2 | x=3 | x=4 |
|---|---|---|---|---|---|
| y=0 | 100.0% | 1% | 1% | 1% | 1% |
| y=1 | 1% | 1% | 1% | 1% | 100% |
| y=2 | 82% | 1% | 75% | 1% | 1% |
| y=3 | 1% | 1% | 1% | 1% | 1% |
| y=4 | 1% | 1% | 1% | 1% | 1% |

| | x=0 | x=1 | x=2 | x=3 | x=4 |
|---|---|---|---|---|---|
| y=0 | 1000.0 | 10.0 | 9.5 | 9.0 | 9.0 |
| y=1 | 10.0 | 10.0 | 9.5 | 9.0 | 900.0 |
| y=2 | 701.5 | 8.5 | 602.0 | 7.5 | 7.5 |
| y=3 | 7.0 | 7.0 | 6.5 | 6.0 | 6.0 |
| y=4 | 7.0 | 7.0 | 6.5 | 6.0 | 6.0 |

| | x=0 | x=1 | x=2 | x=3 | x=4 |
|---|---|---|---|---|---|
| y=0 | 1000.0 | 10.0 | 9.5 | 9.0 | 9.0 |
| y=1 | 10.0 | 10.0 | 9.5 | 9.0 | 900.0 |
| y=2 | 700.0 | 8.5 | 600.0 | 5.1 | 5.1 |
| y=3 | 4.1 | 4.1 | 2.6 | 1.1 | 1.1 |
| y=4 | 4.1 | 4.1 | 2.6 | 1.1 | 1.1 |

FIG. 29

| | x=0 | x=1 | x=2 | x=3 | x=4 |
|---|---|---|---|---|---|
| y=0 | 100.0% | 100.0% | 100.0% | 100.0% | 100.0% |
| y=1 | 100.0% | 100.0% | 100.0% | 100.0% | 100.0% |
| y=2 | 100.0% | 83% | 100.0% | 67% | 67% |
| y=3 | 58% | 58% | 39% | 18% | 18% |
| y=4 | 58% | 58% | 39% | 18% | 18% |

| | x=0 | x=1 | x=2 | x=3 | x=4 |
|---|---|---|---|---|---|
| y=0 | 1.0 | 0.9 | 0.8 | 0.9 | 0.9 |
| y=1 | 0.9 | 0.8 | 0.8 | 0.8 | 1.0 |
| y=2 | 0.7 | 0.7 | 0.7 | 0.7 | 0.8 |
| y=3 | 0.5 | 0.5 | 0.5 | 0.5 | 0.6 |
| y=4 | 0.3 | 0.3 | 0.2 | 0.2 | 0.4 |

FIG. 36

LPX2(x,y)                               LIMB

| | x=0 | x=1 | x=2 | x=3 | x=4 |
|---|---|---|---|---|---|
| y=0 | 1 | 0 | 0 | 0 | 0 |
| y=1 | 0 | 0 | 0 | 0 | 0.9 |
| y=2 | 1 | 0 | 0.857 | 0 | 0 |
| y=3 | 0 | 0 | 0 | 0 | 0 |
| y=4 | 0 | 0 | 0 | 0 | 0 |

FIG. 37

| ORDER | MAXIMUM LUMINANCE VALUE | x | y | AREA |
|---|---|---|---|---|
| 1 | 1 | 0 | 0 | FIRST AREA |
| 2 | 0.9 | 1 | 1 | FIFTH AREA |
| 3 | 0.6 | 1 | 0 | SECOND AREA |
| 4 | 0.5 | 2 | 2 | NINTH AREA |
| 5 | 0 | 2 | 0 | THIRD AREA |
| 6 | 0 | 0 | 1 | FOURTH AREA |
| 7 | 0 | 2 | 1 | SIXTH AREA |
| 8 | 0 | 0 | 2 | SEVENTH AREA |
| 9 | 0 | 1 | 2 | EIGHTH AREA |

|   | PX1a | PX1b | PX1c | PX1d |
|---|---|---|---|---|
|   | 1 | 1 | 0 |   |
| PX1f / PX1e | 1 | 1 | 0.867 |   | PX1g / PX1h |
| PX1j / PX1i |   | 0.867 | 0.867 | 0.378 | PX1k / PX1l |
|   |   |   | 0.378 | 0.378 |   |
|   | PX1m | PX1n | PX1o | PX1p |

FIG. 57

|   | PX1a | PX1b | PX1c | PX1d | 56 |
|---|---|---|---|---|---|
|   | 1 | 1 | 0 | 0 |   |
| PX1f / PX1e | 1 | 1 | 0.867 | 0 | PX1g / PX1h |
| PX1j / PX1i | 0 | 0.867 | 0.867 | 0.378 | PX1k / PX1l |
|   | 0 | 0 | 0.378 | 0.378 |   |
|   | PX1m | PX1n | PX1o | PX1p |

IMAGE PROCESSING DEVICE, IMAGE DISPLAY DEVICE, AND IMAGE PROCESSING METHOD

CROSS-REFERENCE TO RELATED APPLICATIONS

This application claims the benefit of priority to Japanese Patent Application Number 2022-147489 filed on Sep. 16, 2022. The entire contents of the above-identified application are hereby incorporated by reference.

BACKGROUND

Technical Field

The disclosure relates to an image processing device, an image display device, and an image processing method.

WO 2008/053724 discloses a liquid crystal display device in which, for the purpose of curbing a decrease in contrast caused by light leakage from a liquid crystal panel serving as a main panel, a light control panel that is an additional liquid crystal panel is provided between the aforementioned liquid crystal panel and a backlight. In addition, according to WO 2008/053724, a pixel of the light control panel is shaped in a shape that fits into an adjacent pixel. According to WO 2008/053724, having the above-described shape enables changes in luminance to be averaged and smoothed even if there is a large difference in luminance between adjacent pixels, and thus a luminance distribution becomes less visible in images, and spots caused by the difference in luminance between adjacent pixels of the light control panel become less noticeable, as compared to a case where the boundary between adjacent pixels is a straight line.

SUMMARY

In the liquid crystal display device according WO 2008/053724, some of a plurality of pixels of the main panel overlap the boundary between a plurality of adjacent pixels of the light control panel. For this reason, if a transmittance of each of the plurality of adjacent pixels of the light control panel overlapping with one pixel of the main panel is independently and individually determined, the transmittance of the plurality of adjacent pixels of the light control panel becomes too high, and thus a phenomenon called black floating in which a black image is displayed brighter than it should occurs. An aspect of the disclosure aims to provide an image processing device, an image display device, and an image processing method suppressing the occurrence of black floating.

An image processing device according to an aspect of the disclosure includes a storage unit that stores area classification information that is information obtained by classifying a display area for an image on a second liquid crystal panel into a plurality of areas including an overlapping area overlapping a plurality of first pixels for one pixel, the second liquid crystal panel being disposed facing a first liquid crystal panel directly or across an optical member, the first liquid crystal panel including a plurality of first pixels and facing a backlight, a luminance image generation unit that generates a luminance image representing a luminance value corresponding to each of a plurality of second pixels of the second liquid crystal panel based on an input image, a maximum luminance setting unit that sets a maximum luminance value that is the highest value among luminance values included in a corresponding area of the luminance image in association with each of the plurality of areas, an order setting unit configured to set an order of each of the plurality of areas in descending order of the maximum luminance values, and a transmittance setting unit that, when a first pixel for which a transmittance is to be set among the plurality of first pixels of the first liquid crystal panel is set as a pixel of interest, sets the transmittance of the pixel of interest based on the maximum luminance value associated with the overlapping area overlapping the pixel of interest in the order set for the overlapping area overlapping the pixel of interest among the plurality of areas, in which the transmittance setting unit sets the transmittance of the pixel of interest among the plurality of first pixels overlapping the overlapping area based on a transmittance coefficient indicating a proportion at which each of the plurality of first pixels overlapping the overlapping area influences the overlapping area with transmitted light.

An image processing device according to an aspect of the disclosure includes a storage unit that stores area classification information that is information obtained by classifying a display area for an image on a second liquid crystal panel into a plurality of areas including an overlapping area overlapping a plurality of first pixels for one pixel and a non-overlapping area overlapping only one first pixel for one pixel, the second liquid crystal panel being disposed facing a first liquid crystal panel directly or across an optical member, the first liquid crystal panel including a plurality of first pixels and facing a backlight, a maximum luminance setting unit that sets a maximum luminance value that is the highest value among luminance values included in a corresponding area of an input image in association with each of the plurality of areas, and a transmittance setting unit that, when a first pixel for which a transmittance is to be set among the plurality of first pixels of the first liquid crystal panel is set as a pixel of interest, sets the transmittance of the pixel of interest based on the maximum luminance value associated with the overlapping area overlapping the pixel of interest among the plurality of areas, in which when, among the plurality of first pixels, a first pixel to be focused on is set as a first pixel of interest and a first pixel adjacent to the first pixel of interest is set as an adjacent first pixel, among a plurality of second pixels, a second pixel included in a non-overlapping area overlapping only the first pixel of interest is set as a second pixel of interest and a second pixel included in the overlapping area overlapping only the first pixel of interest and the adjacent first pixel and adjacent to the second pixel of interest is set as an adjacent second pixel, among luminance values of an input image, a luminance value corresponding to the second pixel of interest is set to V1 (where V1>0), a luminance value corresponding to the adjacent second pixel is set to V2 (where V2<V1), and a luminance value corresponding to the second pixels other than the second pixel of interest and the adjacent second pixel is set to 0, and the transmittance setting unit sets a transmittance set for the first pixel of interest as $T_A$ and a transmittance set for the adjacent first pixel as $T_B$, the transmittance setting unit sets the transmittance of the first pixel of interest and the transmittance of the adjacent first pixel to satisfy $V2/V1 > T_B/T_A$.

An image processing method according to an aspect of the disclosure includes generating a luminance image representing a luminance value corresponding to each of a plurality of second pixels of a second liquid crystal panel based on an input image, the second liquid crystal panel being disposed facing a first liquid crystal panel directly or across an optical member, the first liquid crystal panel including a plurality of first pixels and facing a backlight, setting a maximum luminance value that is the highest value among luminance values included in a corresponding area of the luminance image in association with each of a plurality of areas classified based on area classification information that is information obtained by classifying a display area for an image on the second liquid crystal panel into a plurality of areas including an overlapping area overlapping a plurality of first pixels of the first liquid crystal panel for one pixel, setting an order of each of the plurality of areas in descending order of the maximum luminance values, and setting, when a first pixel for which a transmittance is to be set among the plurality of first pixels of the first liquid crystal panel is set as a pixel of interest, the transmittance of the pixel of interest based on the maximum luminance value associated with the overlapping area overlapping the pixel of interest in the order set for the overlapping area overlapping the pixel of interest among the plurality of areas, and setting the transmittance of the pixel of interest among the plurality of first pixels overlapping the overlapping area based on a transmittance coefficient indicating a proportion at which each of the plurality of first pixels overlapping the overlapping area influences the overlapping area with transmitted light.

BRIEF DESCRIPTION OF DRAWINGS

The disclosure will be described with reference to the accompanying drawings, wherein like numbers reference like elements.

FIG. 19 is a diagram illustrating a first luminance distribution according to the first embodiment.

FIG. 20 is a diagram illustrating a second liquid crystal panel display signal according to the first embodiment.

FIG. 25 is a diagram illustrating a first luminance distribution according to the comparative example.

FIG. 26 is a diagram illustrating a second liquid crystal panel display signal according to the comparative example.

FIG. 27 is a diagram showing percentages of light from a backlight transmitted through second pixels of the second liquid crystal panel according to the comparative example.

FIG. 28 is a diagram illustrating luminance of each second pixel of the second liquid crystal panel driven by an image processing device according to a comparative example.

FIG. 29 is a diagram illustrating luminance of each second pixel of the second liquid crystal panel driven by the image processing device according to the first embodiment.

FIG. 30 shows results of comparison between the luminance of each second pixel according to the comparative example shown in FIG. 28 and the luminance of each second pixel according to the first embodiment shown in FIG. 29.

FIG. 36 is a diagram illustrating a second luminance distribution according to the third embodiment.

FIG. 37 is a diagram illustrating a corrected luminance image according to the third embodiment.

FIG. 54 is a diagram illustrating a state in which a transmittance is set for second pixels of interest according to the fourth embodiment.

FIG. 55 is a diagram illustrating a state in which a transmittance is set for a third pixel of interest according to the fourth embodiment.

FIG. 56 is a diagram illustrating a state in which a transmittance is set for fourth pixels of interest according to the fourth embodiment.

FIG. 57 is a diagram illustrating a state in which a transmittance is set for fifth and subsequent pixels of interest according to the fourth embodiment.

FIG. 59 is a diagram illustrating a study target area in which luminance values are associated with each of a plurality of areas according to the fifth embodiment.

FIG. 60 is a diagram illustrating a first liquid crystal panel display signal according to the fifth embodiment.

DESCRIPTION OF EMBODIMENTS

Figure 1:
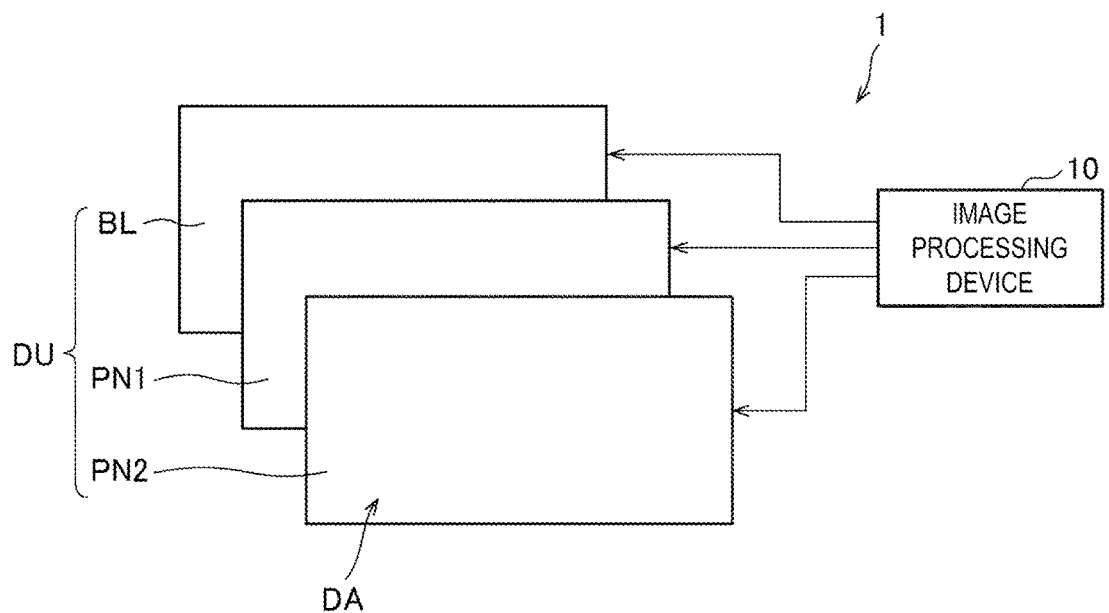
FIG. 1 is a diagram illustrating a schematic configuration of an image display device according to a first embodiment.

Embodiments of the disclosure will be described below with reference to the accompanying drawings. Note that, in the drawings, the same or equivalent elements are denoted by the same reference numerals and signs, and duplicating descriptions thereof will not be repeated.

First Embodiment

FIG. 1 is a diagram illustrating a schematic configuration of an image display device 1 according to a first embodiment. The image display device 1 includes a display unit DU and an image processing device 10 as illustrated in FIG. 1. The display unit DU includes a backlight BL, a first liquid crystal panel PN1, and a second liquid crystal panel PN2. The backlight BL, the first liquid crystal panel PN1, and the second liquid crystal panel PN2 are arranged in that order from the back side to the front side of the image display device 1 in an overlapping manner.

The backlight BL illuminates the first liquid crystal panel PN1 from the back side, and illuminates the second liquid crystal panel PN2 from the back side through the first liquid crystal panel PN1. The backlight BL has a plurality of light sources. As the plurality of light sources of the backlight BL, for example, a plurality of light emitting diodes (LEDs) that emit light such as white light can be used. In the first embodiment, the backlight BL will be described on the assumption that it integrally controls light emission over the entire surface, rather than controlling light emission by local dimming (light emission control for each of a plurality of regions).

The first liquid crystal panel PN1 is disposed between the backlight BL and the second liquid crystal panel PN2. The first liquid crystal panel PN1 is disposed directly facing each of the backlight BL and the second liquid crystal panel PN2. The first liquid crystal panel PN1 includes a plurality of pixels disposed in a matrix shape. Light from the backlight BL passes through each pixel of the first liquid crystal panel PN1 and is radiated onto the second liquid crystal panel PN2. The first liquid crystal panel PN1 is a light control panel that controls the transmittance of each pixel (in other words, the grayscale voltage supplied to each pixel in accordance with the grayscale value of each pixel) and transmits the light from the backlight BL through each pixel to adjust the amount of transmitted light to be emitted to the second liquid crystal panel PN2.

The second liquid crystal panel PN2 is disposed facing the first liquid crystal panel PN1. The second liquid crystal panel PN2 includes a plurality of pixels disposed in a matrix shape. The second liquid crystal panel PN2 is a main panel that controls the transmittance of each pixel (in other words, the grayscale voltage supplied to each pixel in accordance with the grayscale value of each pixel) to display an image based on an input signal in a display area DA in which a plurality of pixels are provided.

Here, if the number of liquid crystal panels included in the image display device is one, unnecessary light from the backlight is transmitted through each pixel of the one liquid crystal panel, and for example, a phenomenon called black floating occurs in which luminance becomes higher than an ideal luminance when a black image is displayed.

On the other hand, in the image display device 1, since the amount of light from the backlight BL is adjusted by two liquid crystal panels, the first liquid crystal panel PN1 and the second liquid crystal panel PN2, it is possible to suppress the occurrence of black floating in which unnecessary light from the backlight leaks, as compared to an image display device including one liquid crystal panel.

Figure 2:
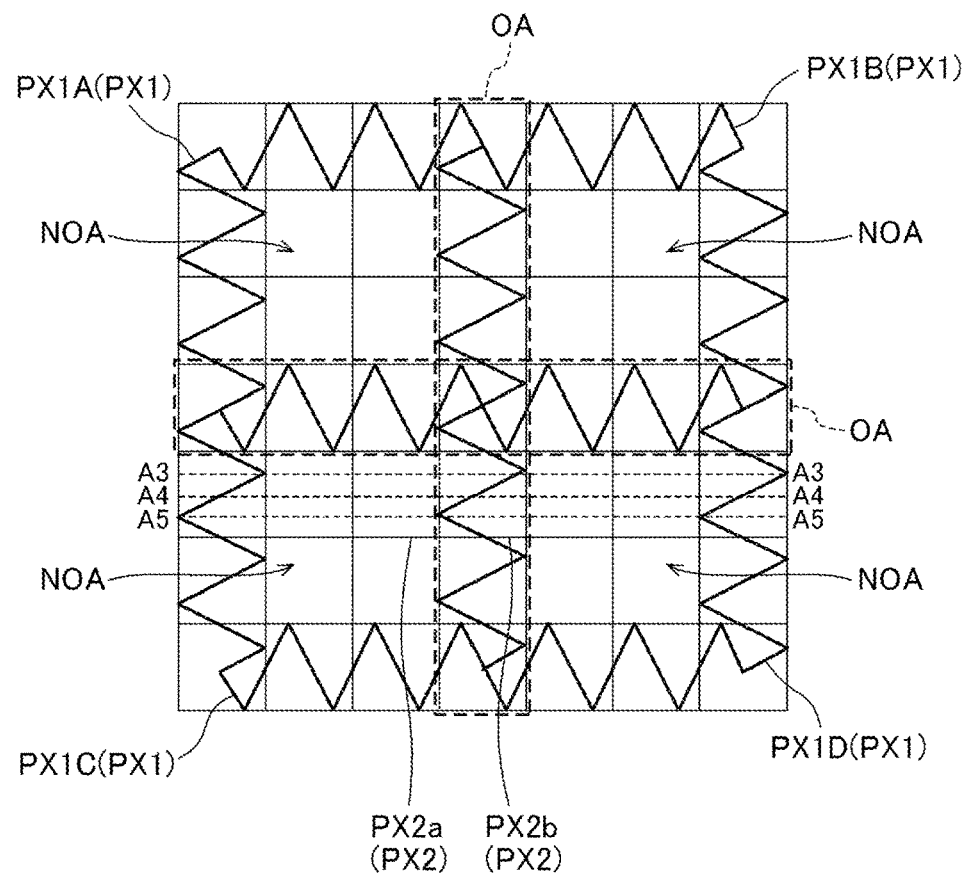
FIG. 2 is a diagram illustrating a state in which a first pixel of a first liquid crystal panel overlaps a second pixel of a second liquid crystal panel according to the first embodiment.

FIG. 2 is a diagram illustrating a state in which a first pixel PX1 of the first liquid crystal panel PN1 overlaps a second pixel PX2 of the second liquid crystal panel PN2 according to the first embodiment. Further, the shape and the number of each of the plurality of first pixels PX1 and the plurality of second pixels PX2 illustrated in FIG. 2 are examples, and the shape and the number of each of the plurality of first pixels PX1 and the plurality of second pixels PX2 may be different from those of the example illustrated in FIG. 2. In addition, although one pixel of the first liquid crystal panel PN1 is described as being larger than one pixel of the second liquid crystal panel PN2 as an example in the first embodiment, no such limitation is intended, and one pixel of the first liquid crystal panel PN1 and one pixel of the second liquid crystal panel PN2 may have the same size.

For example, an edge of each of the plurality of first pixels PX1 in the first liquid crystal panel PN1 has an uneven shape and fits into an adjacent pixel. In other words, the edges of the first pixels PX1 having the uneven shape in the first liquid crystal panel PN1 are engaged with the edges of the adjacent first pixels PX1 having the uneven shape.

As described above, the edges of the adjacent first pixels PX1 of the first liquid crystal panel PN1 have an uneven shape. For this reason, even if there is a large difference in luminance between adjacent first pixels PX1 in the first liquid crystal panel PN1, changes in luminance at the boundary portion between the edges of the adjacent first pixels PX1 are averaged and thus appear to change smoothly compared to a case where the edges of the adjacent pixels have a linear shape, and thus, the boundary portion between the edges of the adjacent first pixels PX1 becomes less visible in a display image displayed in a display region of the second liquid crystal panel PN2. As a result, it is possible to curb deterioration in the display quality of the display image caused by a difference in luminance between the adjacent first pixels PX1.

The plurality of first pixels PX1 include a first pixel PX1A, a first pixel PX1B, a first pixel PX1C, and a first pixel PX1D. In the row direction (lateral direction), the first pixel PX1A and the first pixel PX1B are adjacent to each other, and the first pixel PX1C and the first pixel PX1D are adjacent to each other. In addition, in the column direction (longitudinal direction), the first pixel PX1A and the first pixel PX1C are adjacent to each other, and the first pixel PX1B and the first pixel PX1D are adjacent to each other. An edge of the first pixel PX1A having the uneven shape is engaged with an edge of the first pixel PX1B having the uneven shape that is adjacent thereto in the row direction. An edge of the first pixel PX1A having the uneven shape is engaged with an edge of the first pixel PX1C having the uneven shape that is adjacent thereto in the column direction. An edge of the first pixel PX1B having the uneven shape is engaged with an edge of the first pixel PX1D having the uneven shape that is adjacent thereto in the column direction. An edge of the first pixel PX1C having the uneven shape is engaged with an edge of the first pixel PX1D having the uneven shape that is adjacent thereto in the row direction.

For example, each of the plurality of second pixels PX2 of the second liquid crystal panel PN2 has a square shape. Among the plurality of second pixels PX2 of the second liquid crystal panel PN2, a pixel overlapping one first pixel PX1 is referred to as a second pixel PX2a, and a pixel overlapping the boundary between the edges of a plurality of first pixels PX1 adjacent to each other is referred to as a second pixel PX2b. A plurality of second pixels PX2b overlapping the boundary between an edge of the first pixel PX1A and an edge of the first pixel PX1B that are adjacent to each other are arranged side by side in the column direction. A plurality of second pixels PX2b overlapping the boundary between an edge of the first pixel PX1C and an edge of the first pixel PX1D that are adjacent to each other are arranged side by side in the column direction. A plurality of second pixels PX2b overlapping the boundary between an edge of the first pixel PX1A and an edge of the first pixel PX1C that are adjacent to each other are arranged side by side in the row direction. A plurality of second pixels PX2b overlapping the boundary between an edge of the first pixel PX1B and an edge of the first pixel PX1D that are adjacent to each other are arranged side by side in the row direction. One second pixel PX2b overlapping the boundary between the edge of the first pixel PX1A, the edge of the first pixel PX1B, the edge of the first pixel PX1C, and the edge of the first pixel PX1D that are adjacent to each other is disposed.

With respect to the second liquid crystal panel PN2, an area in which one or more second pixels PX2b are disposed is referred to as an overlapping area OA, and an area in which one or more second pixels PX2a are disposed is referred to as a non-overlapping area NOA. The overlapping area OA is an area in which a plurality of first pixels PX1 (for example, the first pixel PX1C and the first pixel PX1D) adjacent to each other overlap each second pixel PX2b. The non-overlapping area NOA is an area in which only one first pixel PX1 (for example, the first pixel PX1C) overlaps one second pixel PX2b.

Figure 3:
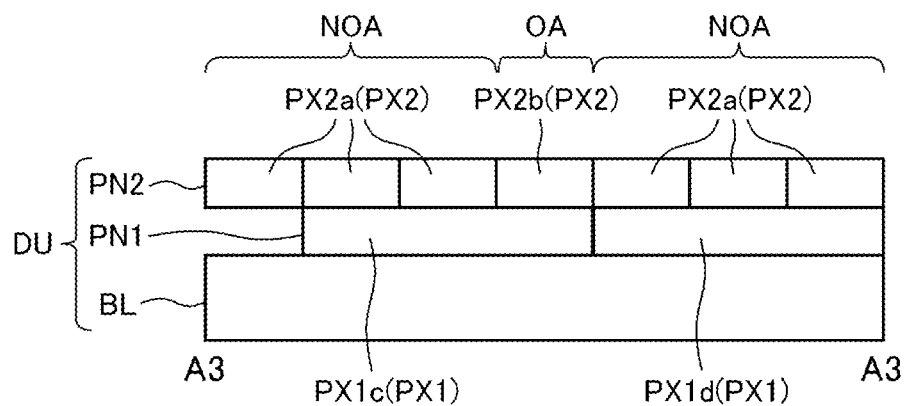
FIG. 3 is a diagram schematically illustrating a cross section along line A3-A3 illustrated in FIG. 2.
Figure 4:
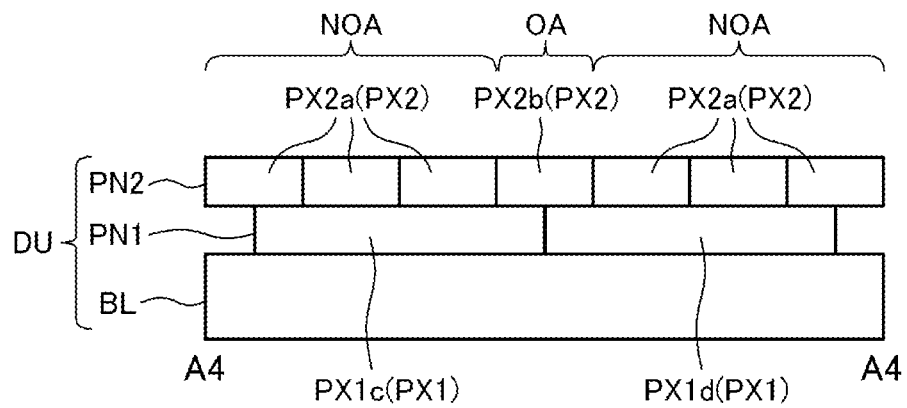
FIG. 4 is a diagram schematically illustrating a cross section along line A4-A4 illustrated in FIG. 2.
Figure 5:
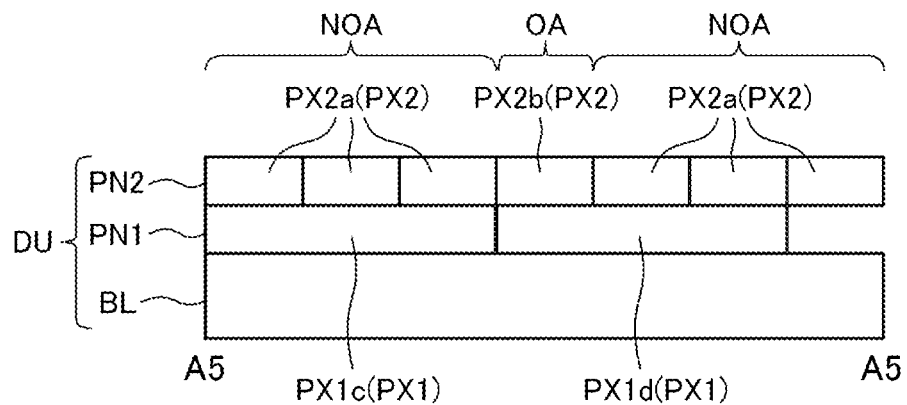
FIG. 5 is a diagram schematically illustrating a cross section along line A5-A5 illustrated in FIG. 2.

FIG. 3 is a diagram schematically illustrating a cross section along line A3-A3 illustrated in FIG. 2. FIG. 4 is a diagram schematically illustrating a cross section along line A4-A4 illustrated in FIG. 2. FIG. 5 is a diagram schematically illustrating a cross section along line A5-A5 illustrated in FIG. 2.

As illustrated in FIGS. 2 to 5, in the display unit DU, the first liquid crystal panel PN1 directly faces the backlight BL. In addition, the second liquid crystal panel PN2 directly faces the first liquid crystal panel PN1.

As illustrated in FIGS. 2 to 5, since the edge of the first pixel PX1C and the edge of the first pixel PX1D adjacent to each other in the row direction have uneven shapes and are engaged with each other, the boundary between the edges of the pixels overlaps the second pixels PX2b so as to obliquely cross the back surface of the second pixel PX2b located in the overlapping area OA (below the second pixel PX2b in FIGS. 3 to 5) in the column direction (longitudinal direction shown in FIG. 2).

In addition, the plurality of second pixels PX2a included in the non-overlapping area NOA in the second liquid crystal panel PN2 overlap only one of the first pixel PX1C and the first pixel PX1D adjacent to each other in the first liquid crystal panel PN1. In addition, the plurality of second pixels PX2b included in the overlapping area OA in the second liquid crystal panel PN2 overlap both the first pixel PX1C and the first pixel PX1D adjacent to each other in the first liquid crystal panel PN1.

Figure 6:
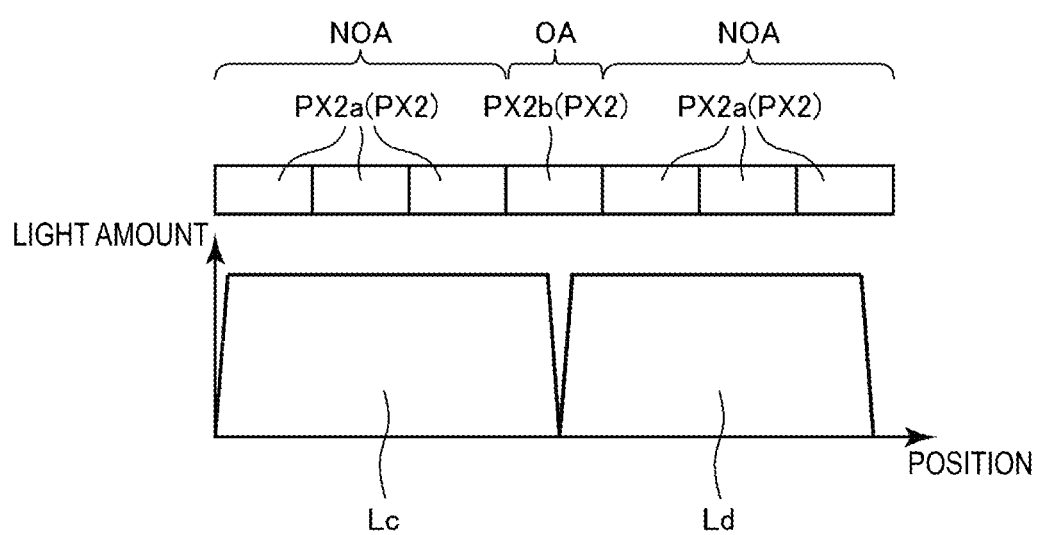
FIG. 6 is a diagram schematically illustrating an example of an amount of transmitted light emitted by a first pixel and a first pixel of the first liquid crystal panel PN1 to a plurality of second pixels of the second liquid crystal panel according to the first embodiment.

FIG. 6 is a diagram schematically illustrating an example of an amount of transmitted light emitted by the first pixel PX1C and the first pixel PX1D of the first liquid crystal panel PN1 to a plurality of second pixels PX2 of the second liquid crystal panel PN2 according to the first embodiment. Transmitted light Lc schematically represents an amount of light from the backlight BL transmitted by the first pixel PX1C, and transmitted light Ld schematically represents an amount of light from the backlight BL transmitted by the first pixel PX1D.

A plurality of second pixels PX2a included in the non-overlapping area NOA overlapping only the first pixel PX1C among the first pixel PX1C and the first pixel PX1D that are adjacent to each other are mainly irradiated with only the transmitted light Lc and not irradiated with the transmitted light Ld. For this reason, when the amount of the transmitted light Lc changes, the amount of light transmitted through the plurality of second pixels PX2a overlapping only the first pixel PX1C is affected and changes accordingly, but when the amount of the transmitted light Ld changes, the amount of light transmitted through the plurality of second pixels PX2a overlapping only the first pixel PX1C is hardly affected and does not change. For example, the proportion at which the second pixel PX2a overlapping only the first pixel PX1C is influenced with the transmitted light is approximately 100% in the first pixel PX1C and 0% in the first pixel PX1D.

In addition, a plurality of second pixels PX2a included in the non-overlapping area NOA overlapping only the first pixel PX1D among the first pixel PX1C and the first pixel PX1D that are adjacent to each other are mainly irradiated with only the transmitted light Ld and not irradiated with the transmitted light Ld. For this reason, when the amount of the transmitted light Ld changes, the amount of light transmitted through the plurality of second pixels PX2a overlapping only the first pixel PX1D is affected and changes accordingly, but when the amount of the transmitted light Lc changes, the amount of light transmitted through the plurality of second pixels PX2a overlapping only the first pixel PX1D is hardly affected and does not change. For example, the proportion at which the second pixel PX2a overlapping only the first pixel PX1D is influenced with the transmitted light is approximately 0% in the first pixel PX1C and 100% in the first pixel PX1D.

However, because the second pixels PX2b included in the overlapping area OA overlapping both the first pixel PX1C and the first pixel PX1D that are adjacent to each other are irradiated with the transmitted light Lc from the first pixel PX1C and the transmitted light Ld from the first pixel PX1D, the second pixels PX2b are affected by changes in the amounts of both the transmitted light Lc and the transmitted light Ld, and if the amount of at least one of the transmitted light Lc and the transmitted light Ld changes, the amount of light transmitted through the second pixels PX2b also changes. For example, the proportion at which the second pixels PX2b is influenced with the transmitted light is 50% in both the first pixel PX1C and the first pixel PX1D.

For this reason, although details will be described later, for the image display device 1 according to the first embodiment, the transmittance of each of the plurality of first pixels PX1 adjacent to each other is not determined independently and individually, but is determined in consideration of the transmittance of the adjacent first pixels PX1.

Figure 7:
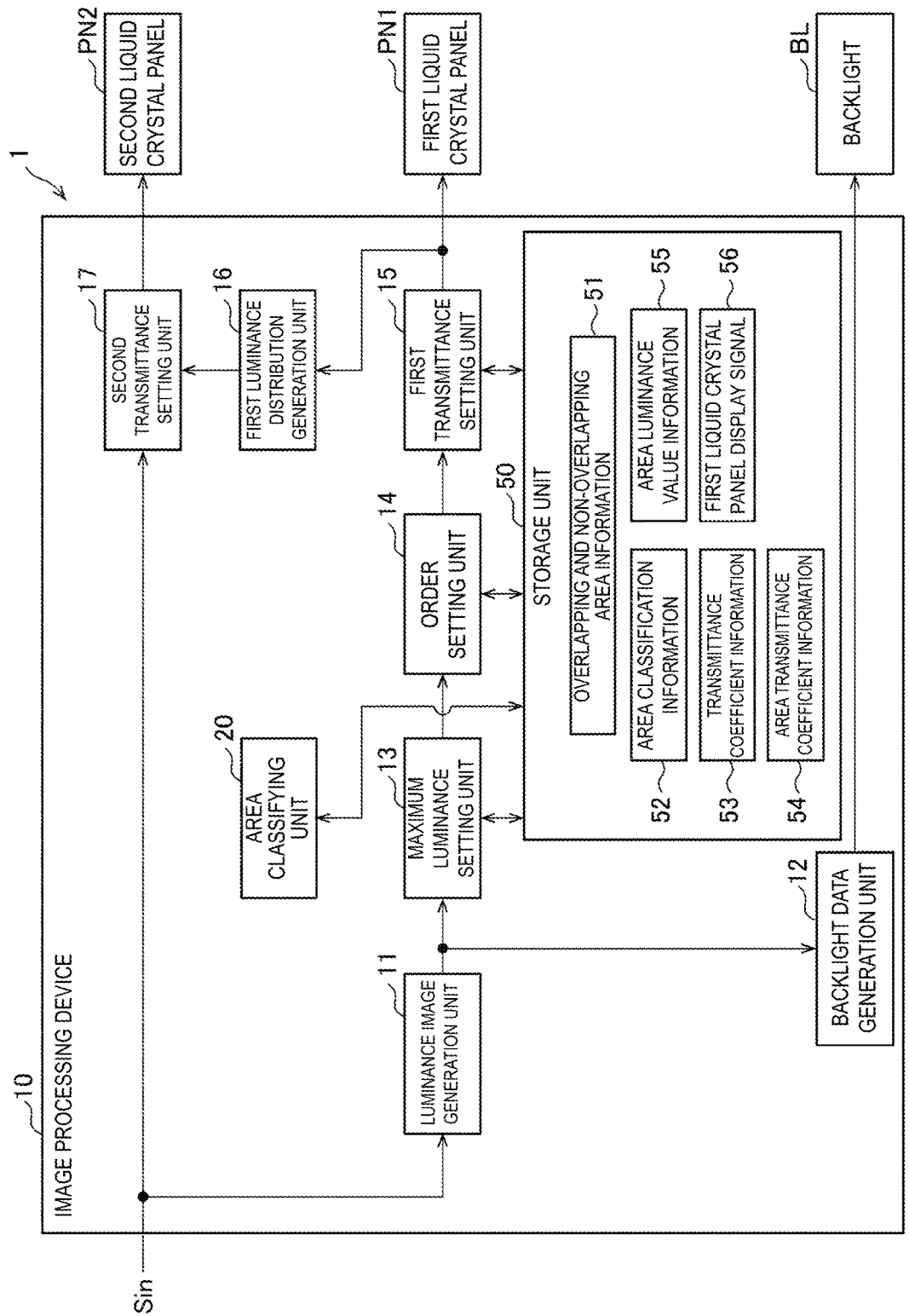
FIG. 7 is a functional block diagram illustrating a schematic configuration of the image display device according to the first embodiment.

FIG. 7 is a functional block diagram illustrating a schematic configuration of the image display device 1 according to the first embodiment. The image processing device 10 includes a processor that functions as a luminance image generation unit 11, a backlight data generation unit 12, a maximum luminance setting unit 13, an order setting unit 14, a first transmittance setting unit (transmittance setting unit) 15, a first luminance distribution generation unit 16, a second transmittance setting unit 17, and an area classifying unit 20 when executing an image processing program. As long as the processor of the image processing device 10 can realize the functions by executing the image processing program, any type of processor may be used. For example, as the processor of the image processing device 10, it is possible to use various types of processors such as a central processing unit (CPU), a graphics processing unit (GPU), a digital signal processor (DSP), an application-specific integrated circuit (ASIC), or a field programmable gate array (FPGA). In addition, the image processing device 10 includes a storage unit 50 that is a computer-readable storage medium. The storage unit 50 stores an image processing program in a non-transitory manner. The storage unit 50 may be a semiconductor memory such as a static random access memory (SRAM), a dynamic random access memory (DRAM), a read only memory (ROM), or a flash memory, a register, a magnetic storage device such as a hard disk device (HDD), or an optical storage device such as an optical disk device. The image processing program may be stored in advance in the storage unit 50, or may be supplied to the storage unit 50 via a wide-area communication network including the Internet or the like.

The storage unit 50 stores overlapping and non-overlapping area information 51, area classification information 52, transmittance coefficient information 53, area transmittance coefficient information 54, area luminance value information 55, and a first liquid crystal panel display signal 56.

The overlapping and non-overlapping area information 51 includes information indicating a relative position of each pixel PX1 of the first liquid crystal panel PN1 and each pixel PX2 of the second liquid crystal panel PN2, and includes information for the area classifying unit 20 to classify a study target area TA (see FIGS. 8 and 10) in the second liquid crystal panel PN2 into a plurality of areas including the overlapping area OA to generate the area classification information 52.

The area classification information 52 is information obtained by classifying a display area DA for images in the second liquid crystal panel PN2 into a plurality of areas including the overlapping area OA in which each pixel overlaps a plurality of first pixels PX1 in the first liquid crystal panel PN1. The area classification information 52 includes, for example, information indicating a relative position of each first pixel PX1 of the first liquid crystal panel PN1 and each second pixel PX2 of the second liquid crystal panel PN2. Details of the area classification information 52 will be described later with reference to FIG. 9 and the like.

The transmittance coefficient information 53 is information indicating the distribution of transmittance coefficients. The transmittance coefficients are information indicating a proportion at which each of the plurality of first pixels PX1 overlapping the overlapping area OA influences the overlapping area QA with transmitted light. In addition, the transmittance coefficients are information indicating a proportion at which one first pixel PX1 overlapping the non-overlapping area NOA influences the non-overlapping area NOA with transmitted light. Details of the transmittance coefficient information 53 will be described later with reference to FIG. 10 and the like.

The area transmittance coefficient information 54 is information in which transmittance coefficients are assigned to each of a plurality of areas classified from a display area for images in the second liquid crystal panel PN2. Details of the area transmittance coefficient information 54 will be described later with reference to FIG. 14.

The area luminance value information 55 is information in which, for each of a plurality of areas classified from the display area for images in the second liquid crystal panel PN2, the maximum luminance value that is the highest value among luminance values of a luminance pixel LPX2 $(x, y)$ included in the corresponding area in a luminance image LIM (FIG. 15) is associated with the coordinates of the luminance pixel LPX2 $(x, y)$ having the maximum luminance value. In addition, the area luminance value information 55 also includes information in which each of areas are set in descending order of maximum luminance values. The area luminance value information 55 will be described in detail later with reference to FIG. 17.

The first liquid crystal panel display signal 56 is information in which a transmittance is set for each of the plurality of first pixels PX1 in the first liquid crystal panel PN1. Details of the first liquid crystal panel display signal 56 will be described later with reference to FIG. 18.

The area classifying unit 20 classifies the display area DA for images in the second liquid crystal panel PN2 into a plurality of areas to include the overlapping area OA based on the overlapping and non-overlapping area information 51. Furthermore, in the present embodiment, the area classifying unit 20 classifies the display area DA for images in the second liquid crystal panel PN2 into a plurality of areas to include the non-overlapping area NOA, generates the area classification information 52, and stores the area classification information 52 in the storage unit 50. In addition, the area classifying unit 20 assigns a transmittance coefficient to each of the plurality of classified areas based on the transmittance coefficient information 53, generates the area transmittance coefficient information 54, and stores the area transmittance coefficient information 54 in the storage unit 50.

The luminance image generation unit 11 generates a luminance image LIM (see FIG. 15) by acquiring a luminance component of an input image Sin input from the outside. The luminance image LIM is data indicating a luminance value corresponding to each of the plurality of second pixels PX2 of the second liquid crystal panel PN2. The input image Sin and the luminance image LIM are each data of the same resolution as the second liquid crystal panel PN2.

The backlight data generation unit 12 generates backlight data for controlling luminance of a plurality of light sources included in the backlight BL based on the luminance image LIM generated by the luminance image generation unit 11. The backlight data generation unit 12 controls luminance of the backlight BL based on the generated backlight data. Further, the backlight data generation unit 12 may generate backlight data based on the input image Sin instead of the luminance image LIM. Further, as described above, since the light emission of the backlight BL according to the first embodiment is integrally controlled over the entire surface, the backlight data generated by the backlight data generation unit 12 may be one piece of data.

The maximum luminance setting unit 13 generates the area luminance value information 55 (FIG. 17) by associating each of the plurality of areas with the maximum luminance value that is the highest value among the luminance values of the corresponding areas in the luminance image LIM based on the area classification information 52 and the luminance image LIM (FIG. 15), and stores the area luminance value information 55 in the storage unit 50.

Figure 17:
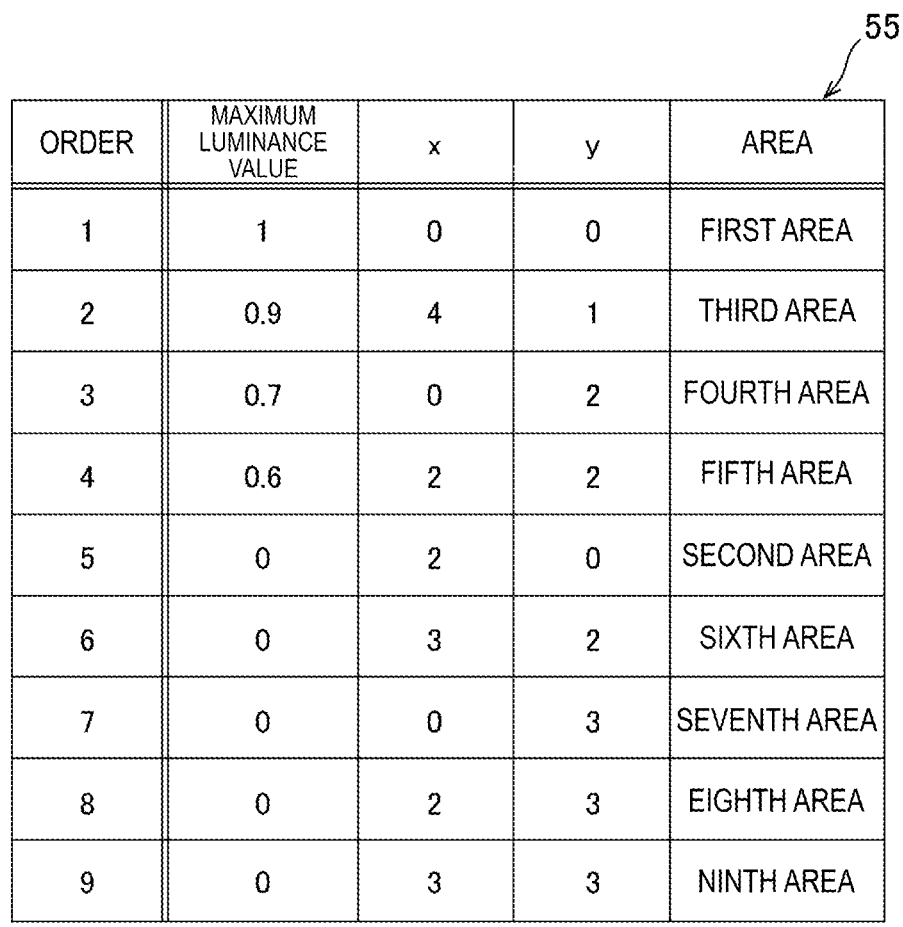
FIG. 17 is a diagram schematically illustrating area luminance value information according to the first embodiment.

The order setting unit 14 sets the order of the plurality of areas classified by the area classifying unit 20 in descending order of maximum luminance values, and adds information about this order to the area luminance value information 55 (FIG. 17).

When the first pixel PX1 whose transmittance is to be set among the plurality of first pixels PX1 in the first liquid crystal panel PN1 is set as a pixel of interest, the first transmittance setting unit 15 sets a transmittance of the pixel of interest based on the maximum luminance value associated with the overlapping area OA overlapping the pixel of interest in the order set for the overlapping area OA overlapping the pixel of interest among the plurality of areas based on the area classification information 52, the area transmittance coefficient information 54, and the area luminance value information 55. In particular, the first transmittance setting unit 15 sets a transmittance of the pixel of interest based on a transmittance coefficient indicating a proportion at which each of the plurality of first pixels PX1 overlapping the overlapping area OA influences the overlapping area OA with transmitted light.

Among the plurality of first pixels PX1 overlapping the overlapping area OA, the first transmittance setting unit 15 sets, as the transmittance of the pixel of interest, an insufficient value of the transmittance of the one or more first pixels PX1 for which the transmittance has been set to influence the overlapping area QA for the maximum luminance value associated with the overlapping area OA. To be more specific, the first transmittance setting unit 15 multiplies the transmittance set for the one or more first pixels PX1 by the transmittance coefficient to obtain a transmittance at which the one or more first pixels PX1 influence the overlapping area OA, and divides a value obtained by subtracting the transmittance at which the one or more first pixels PX1 influence the overlapping area QA from the maximum luminance value associated with the overlapping area OA by a value obtained by multiplying the transmittance coefficient by the number of pixels of the pixel of interest to obtain the above-described "insufficient value".

The first transmittance setting unit 15 generates the first liquid crystal panel display signal 56 in which the transmittance is set for each of the plurality of first pixels PX1, and outputs the generated first liquid crystal panel display signal 56 to the first liquid crystal panel PN1, thereby controlling the transmittance of each of the plurality of first pixels PX1.

The first luminance distribution generation unit 16 generates a first luminance distribution 57 (FIG. 19) indicating the distribution of light transmitted through the first liquid crystal panel PN1 for each of the plurality of second pixels PX2 based on the first liquid crystal panel display signal 56 which is the transmittance set for each of the plurality of first pixels PX1. The first luminance distribution generation unit 16 generates the first luminance distribution 57 by, for example, convolving the transmittance of each first pixel PX1 of the first liquid crystal panel PN1 with a "point spread function (PSF)" indicating how light spreads from each first pixel PX1 of the first liquid crystal panel PN1 to the second liquid crystal panel PN2.

The second transmittance setting unit 17 corrects the input image Sin based on the first luminance distribution 57 to set the transmittance of the plurality of second pixels PX2, thereby generating a second liquid crystal panel display signal 58. The second transmittance setting unit 17 controls the transmittance of each of the plurality of second pixels PX2 by outputting the generated second liquid crystal panel display signal 58 to the second liquid crystal panel PN2.

Figure 8:
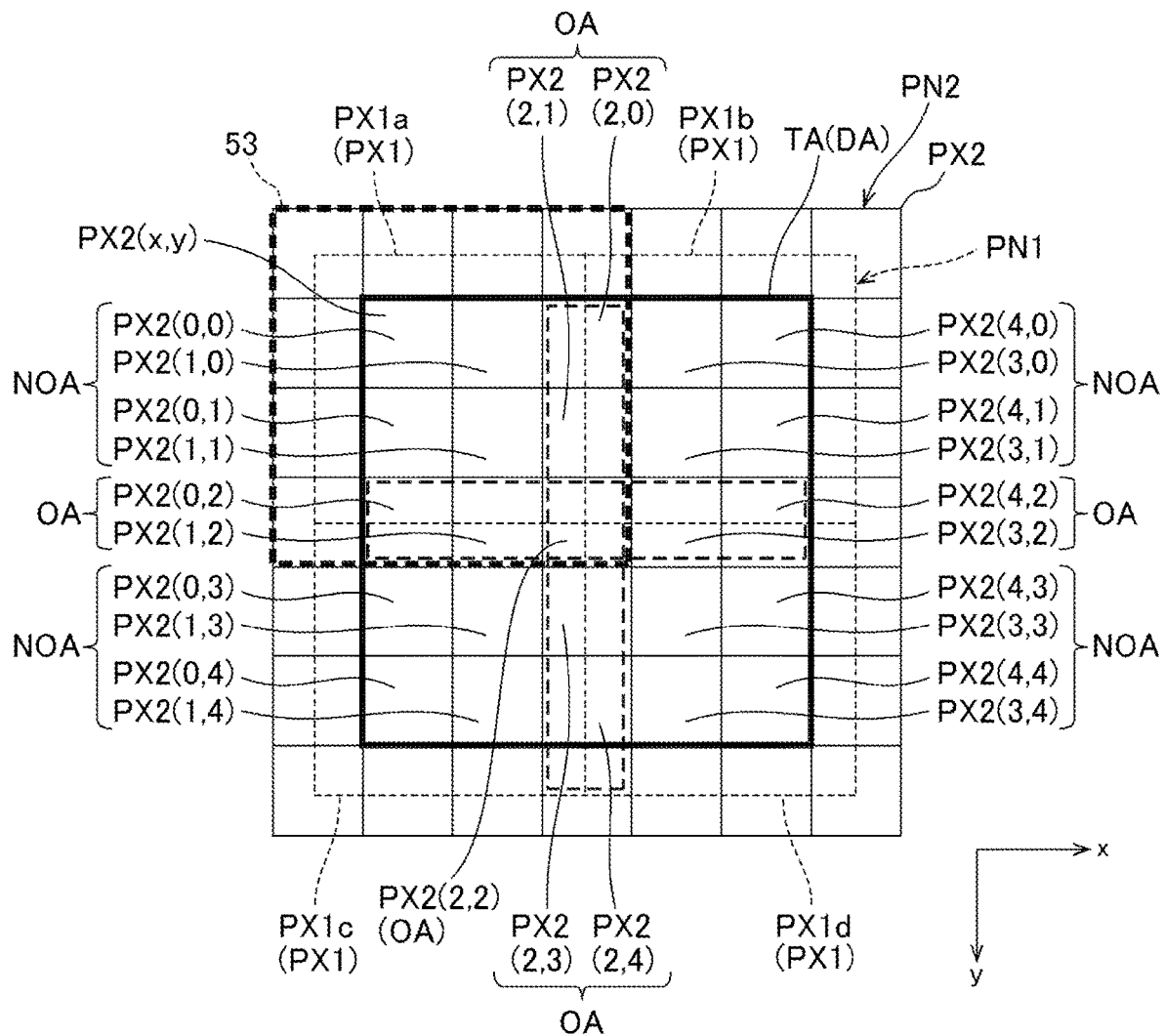
FIG. 8 is a diagram for describing each region in the second liquid crystal panel overlapping the first liquid crystal panel according to the first embodiment.

FIG. 8 is a diagram for describing each region in the second liquid crystal panel PN2 overlapping the first liquid crystal panel PN1 according to the first embodiment. In FIG. 8, for the sake of convenience, the first pixel PX1A, the first pixel PX1B, the first pixel PX1C, and the pixel PX1D illustrated in FIG. 2 are illustrated as a first pixel PX1a, a first pixel PX1b, a first pixel PX1c, and a pixel PX1d having a square shape, respectively.

As an example, the first liquid crystal panel PN1 is represented by a plurality of first pixels PX1 corresponding to 2×2 pixels, and the second liquid crystal panel PN2 is represented by a plurality of second pixels PX2 corresponding to 7×7 pixels. For example, one first pixel PX1 has a size corresponding to 3×3 second pixels PX2.

In the example illustrated in FIG. 8, the transmittance coefficient information 53 indicates that the first pixel PX1a of the first liquid crystal panel PN1 influences 4×4 second pixels PX2 of the second liquid crystal panel PN2 with transmitted light.

Among areas including a plurality of second pixels PX2 in the second liquid crystal panel PN2, an area for which a method of setting a transmittance or the like is to be studied is referred to as a study target area TA. The first embodiment will be described on the assumption that a study target area TA coincides with a display area DA for images. In order to simplify description, the first embodiment will be described on the assumption that a study target area TA is an area in which 5×5 second pixels PX2 are arranged in a matrix shape surrounded by a plurality of second pixels PX2 positioned at the edges in a frame-like shape. However, the number of pixels included in the study target area TA is not limited to 5×5 pixels, and even more pixels may be included in the area.

Further, when the positions of the plurality of second pixels PX2 are specified, the positions are indicated by using xy coordinates, like in second pixel PX2 (x, y) or the like, as necessary. The x direction is the row direction (lateral direction), and the direction from left to right in the drawing is a positive-x direction. The y direction is the column direction (longitudinal direction), and the direction from top to bottom in the drawing is a positive-y direction. The upper-left second pixel PX2 in the study target area TA is set as a second pixel PX2 (0, 0), the upper-right second pixel PX2 in the study target area TA is set as a second pixel PX2 (4, 0), the lower-left second pixel PX2 in the study target area TA is set as a second pixel PX2 (0, 4), the lower-right second pixel PX2 in the study target area TA is set as a second pixel PX2 (4, 4), and the central second pixel PX2 in the study target area TA is set as a second pixel PX2 (2, 2).

Figure 9:
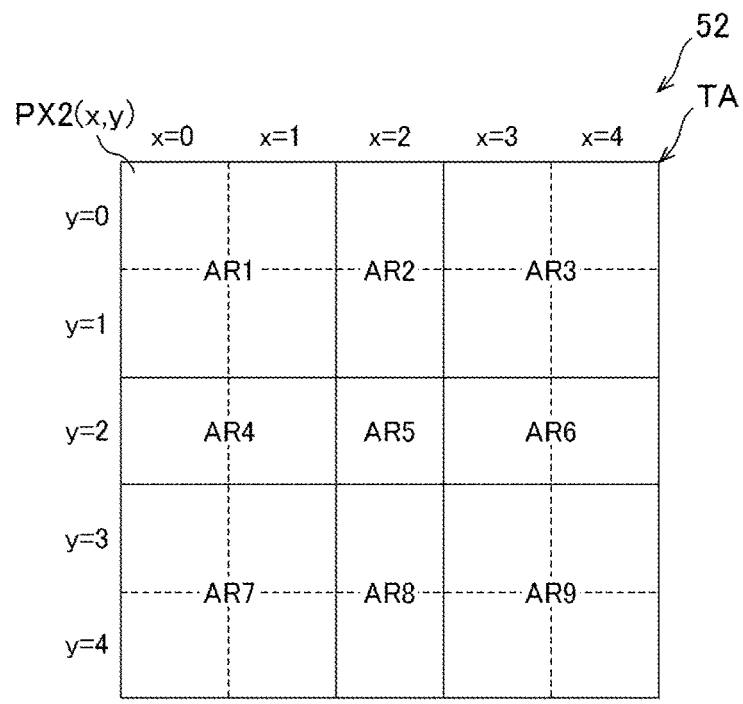
FIG. 9 is a diagram illustrating a study target area classified into a plurality of areas according to the first embodiment.

FIG. 9 is a diagram illustrating a study target area TA classified into a plurality of areas according to the first embodiment. The area classifying unit 20 (FIG. 7) refers to the overlapping and non-overlapping area information 51 stored in the storage unit 50 and classifies the study target area TA into a plurality of areas. For example, the area classifying unit 20 classifies the study target area TA into nine areas of a first area AR1 to a ninth area AR9. The area classifying unit 20 stores information about the classification of the area thus obtained in the storage unit 50 as the area classification information 52.

To be more specific, the area classifying unit 20 determines that each of the second pixels PX2 (0, 0), PX2 (1, 0), PX2 (0, 1), and PX2 (1, 1) among the plurality of second pixels PX2 (x, y) (FIGS. 8 and 9) overlaps only the first pixel PX1a, and that a pixel that mainly receives transmitted light is the first pixel PX1a in the same non-overlapping area NOA, and classifies the area constituted by the second pixels PX2 (0, 0), PX2 (1, 0), PX2 (0, 1), and PX2 (1, 1) as a first area AR1 based on the overlapping and non-overlapping area information 51 (FIG. 7) stored in the storage unit 50.

In addition, the area classifying unit 20 determines that each of the second pixels PX2 (2, 0) and PX2 (2, 1) among the plurality of second pixels PX2 (x, y) (FIGS. 8 and 9) overlaps the edges of the two first pixels PX1a and PX1b, and that pixels that mainly receive transmitted light are the first pixel PX1a and the first pixel PX1b in the same overlapping area OA, and classifies the area constituted by the second pixels PX2 (2, 0) and PX2 (2, 1) as a second area AR2 based on the overlapping and non-overlapping area information 51 (FIG. 7).

In addition, the area classifying unit 20 determines that each of the second pixels PX2 (3, 0), PX2 (4, 0), PX2 (3, 1), and PX2 (4, 1) among the plurality of second pixels PX2 (x, y) (FIGS. 8 and 9) overlaps only the first pixel PX1b, and that a pixel that mainly receives transmitted light is the first pixel PX1b in the same non-overlapping area NOA, and classifies the area constituted by the second pixels PX2 (3, 0), PX2 (4, 0), PX2 (3, 1), and PX2 (4, 1) as a third area AR3 based on the overlapping and non-overlapping area information 51 (FIG. 7).

In addition, the area classifying unit 20 determines that each of the second pixels PX2 (0, 2) and PX2 (1, 2) among the plurality of second pixels PX2 (x, y) (FIGS. 8 and 9) overlaps the edges of the two first pixels PX1a and PX1c, and that pixels that mainly receive transmitted light are the first pixel PX1a and the first pixel PX1c in the same overlapping area OA, and classifies the area constituted by the second pixels PX2 (0, 2) and PX2 (1, 2) as a fourth area AR4 based on the overlapping and non-overlapping area information 51 (FIG. 7).

In addition, the area classifying unit 20 determines that the second pixel PX2 (2, 2) among the plurality of second pixels PX2 (x, y) (FIGS. 8 and 9) overlaps the edges of each of the first pixel PX1a, the first pixel PX1b, the first pixel PX1c, and the first pixel PX1d, and that pixels that mainly receive transmitted light are the first pixel PX1a, the first pixel PX1b, the first pixel PX1c, and the first pixel PX1d in the overlapping area OA, and classifies the area constituted by the second pixels PX2 (2, 2) as a fifth area AR5 based on the overlapping and non-overlapping area information 51 (FIG. 7).

In addition, the area classifying unit 20 determines that each of the second pixels PX2 (3, 2) and PX2 (4, 2) among the plurality of second pixels PX2 (x, y) (FIGS. 8 and 9) overlaps the edges of the two first pixels PX1b and PX1d, and that pixels that mainly receive transmitted light are the first pixel PX1b and the first pixel PX1d in the same overlapping area OA, and classifies the area constituted by the second pixels PX2 (3, 2) and PX2 (4, 2) as a sixth area AR6 based on the overlapping and non-overlapping area information 51 (FIG. 7).

In addition, the area classifying unit 20 determines that each of the second pixels PX2 (0, 3), PX2 (1, 3), PX2 (0, 4), and PX2 (1, 4) among the plurality of second pixels PX2 (x, y) (FIGS. 8 and 9) overlaps only the first pixel PX1c, and that a pixel that mainly receives transmitted light is the first pixel PX1c in the same non-overlapping area NOA, and classifies the area constituted by the second pixels PX2 (0, 3), PX2 (1, 3), PX2 (0, 4), and PX2 (1, 4) as a seventh area AR7 based on the overlapping and non-overlapping area information 51 (FIG. 7).

In addition, the area classifying unit 20 determines that each of the second pixels PX2 (2, 3) and PX2 (2, 4) among the plurality of second pixels PX2 (x, y) (FIGS. 8 and 9) overlaps the edges of the two first pixels PX1c and PX1d, and that pixels that mainly receive transmitted light are the first pixel PX1c and the first pixel PX1d in the same overlapping area OA, and classifies the area constituted by the second pixels PX2 (2, 3) and PX2 (2, 4) as an eighth area AR8 based on the overlapping and non-overlapping area information 51 (FIG. 7).

In addition, the area classifying unit 20 determines that each of the second pixels PX2 (3, 3), PX2 (4, 3), PX2 (3, 4), and PX2 (4, 4) among the plurality of second pixels PX2 (x, y) (FIGS. 8 and 9) overlaps only the first pixel PX1d, and that a pixel that mainly receives transmitted light is the first pixel PX1d in the same non-overlapping area NOA, and classifies the area constituted by the second pixels PX2 (3, 3), PX2 (4, 3), PX2 (3, 4), and PX2 (4, 4) as a ninth area AR9 based on the overlapping and non-overlapping area information 51 (FIG. 7).

Figure 10:
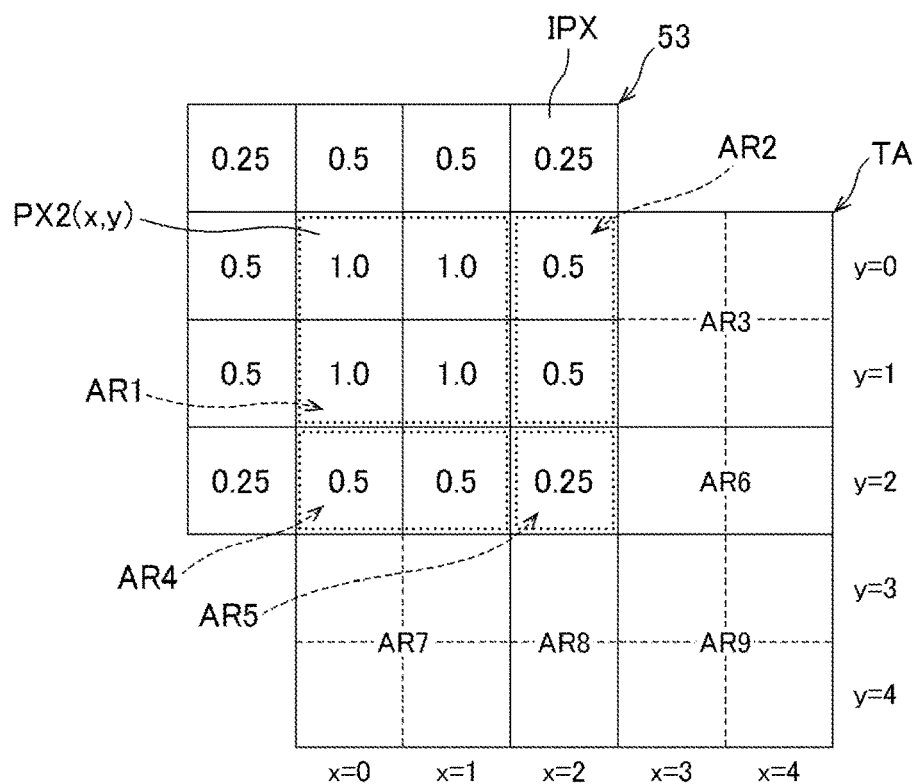
FIG. 10 is a diagram illustrating a state in which transmittance coefficients are assigned to a first area, a second area, a fourth area, and a fifth area according to the first embodiment.

FIG. 10 is a diagram illustrating a state in which transmittance coefficients are assigned to the first area AR1, the second area AR2, the fourth area AR4, and the fifth area AR5 according to the first embodiment.

For example, the transmittance coefficient information 53 includes 4×4 transmittance coefficient pixels IPX which are pixels corresponding to each of a plurality of second pixels PX2 of the second liquid crystal panel PN2. Each of the transmittance coefficient pixels IPX is assigned with a transmittance coefficient in advance, the transmittance coefficient indicating a proportion at which one first pixel PX1 of the first liquid crystal panel PN1 influences the overlapping area OA overlapping the first pixels PX1 or the non-overlapping area NOA with transmitted light. The maximum value of the transmittance coefficient is "1.0" (=100%).

For example, in the transmittance coefficient information 53, since each of the 2×2 transmittance coefficient pixels IPX at the center is included in the area corresponding to the non-overlapping area NOA as will be described later, a transmittance coefficient "1.0" is assigned to correspond to each of the four second pixels PX2 included in the non-overlapping area NOA. For example, in the transmittance coefficient information 53, since each of the four transmittance coefficient pixels IPX located at the corners is included in the area corresponding to the overlapping area OA overlapping four first pixels PX1 as will be described later, a transmittance coefficient "0.25" (=25%) is assigned to correspond to one second pixel PX2 included in the overlapping area OA. For example, in the transmittance coefficient information 53, among 12 transmittance coefficient pixels IPX positioned at the edges surrounding the 2×2 transmittance coefficient pixels IPX at the center, each of eight (2 pixels between corners×4) transmittance coefficient pixels IPX excluding four pixels at the corners is included in the area corresponding to the overlapping area OA overlapping two first pixels PX1 as will be described below, and thus a transmittance coefficient "0.5" (=50%) is assigned to correspond to each of the two second pixels PX2 included in the non-overlapping area NOA.

When the area classifying unit 20 classifies the study target area TA into the first area AR1 to the ninth area AR9, the area classifying unit 20 refers to the storage unit 50 and assigns a transmittance coefficient to each of the first area AR1 to the ninth area AR9 in the study target area TA (in other words, each of the second pixels PX2 in the study target area TA) based on the transmittance coefficient information 53.

First, as illustrated in FIGS. 8 and 10, the area classifying unit 20 assigns a transmittance coefficient indicating the proportion of influence of transmitted light from the first pixel PX1a to each of the first area AR1, the second area AR2, the fourth area AR4, and the fifth area AR5 in the study target area TA that are influenced with transmitted light by the first pixel PX1a of the first liquid crystal panel PN1, based on the transmittance coefficient information 53.

Since the first area AR1 is the non-overlapping area NOA overlapping only the first pixel PX1a among the four first pixels PX1a, PX1b, PX1c, and PX1d in the first liquid crystal panel PN1, the first area AR1 mainly receives only the transmitted light from the first pixel PX1a. For this reason, the area classifying unit 20 assigns the transmittance coefficient "1.0", which is the maximum transmittance coefficient assigned to the 2×2 transmittance coefficient pixels IPX at the center of the transmittance coefficient information 53, to the first area AR1 (in other words, to each of the second pixels PX2 (0, 0), PX2 (1, 0), PX2 (0, 1), and PX2 (1, 1) included in the first area AR1). The transmittance coefficient "1.0" is the number obtained by dividing the maximum transmittance coefficient "1.0" by 1, which is the number of pixels (first pixels PX1a) that influence the first area AR1 with transmitted light.

The second area AR2 is the overlapping area OA overlapping both the edges of the first pixel PX1a and the first pixel PX1b adjacent to each other in the row direction (lateral direction) among the four first pixels PX1a, PX1b, PX1c, and PX1d in the first liquid crystal panel PN1, and thus mainly receives transmitted light from the two first pixels PX1a and PX1b. Since the one first pixel PX1a of the two first pixels PX1a and PX1b accounts for half the proportion at which the first pixels influence the second area AR2 with transmitted light, the area classifying unit 20 assigns the transmittance coefficient "0.5" assigned to the two transmittance coefficient pixels IPX arranged in the column direction (longitudinal direction) between the two corners of the transmittance coefficient information 53 to the second area AR2 (in other words, to each of the second pixels PX2 (2, 0) and PX2 (2, 1) included in the second area AR2). The transmittance coefficient "0.5" is the number obtained by dividing the maximum transmittance coefficient "1.0" by 2, which is the number of pixels (the first pixel PX1a and the first pixel PX1b) that influence the second area AR2 with transmitted light.

The fourth area AR4 is the overlapping area OA overlapping both the edges of the first pixel PX1a and the first pixel PX1c adjacent to each other in the column direction (longitudinal direction) among the four first pixels PX1a, PX1b, PX1c, and PX1d in the first liquid crystal panel PN1, and thus mainly receives transmitted light from the two first pixels PX1a and PX1c. Since the one first pixel PX1a of the two first pixels PX1a and PX1c accounts for half the proportion at which the first pixels influence the fourth area AR4 with transmitted light, the area classifying unit 20 assigns the transmittance coefficient "0.5" assigned to the two transmittance coefficient pixels IPX arranged in the row direction (lateral direction) between the two corners of the transmittance coefficient information 53 to the fourth area AR4 (in other words, to each of the second pixels PX2 (0, 2) and PX2 (1, 2) included in the fourth area AR4). The transmittance coefficient "0.5" is the number obtained by dividing the maximum transmittance coefficient "1.0" by 2, which is the number of pixels (the first pixel PX1a and the first pixel PX1c) that influence the fourth area AR4 with transmitted light.

The fifth area AR5 is the overlapping area OA overlapping the edges of all four first pixels PX1a, PX1b, PX1c, and PX1d of the first liquid crystal panel PN1, and thus mainly receives transmitted light from the four first pixels PX1a, PX1b, PX1c, and PX1d. Since the proportion at which the one first pixel PX1a among the four first pixels PX1a, PX1b, PX1c, and PX1d influences the fifth area AR5 with transmitted light is 1/4, the area classifying unit 20 assigns the transmittance coefficient "0.25" assigned to the transmittance coefficient pixel IPX located at the corner of the transmittance coefficient information 53 to the fifth area AR5 (in other words, to the second pixel PX2 (2, 2) included in the fifth area AR5). The transmittance coefficient "0.25" is the number obtained by dividing the maximum transmittance coefficient "1.0" by 4, which is the number of pixels (the first pixel PX1a, the first pixel PX1b, the first pixel PX1c, and the first pixel PX1d) that influence the fifth area AR5 with transmitted light.

Figure 11:
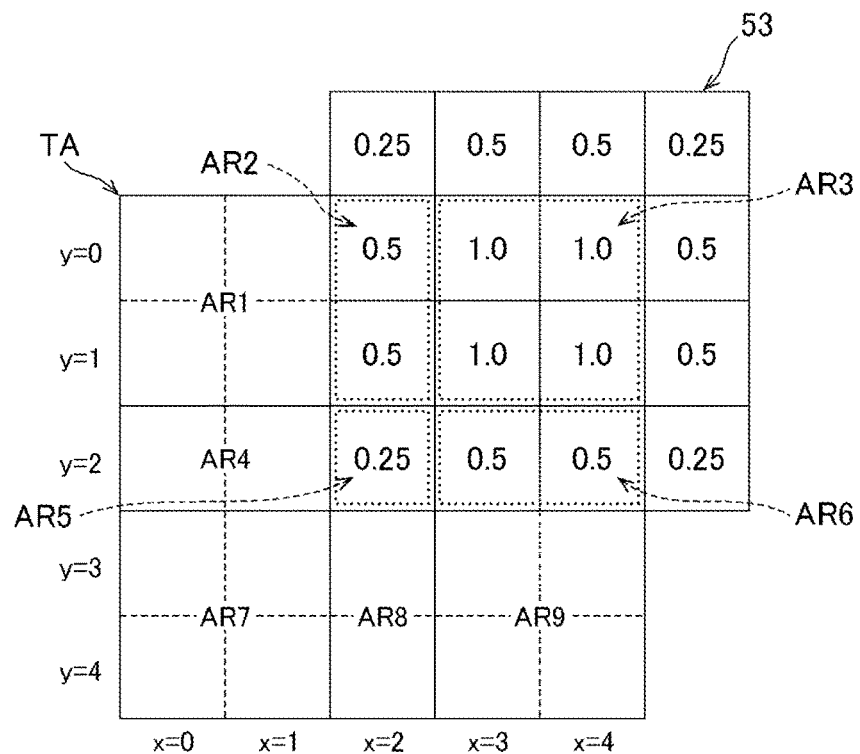
FIG. 11 is a diagram illustrating a state in which transmittance coefficients are assigned to the second area, a third area, the fifth area, and a sixth area according to the first embodiment.

FIG. 11 is a diagram illustrating a state in which transmittance coefficients are assigned to the second area AR2, the third area AR3, the fifth area AR5, and the sixth area AR6 according to the first embodiment.

As illustrated in FIGS. 8 and 11, the area classifying unit 20 assigns a transmittance coefficient indicating the proportion of influence of transmitted light from the first pixel PX1b to each of the second area AR2, the third area AR3, the fifth area AR5, and the sixth area AR6 in the study target area TA that are influenced with transmitted light by the first pixel PX1b of the first liquid crystal panel PN1, based on the transmittance coefficient information 53.

As described above, the second area AR2 is the overlapping area OA overlapping each of the first pixel PX1a and the first pixel PX1b adjacent to each other in the row direction (lateral direction), and mainly receives transmitted light from the two first pixels PX1a and PX1b. Since the one first pixel PX1b of the two first pixels PX1a and PX1b accounts for half the proportion at which the first pixels influence the second area AR2 with transmitted light, the area classifying unit 20 assigns the transmittance coefficient "0.5" assigned to the two transmittance coefficient pixels IPX arranged in the column direction (longitudinal direction) between the two corners of the transmittance coefficient information 53 to the second area AR2 (in other words, to each of the second pixels PX2 (2, 0) and PX2 (2, 1) included in the second area AR2).

Since the third area AR3 is the non-overlapping area NOA overlapping only the first pixel PX1b among the four first pixels PX1a, PX1b, PX1c, and PX1d in the first liquid crystal panel PN1, the third area AR3 mainly receives only the transmitted light from the first pixel PX1b. For this reason, the area classifying unit 20 assigns the transmittance coefficient "1.0", which is the maximum transmittance coefficient assigned to the 2×2 transmittance coefficient pixels IPX at the center of the transmittance coefficient information 53, to the third area AR3 (in other words, to each of the second pixels PX2 (3, 0), PX2 (4, 0), PX2 (3, 1), and PX2 (4, 1) included in the third area AR3).

The fifth area AR5 is the overlapping area OA overlapping the edges of all four first pixels PX1a, PX1b, PX1c, and PX1d of the first liquid crystal panel PN1 as described above, and thus mainly receives transmitted light from the four first pixels PX1a, PX1b, PX1c, and PX1d. Since the proportion at which the one first pixel PX1b among the four first pixels PX1a, PX1b, PX1c, and PX1d influences the fifth area AR5 with transmitted light is 1/4, the area classifying unit 20 assigns the transmittance coefficient "0.25" assigned to the transmittance coefficient pixel IPX located at the corner of the transmittance coefficient information 53 to the fifth area AR5 (in other words, to the second pixel PX2 (2, 2) included in the fifth area AR5).

The sixth area AR6 is the overlapping area OA overlapping both the edges of the first pixel PX1b and the first pixel PX1d adjacent to each other in the column direction (longitudinal direction) among the four first pixels PX1a, PX1b, PX1c, and PX1d in the first liquid crystal panel PN1, and thus mainly receives transmitted light from the two first pixels PX1b and PX1d. Since the one first pixel PX1b of the two first pixels PX1b and PX1d accounts for half the proportion at which the first pixels influence the sixth area AR6 with transmitted light, the area classifying unit 20 assigns the transmittance coefficient "0.5" assigned to the two transmittance coefficient pixels IPX arranged in the row direction (lateral direction) between the two corners of the transmittance coefficient information 53 to the sixth area AR6 (in other words, to each of the second pixels PX2 (3, 2) and PX2 (4, 2) included in the sixth area AR6). The transmittance coefficient "0.5" is the number obtained by dividing the maximum transmittance coefficient "1.0" by 2, which is the number of pixels (the first pixel PX1b and the first pixel PX1d) that influence the sixth area AR6 with transmitted light.

Figure 12:
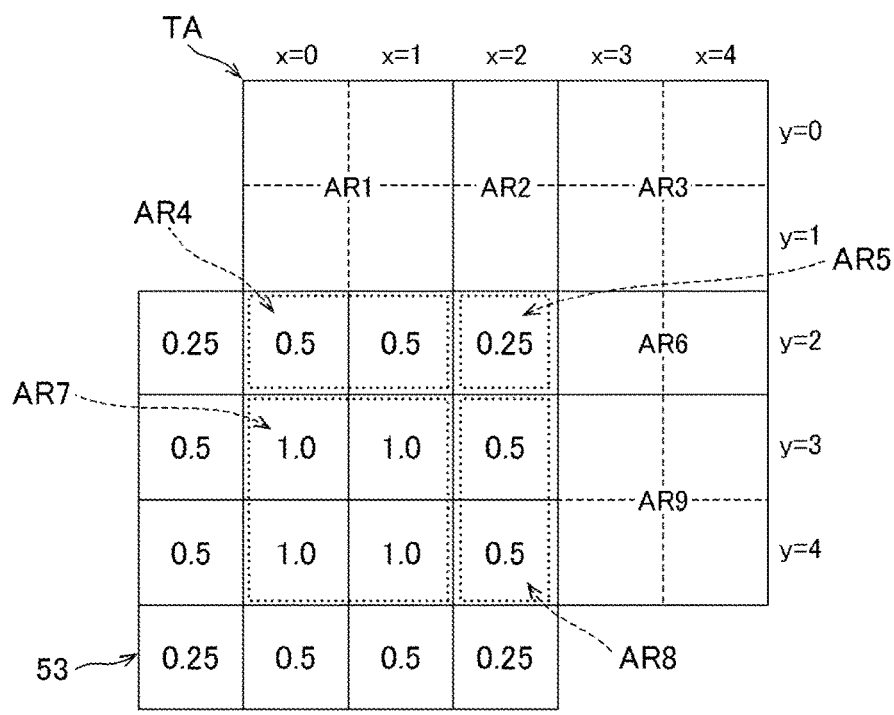
FIG. 12 is a diagram illustrating a state in which transmittance coefficients are assigned to the fourth area, the fifth area, a seventh area, and an eighth area according to the first embodiment.

FIG. 12 is a diagram illustrating a state in which transmittance coefficients are assigned to the fourth area AR4, the fifth area AR5, the seventh area AR7, and the eighth area AR8 according to the first embodiment.

As illustrated in FIGS. 8 and 12, the area classifying unit 20 assigns a transmittance coefficient indicating the proportion of influence of transmitted light from the first pixel PX1b to each of the fourth area AR4, the fifth area AR5, the seventh area AR7, and the eighth area AR8 in the study target area TA that are influenced with transmitted light by the first pixel PX1c of the first liquid crystal panel PN1, based on the transmittance coefficient information 53.

As described above, the fourth area AR4 is the overlapping area OA overlapping each of the first pixel PX1a and the first pixel PX1c adjacent to each other in the column direction (longitudinal direction), and mainly receives transmitted light from the two first pixels PX1a and PX1c. Since the one first pixel PX1c of the two first pixels PX1a and PX1c accounts for half the proportion at which the first pixels influence the fourth area AR4 with transmitted light, the area classifying unit 20 assigns the transmittance coefficient "0.5" assigned to the two transmittance coefficient pixels IPX arranged in the row direction (lateral direction) between the two corners of the transmittance coefficient information 53 to the fourth area AR4 (in other words, to each of the second pixels PX2 (0, 2) and PX2 (1, 2) included in the fourth area AR4).

The fifth area AR5 is the overlapping area OA overlapping the edges of all four first pixels PX1a, PX1b, PX1c, and PX1d of the first liquid crystal panel PN1 as described above, and thus mainly receives transmitted light from the four first pixels PX1a, PX1b, PX1c, and PX1d. Since the proportion at which the one first pixel PX1c among the four first pixels PX1a, PX1b, PX1c, and PX1d influences the fifth area AR5 with transmitted light is 1/4, the area classifying unit 20 assigns the transmittance coefficient "0.25" assigned to the transmittance coefficient pixel IPX located at the corner of the transmittance coefficient information 53 to the fifth area AR5 (in other words, to the second pixel PX2 (2, 2) included in the fifth area AR5).

Since the seventh area AR7 is the non-overlapping area NOA overlapping only the first pixel PX1c among the four first pixels PX1a, PX1b, PX1c, and PX1d in the first liquid crystal panel PN1, the seventh area AR7 mainly receives only the transmitted light from the first pixel PX1c. For this reason, the area classifying unit 20 assigns the transmittance coefficient "1.0", which is the maximum transmittance coefficient assigned to the 2×2 transmittance coefficient pixels IPX at the center of the transmittance coefficient information 53, to the seventh area AR7 (in other words, to each of the second pixels PX2 (0, 3), PX2 (1, 3), PX2 (0, 4), and PX2 (1, 4) included in the seventh area AR7).

The eighth area AR8 is the overlapping area OA overlapping both the edges of the first pixel PX1c and the first pixel PX1d adjacent to each other in the row direction (lateral direction) among the four first pixels PX1a, PX1b, PX1c, and PX1d in the first liquid crystal panel PN1, and thus mainly receives transmitted light from the two first pixels PX1c and PX1d. Since the one first pixel PX1c of the two first pixels PX1c and PX1d accounts for half the proportion at which the first pixels influence the eighth area AR8 with transmitted light, the area classifying unit 20 assigns the transmittance coefficient "0.5" assigned to the two transmittance coefficient pixels IPX arranged in the column direction (longitudinal direction) between the two corners of the transmittance coefficient information 53 to the eighth area AR8 (in other words, to each of the second pixels PX2 (2, 3) and PX2 (2, 4) included in the eighth area AR8). The transmittance coefficient "0.5" is the number obtained by dividing the maximum transmittance coefficient "1.0" by 2, which is the number of pixels (the first pixel PX1c and the first pixel PX1d) that influence the eighth area AR8 with transmitted light.

Figure 13:
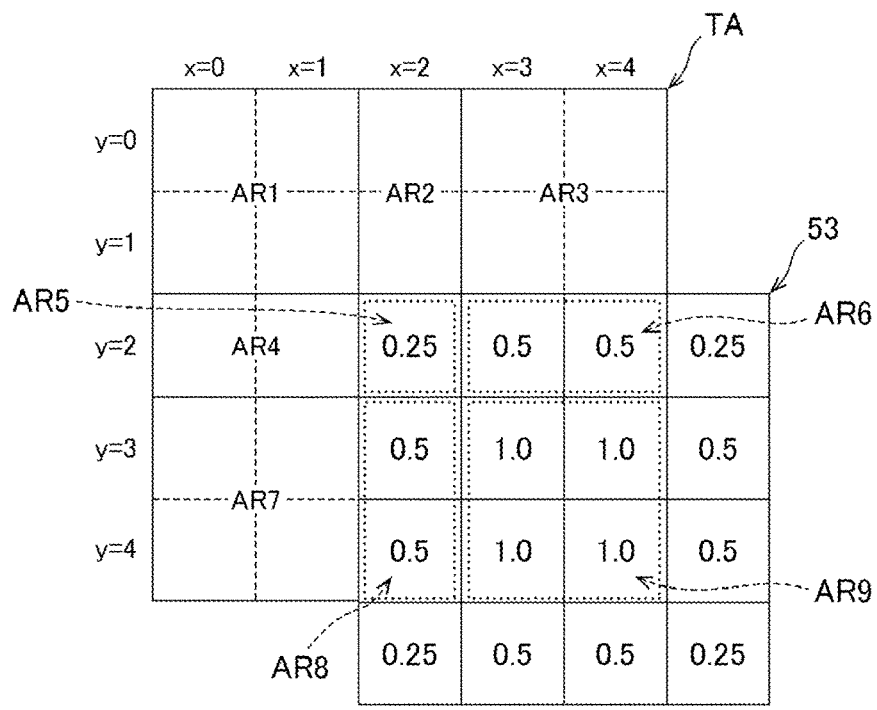
FIG. 13 is a diagram illustrating a state in which transmittance coefficients are assigned to the fifth area, the sixth area, the eighth area, and a ninth area according to the first embodiment.

FIG. 13 is a diagram illustrating a state in which transmittance coefficients are assigned to the fifth area AR5, the sixth area AR6, the eighth area AR8, and the ninth area AR9 according to the first embodiment.

As illustrated in FIGS. 8 and 13, the area classifying unit 20 assigns a transmittance coefficient indicating the proportion of influence of transmitted light from the first pixel PX1d to each of the fifth area AR5, the sixth area AR6, the eighth area AR8, and the ninth area AR9 in the study target area TA that are influenced with transmitted light by the first pixel PX1d of the first liquid crystal panel PN1, based on the transmittance coefficient information 53.

The fifth area AR5 is the overlapping area OA overlapping the edges of all four first pixels PX1a, PX1b, PX1c, and PX1d of the first liquid crystal panel PN1 as described above, and thus mainly receives transmitted light from the four first pixels PX1a, PX1b, PX1c, and PX1d. Since the proportion at which the one first pixel PX1d among the four first pixels PX1a, PX1b, PX1c, and PX1d influences the fifth area AR5 with transmitted light is 1/4, the area classifying unit 20 assigns the transmittance coefficient "0.25" assigned to the transmittance coefficient pixel IPX located at the corner of the transmittance coefficient information 53 to the fifth area AR5 (in other words, to the second pixel PX2 (2, 2) included in the fifth area AR5).

As described above, the sixth area AR6 is the overlapping area OA overlapping each of the first pixel PX1b and the first pixel PX1d adjacent to each other in the column direction (longitudinal direction), and mainly receives transmitted light from the two first pixels PX1b and PX1d. Since the one first pixel PX1d of the two first pixels PX1b and PX1d accounts for half the proportion at which the first pixels influence the sixth area AR6 with transmitted light, the area classifying unit 20 assigns the transmittance coefficient "0.5" assigned to the two transmittance coefficient pixels IPX arranged in the row direction (lateral direction) between the two corners of the transmittance coefficient information 53 to the sixth area AR6 (in other words, to each of the second pixels PX2 (3, 2) and PX2 (4, 2) included in the sixth area AR6).

As described above, the eighth area AR8 is the overlapping area OA overlapping each of the first pixel PX1c and the first pixel PX1d adjacent to each other in the row direction (lateral direction), and mainly receives transmitted light from the two first pixels PX1c and PX1d. Since the one first pixel PX1c of the two first pixels PX1c and PX1d accounts for half the proportion at which the first pixels influence the eighth area AR8 with transmitted light, the area classifying unit 20 assigns the transmittance coefficient "0.5" assigned to the two transmittance coefficient pixels IPX arranged in the column direction (longitudinal direction) between the two corners of the transmittance coefficient information 53 to the eighth area AR8 (in other words, to each of the second pixels PX2 (2, 3) and PX2 (2, 4) included in the eighth area AR8).

Since the ninth area AR9 is the non-overlapping area NOA overlapping only the first pixel PX1d among the four first pixels PX1a, PX1b, PX1c, and PX1d in the first liquid crystal panel PN1, the ninth area AR9 mainly receives only the transmitted light from the first pixel PX1d. For this reason, the area classifying unit 20 assigns the transmittance coefficient "1.0", which is the maximum transmittance coefficient assigned to the 2×2 transmittance coefficient pixels IPX at the center of the transmittance coefficient information 53, to the ninth area AR9 (in other words, to each of the second pixels PX2 (3, 3), PX2 (4, 3), PX2 (3, 4), and PX2 (4, 4) included in the ninth area AR9).

Figure 14:
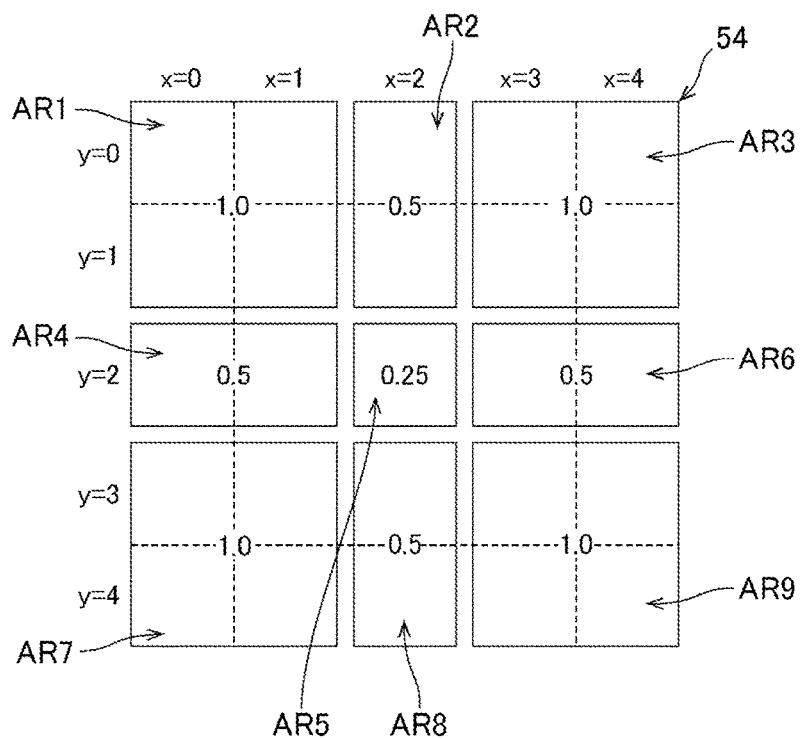
FIG. 14 is a diagram illustrating area transmittance coefficient information according to the first embodiment.

FIG. 14 is a diagram illustrating the area transmittance coefficient information 54 according to the first embodiment. The area classifying unit 20 generates the area transmittance coefficient information 54 in which the transmittance coefficients are assigned to each of the first area AR1 to the ninth area AR9 in the study target area TA as described with reference to FIGS. 10 to 13. In the area transmittance coefficient information 54, the transmittance coefficient "1.0" is assigned to the first area AR1, the transmittance coefficient "0.5" is assigned to the second area AR2, the transmittance coefficient "1.0" is assigned to the third area AR3, the transmittance coefficient "0.5" is assigned to the fourth area AR4, the transmittance coefficient "0.25" is assigned to the fifth area AR5, the transmittance coefficient "0.5" is assigned to the sixth area AR6, the transmittance coefficient "1.0" is assigned to the seventh area AR7, the transmittance coefficient "0.5" is assigned to the eighth area AR8, and the transmittance coefficient "1.0" is assigned to the ninth area AR9. The area classifying unit 20 stores the generated area transmittance coefficient information 54 in the storage unit 50.

As described above, the first area AR1 is composed of the second pixels PX2 (0, 0), PX2 (1, 0), PX2 (0, 1), and PX2 (1, 1), in which the first pixels PX1 of the first liquid crystal panel PN1 that are irradiated with transmitted light are identically the first pixel PX1a (FIG. 8) and the proportion of the influence of transmitted light from the first pixel PX1a is equally "1.0" as the transmittance coefficient (FIG. 14). In addition, the second area AR2 is composed of the second pixels PX2 (2, 0) and PX2 (2, 1), in which the first pixels PX1 of the first liquid crystal panel PN1 that are irradiated with transmitted light are identically the first pixel PX1a and the first pixel PX1b (FIG. 8) and the proportion of the influence of transmitted light from each of the first pixel PX1*a* and the first pixel PX1*b* is equally "0.5" as the transmittance coefficient (FIG. 14). The third area AR3 is composed of the second pixels PX2 (3, 0), PX2 (4, 0), PX2 (3, 1), and PX2 (4, 1), in which the first pixels PX1 of the first liquid crystal panel PN1 that are irradiated with transmitted light are identically the first pixel PX1*b* (FIG. 8) and the proportion of the influence of transmitted light from the first pixel PX1*b* is equally "1.0" as the transmittance coefficient (FIG. 14).

The fourth area AR4 is composed of the second pixels PX2 (0, 2) and PX2 (1, 2), in which the first pixels PX1 of the first liquid crystal panel PN1 that are irradiated with transmitted light are identically the first pixel PX1*a* and the first pixel PX1*c* (FIG. 8) and the proportion of the influence of transmitted light from each of the first pixel PX1*a* and the first pixel PX1*c* is equally "0.5" as the transmittance coefficient (FIG. 14). In addition, the fifth area AR5 is composed of the one second pixel PX2 (2, 2), in which the first pixels PX1 of the first liquid crystal panel PN1 that are irradiated with transmitted light are identically the first pixel PX1*a*, the first pixel PX1*b*, the first pixel PX1*c*, and the first pixel PX1*d* (FIG. 8) and the proportion of the influence of transmitted light from each of the first pixel PX1*a*, the first pixel PX1*b*, the first pixel PX1*c*, and the first pixel PX1*d* is equally "0.25" as the transmittance coefficient (FIG. 14). The sixth area AR6 is composed of the second pixels PX2 (3, 2) and PX2 (4, 2), in which the first pixels PX1 of the first liquid crystal panel PN1 that are irradiated with transmitted light are identically the first pixel PX1*b* and the first pixel PX1*d* (FIG. 8) and the proportion of the influence of transmitted light from the first pixel PX1*b* and the first pixel PX1*d* is equally "0.5" as the transmittance coefficient (FIG. 14).

The seventh area AR7 is composed of the second pixels PX2 (0, 3), PX2 (1, 3), PX2 (0, 4), and PX2 (1, 4), in which the first pixels PX1 of the first liquid crystal panel PN1 that are irradiated with transmitted light are identically the first pixel PX1*c* (FIG. 8) and the proportion of the influence of transmitted light from the first pixel PX1*c* is equally "1.0" as the transmittance coefficient (FIG. 14). In addition, the eighth area AR8 is composed of the second pixels PX2 (2, 3) and PX2 (2, 4), in which the first pixels PX1 of the first liquid crystal panel PN1 that are irradiated with transmitted light are identically the first pixel PX1*c* and the first pixel PX1*d* (FIG. 8) and the proportion of the influence of transmitted light from each of the first pixel PX1*c* and the first pixel PX1*d* is equally "0.5" as the transmittance coefficient (FIG. 14). The ninth area AR9 is composed of the second pixels PX2 (3, 3), PX2 (4, 3), PX2 (3, 4), and PX2 (4, 4), in which the first pixels PX1 of the first liquid crystal panel PN1 that are irradiated with transmitted light are identically the first pixel PX1*d* (FIG. 8) and the proportion of the influence of transmitted light from the first pixel PX1*d* is equally "1.0" as the transmittance coefficient (FIG. 14).

As described above, the areas (the first area AR1 to the ninth area AR9) classified by the area classifying unit 20 can be expressed as areas each composed of at least one second pixel PX2 of the second liquid crystal panel PN2, in which the first pixels PX1 of the first liquid crystal panel PN1 that are irradiated with transmitted light are identical and the proportion of the influence of transmitted light from the first pixels PX1 is equal.

Figure 15:
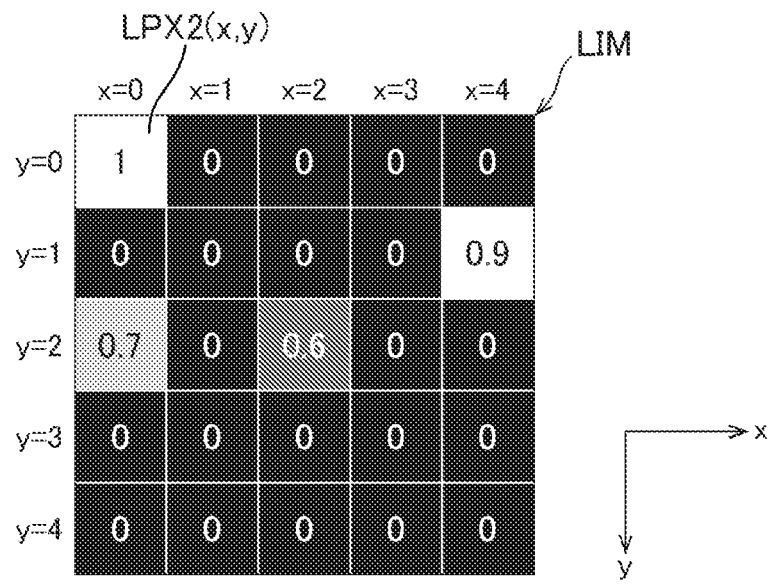
FIG. 15 is a diagram illustrating a luminance image according to the first embodiment.

FIG. 15 is a diagram illustrating a luminance image LIM according to the first embodiment. The luminance image generation unit 11 (see FIG. 7) generates a luminance image LIM representing luminance values corresponding to each of the plurality of pixels PX2 (*x*, *y*) of the second liquid crystal panel PN2 based on an input image Sin input from the outside. The luminance image generation unit 11 generates the luminance image LIM by acquiring luminance components of each of the plurality of second pixels PX2 (*x*, *y*) from the input image Sin. The luminance image LIM includes 5×5 luminance pixels LPX2 (*x*, *y*) which are pixels corresponding to each of the plurality of second pixels PX2 (*x*, *y*) of the study target area TA. The luminance pixels LPX2 (*x*, *y*) are associated with luminance values that are luminance components of the input image Sin. For example, the luminance values are normalized with the maximum value being "1". The luminance value "1" is the brightest, and the luminance value "0" is the darkest. In the example shown in FIG. 15, the luminance pixel LPX2 (0, 0) is associated with the luminance value "1", the luminance pixel LPX2 (4, 1) is associated with the luminance value "0.9", the luminance pixel LPX2 (0, 2) is associated with the luminance value "0.7", the luminance pixel LPX2 (2, 2) is associated with the luminance value "0.6", and the other luminance pixels LPX2 (x, y) are associated with the luminance value "0".

Figure 16:
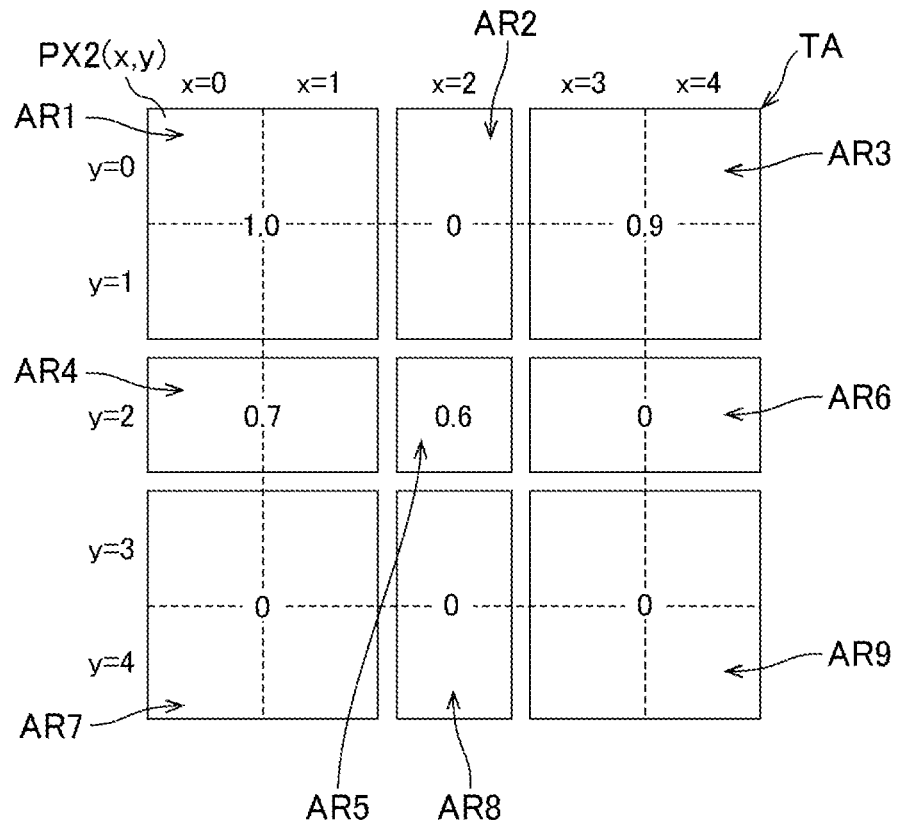
FIG. 16 is a diagram illustrating a study target area in which luminance values are associated with each of a plurality of areas according to the first embodiment.

FIG. 16 is a diagram illustrating a study target area TA in which the luminance values are associated with each of a plurality of areas according to the first embodiment. As illustrated in FIGS. 15 and 16, the maximum luminance setting unit 13 (FIG. 7) sets each of the first area AR1 to the ninth area AR9 in the study target area TA in association with the maximum luminance value that is the highest value among the luminance values of the corresponding areas in the luminance image LIM based on the luminance image LIM (FIG. 15) acquired from the luminance image generation unit 11 and the area classification information 52.

In particular, for example, the maximum luminance setting unit 13 refers to the luminance values associated with each of the luminance pixels LPX2 (0, 0), LPX2 (1, 0), LPX2 (0, 1), and LPX2 (1, 1) in the luminance image LIM corresponding to the coordinates of each of the second pixels PX2 (0, 0), PX2 (1, 0), PX2 (0, 1), and PX2 (1, 1) included in the first area AR1 as illustrated in FIGS. 15 and 16. Then, the maximum luminance setting unit 13 acquires, as the maximum luminance value, the luminance value "1" associated with the luminance pixel LPX2 (0, 0), which is the highest value among the luminance values associated with each of the luminance pixels LPX2 (0, 0), LPX2 (1, 0), LPX2 (0, 1), and LPX2 (1, 1), and associates the maximum luminance value "1" with the first area AR1. In addition, the maximum luminance setting unit 13 acquires x=0 and y=0 that are the coordinates of the luminance pixel LPX2 (0, 0) associated with the luminance value "1", associates the first area AR1 with the maximum luminance value "1" and the coordinates x=0 and y=0, and stores the associated values in the storage unit 50 as the area luminance value information 55.

In addition, the maximum luminance setting unit 13 refers to the luminance values associated with each of the luminance pixels LPX2 (2, 0) and LPX2 (2, 1) in the luminance image LIM corresponding to the coordinates of each of the second pixels PX2 (2, 0) and PX2 (2, 1) included in the second area AR2. Then, the maximum luminance setting unit 13 acquires the highest value among the luminance values associated with each of the luminance pixels LPX2 (2, 0) and LPX2 (2, 1) as a maximum luminance value. Here, since the luminance value "0" is associated with both the luminance pixels LPX2 (2, 0) and LPX2 (2, 1), the maximum luminance setting unit 13 acquires the luminance value "0" as a maximum luminance value, and associates the maximum luminance value "0" with the second area AR2. In addition, the maximum luminance setting unit 13 acquires the coordinates of one of the luminance pixel LPX2 (2, 0) and the luminance pixel LPX2 (2, 1) to which the luminance value "0" is assigned, for example, x=2 and y=0 which are the coordinates of the luminance pixel LPX2 (2, 0), associates the second area AR2 with the maximum luminance value "0" and the coordinates x=2 and y=0, and stores the associated values in the storage unit 50 as the area luminance value information 55.

In addition, the maximum luminance setting unit 13 refers to the luminance values associated with each of the luminance pixels LPX2 (3, 0), LPX2 (4, 0), LPX2 (3, 1), and LPX2 (4, 1) in the luminance image LIM corresponding to the coordinates of each of the second pixels PX2 (3, 0), PX2 (4, 0), PX2 (3, 1), and PX2 (4, 1) included in the third area AR3. Then, the maximum luminance setting unit 13 acquires, as the maximum luminance value, the luminance value "0.9" assigned to the luminance pixel LPX2 (4, 1), which is the highest value among the luminance values associated with each of the luminance pixels LPX2 (3, 0), LPX2 (4, 0), LPX2 (3, 1), and LPX2 (4, 1), and associates the maximum luminance value "0.9" with the third area AR3. In addition, the maximum luminance setting unit 13 acquires x=4 and y=1 that are the coordinates of the luminance pixel LPX2 (4, 1) associated with the luminance value "0.9", associates the third area AR3 with the maximum luminance value "0.9" and the coordinates x=4 and y=1, and stores the associated values in the storage unit 50 as the area luminance value information 55.

In addition, the maximum luminance setting unit 13 refers to the luminance values associated with each of the luminance pixels LPX2 (0, 2) and LPX2 (1, 2) in the luminance image LIM corresponding to the coordinates of each of the second pixels PX2 (0, 2) and PX2 (1, 2) included in the fourth area AR4. Then, the maximum luminance setting unit 13 acquires, as the maximum luminance value, the luminance value "0.7" assigned to the luminance pixel LPX2 (0, 2), which is the highest value among the luminance values associated with each of the luminance pixels LPX2 (0, 2) and LPX2 (1, 2), and associates the maximum luminance value "0.7" with the fourth area AR4. In addition, the maximum luminance setting unit 13 acquires x=0 and y=2 that are the coordinates of the luminance pixel LPX2 (0, 2) assigned to the luminance value "0.7", associates the fourth area AR4 with the maximum luminance value "0.7" and the coordinates x=0 and y=2, and stores the associated values in the storage unit 50 as the area luminance value information 55.

Furthermore, the maximum luminance setting unit 13 refers to the luminance value associated with the luminance pixel LPX2 (2, 2) in the luminance image LIM corresponding to the coordinates of the second pixel PX2 (2, 2) included in the fifth area AR5. Then, since the pixel included in the fifth area AR5 is only the second pixel PX2 (2, 2), the maximum luminance setting unit 13 acquires the luminance value "0.6" associated with the luminance pixel LPX2 (2, 2) as a maximum luminance value and associates the maximum luminance value "0.6" with the fifth area AR5. In addition, the maximum luminance setting unit 13 acquires x=2 and y=2 that are the coordinates of the luminance pixel LPX2 (2, 2) associated with the luminance value "0.6", associates the fifth area AR5 with the maximum luminance value "0.6" and the coordinates x=2 and y=2, and stores the associated values in the storage unit 50 as the area luminance value information 55.

In addition, the maximum luminance setting unit 13 refers to the luminance values associated with each of the luminance pixels LPX2 (3, 2) and LPX2 (4, 2) in the luminance image LIM corresponding to the coordinates of each of the second pixels PX2 (3, 2) and PX2 (4, 2) included in the sixth area AR6. Then, the maximum luminance setting unit 13 acquires the highest value among the luminance values associated with each of the luminance pixels LPX2 (3, 2) and LPX2 (4, 2) as a maximum luminance value. Here, since the luminance value "0" is associated with both the luminance pixels LPX2 (3, 2) and LPX2 (4, 2), the maximum luminance setting unit 13 acquires the luminance value "0" as a maximum luminance value, and associates the maximum luminance value "0" with the sixth area AR6. In addition, the maximum luminance setting unit 13 acquires the coordinates of one of the luminance pixel LPX2 (3, 2) and the luminance pixel LPX2 (4, 2) with which the luminance value "0" is associated, for example, x=3 and y=2 which are the coordinates of the luminance pixel LPX2 (3, 2), associates the sixth area AR6 with the maximum luminance value "0" and the coordinates x=3 and y=2, and stores the associated values in the storage unit 50 as the area luminance value information 55.

In addition, the maximum luminance setting unit 13 refers to the luminance values associated with each of the luminance pixels LPX2 (0, 3), LPX2 (1, 3), LPX2 (0, 4), and LPX2 (1, 4) in the luminance image LIM corresponding to the coordinates of each of the second pixels PX2 (0, 3), PX2 (1, 3), PX2 (0, 4), and PX2 (1, 4) included in the seventh area AR7. Then, the maximum luminance setting unit 13 acquires the highest value among the luminance values associated with each of the luminance pixels LPX2 (0, 3), LPX2 (1, 3), LPX2 (0, 4), and LPX2 (1, 4) as a maximum luminance value. Here, since the luminance value "0" is associated with all of the luminance pixels LPX2 (0, 3), LPX2 (1, 3), LPX2 (0, 4), and LPX2 (1, 4), the maximum luminance setting unit 13 acquires the luminance value "0" as the maximum luminance value, and associates the maximum luminance value "0" with the seventh area AR7. In addition, the maximum luminance setting unit 13 acquires the coordinates of any one of the luminance pixels LPX2 (0, 3), LPX2 (1, 3), LPX2 (0, 4), and LPX2 (1, 4) associated with the luminance value "0", for example, x=0 and y=3 which are the coordinates of the luminance pixel LPX2 (0, 3), associates the seventh area AR7 with the maximum luminance value "0" and the coordinates x=0 and y=3, and stores the associated values in the storage unit 50 as the area luminance value information 55.

In addition, the maximum luminance setting unit 13 refers to the luminance values associated with each of the luminance pixels LPX2 (2, 3) and LPX2 (2, 4) in the luminance image LIM corresponding to the coordinates of each of the second pixels PX2 (2, 3) and PX2 (2, 4) included in the eighth area AR8. Then, the maximum luminance setting unit 13 acquires the highest value among the luminance values associated with each of the luminance pixels LPX2 (2, 3) and LPX2 (2, 4) as a maximum luminance value. Here, since the luminance value "0" is associated with both the luminance pixels LPX2 (2, 3) and LPX2 (2, 4), the maximum luminance setting unit 13 acquires the luminance value "0" as a maximum luminance value, and associates the maximum luminance value "0" with the eighth area AR8. In addition, the maximum luminance setting unit 13 acquires the coordinates of one of the luminance pixel LPX2 (2, 3) and the luminance pixel LPX2 (2, 4) with which the luminance value "0" is associated, for example, x=2 and y=3 which are the coordinates of the luminance pixel LPX2 (2, 3), associates the eighth area AR8 with the maximum luminance value "0" and the coordinates x=2 and y=3, and stores the associated values in the storage unit 50 as the area luminance value information 55.

In addition, the maximum luminance setting unit 13 refers to the luminance values associated with each of the luminance pixels LPX2 (3, 3), LPX2 (4, 3), LPX2 (3, 4), and LPX2 (4, 4) in the luminance image LIM corresponding to the coordinates of each of the second pixels PX2 (3, 3), PX2 (4, 3), PX2 (3, 4), and PX2 (4, 4) included in the ninth area AR9. Then, the maximum luminance setting unit 13 acquires the highest value among the luminance values associated with each of the luminance pixels LPX2 (3, 3), LPX2 (4, 3), LPX2 (3, 4), and LPX2 (4, 4) as a maximum luminance value. Here, since the luminance value "0" is associated with all of the luminance pixels LPX2 (3, 3), LPX2 (4, 3), LPX2 (3, 4), and LPX2 (4, 4), the maximum luminance setting unit 13 acquires the luminance value "0" as the maximum luminance value, and associates the maximum luminance value "0" with the ninth area AR9. In addition, the maximum luminance setting unit 13 acquires the coordinates of any one of the luminance pixels LPX2 (3, 3), LPX2 (4, 3), LPX2 (3, 4), and LPX2 (4, 4) associated with the luminance value "0", for example, x=3 and y=3 which are the coordinates of the luminance pixel LPX2 (3, 3), associates the ninth area AR9 with the maximum luminance value "0" and the coordinates x=3 and y=3, and stores the associated values in the storage unit 50 as the area luminance value information 55.

FIG. 17 is a diagram illustrating an overview of the area luminance value information 55 according to the first embodiment. As illustrated in FIG. 17, the order setting unit 14 (see FIG. 7) refers to the area luminance value information 55 stored in the storage unit 50, and sets the order of the first area AR1 to the ninth area AR9 in descending order of maximum luminance values.

In the example shown in FIG. 17, the order of the first area AR1 associated with the highest maximum luminance value "1" is first in order, the order of the third area AR3 associated with the next highest maximum luminance value "0.9" is second in order, the order of the fourth area AR4 associated with the next highest maximum luminance value "0.7" is third in order, and the fifth area AR5 associated with the next highest maximum luminance value "0.6" is fourth in order. Since all of the second area AR2, the sixth area AR6, the seventh area AR7, the eighth area AR8, and the ninth area AR9 are associated with the same maximum luminance value "0", the areas may be arranged in any order, but in the example illustrated in FIG. 12, the order is set such that the areas are arranged in ascending order of area numbers. The order setting unit 14 stores the area luminance value information 55 in which the order of the first area AR1 to the ninth area AR9 is set in descending order of associated maximum luminance values in the storage unit 50.

Figure 18:
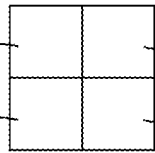
FIG. 18 is a diagram illustrating a state in which a first transmittance setting unit sets a transmittance for each first pixel of a first liquid crystal panel according to the first embodiment.

FIG. 18 is a diagram illustrating a state in which the first transmittance setting unit 15 sets a transmittance for each first pixel PX1 of the first liquid crystal panel PN1 according to the first embodiment. Next, the first transmittance setting unit 15 generates the transmittances of the plurality of first pixels PX1a, PX1b, PX1c, and PX1d in the order set by the order setting unit 14 based on the maximum luminance values associated with the first area AR1 to the ninth area AR9, respectively.

In the initial state, the transmittance of each of the first pixels PX1a to PX1d of the first liquid crystal panel PN1 is not set, and is in a blank state.

Here, among the first pixels PX1 of the first liquid crystal panel PN1, a first pixel PX1 whose transmittance is to be determined is referred to as a pixel of interest. The transmittance of the pixel of interest can be calculated according to the following (Expression 1).

$$\text{Transmittance of a pixel of interest} = \text{insufficient transmittance}/\text{transmittance coefficient} \quad \text{(Expression 1)}$$

Specifically, the above (Expression 1) can be expressed as the following (Expression 2). $\alpha$, $\beta$, $\gamma$, and $\delta$ in the following (Expression 2) are as follows.

$$\text{Transmittance of a pixel of interest} = (\alpha - (\Sigma\beta)\times\gamma)/(\gamma\times\delta) \quad \text{(Expression 2)}$$

$\alpha$: Maximum luminance value
$\beta$: Transmittance of a first pixel PX1 that influences with transmitted light together with the pixel of interest
$\gamma$: Transmittance coefficient
$\delta$: Number of pixels of interest However, when the value of the transmittance of the pixel of interest is equal to or less than 0 (0 or a negative numerical value), the first transmittance setting unit 15 determines that there is no insufficient transmittance and sets the transmittance of the pixel of interest to "0".

In step S1, the first transmittance setting unit 15 calculates the transmittance of the first pixel of interest. The first transmittance setting unit 15 refers to the field first in order in the area luminance value information 55 (FIG. 17) stored in the storage unit 50. Since the first in order in the area luminance value information 55 is the first area AR1 and the coordinates x=0 and y=0 are associated with the maximum luminance value "1", $\alpha$=1 is substituted into the above (Expression 2) based on the maximum luminance value "1".

Then, the first transmittance setting unit 15 refers to the area transmittance coefficient information 54 (FIG. 14), acquires the transmittance coefficient "1.0" associated with the first area AR1, and substitutes $\gamma$=1.0 into the above (Expression 2).

In addition, since the first area AR1 is the non-overlapping area NOA overlapping only the first pixel PX1a among the first pixels PX1a to PX1d, the first transmittance setting unit 15 determines that the pixel of interest is the one first pixel PX1a, substitutes $\delta$=1, determines that there is no first pixel PX1 that influences the first area AR1 with transmitted light together with the pixel of interest, and substitutes $\beta$=0. Therefore, $\Sigma\beta$=0 is satisfied.

The first transmittance setting unit 15 calculates the transmittance of the first pixel PX1a, which is the pixel of interest, from (Expression 2) as follows.

$$(1.0-(0)\times1.0)/(1.0\times1)=1.0$$

That is, since the first area AR1 is the non-overlapping area NOA overlapping only the first pixel PX1a and is not influenced by transmitted light from the first pixels PX1 other than the first pixel PX1a, the first transmittance setting unit 15 sets the maximum luminance value "1" without change as the transmittance of the first pixel PX1a which is the pixel of interest.

Next, in step S2, the first transmittance setting unit 15 calculates the transmittance of the second pixel of interest. The first transmittance setting unit 15 refers to the field second in order in the area luminance value information 55 (FIG. 17) stored in the storage unit 50. Since the second in order in the area luminance value information 55 is the third area AR3 and the coordinates x=4 and y=0 are associated with the maximum luminance value "0.9", $\alpha$=0.9 is substituted into the above (Expression 2) based on the maximum luminance value "0.9".

Then, the first transmittance setting unit 15 refers to the area transmittance coefficient information 54 (FIG. 14), acquires the transmittance coefficient "1.0" associated with the third area AR3, and substitutes γ=1.0 into the above (Expression 2).

Since the third area AR3 is the non-overlapping area NOA overlapping only the first pixel PX1b among the first pixels PX1a to PX1d, the first transmittance setting unit 15 determines that the pixel of interest is the one first pixel PX1b, substitutes δ=1, determines that there is no first pixel PX1 that influences the third area AR3 with transmitted light together with the pixel of interest, and substitutes β=0. Therefore, Σβ=0 is satisfied.

The first transmittance setting unit 15 calculates the transmittance of the first pixel PX1b, which is the pixel of interest, from (Expression 2) as follows.

$$(0.9-(0)\times 1.0)/(1.0\times 1)=0.9$$

That is, since the third area AR3 is the non-overlapping area NOA overlapping only the first pixel PX1b and is not influenced by transmitted light from the first pixels PX1 other than the first pixel PX1b, the first transmittance setting unit 15 sets the maximum luminance value "0.9" without change as the transmittance of the first pixel PX1b which is the pixel of interest.

Next, in step S3, the first transmittance setting unit 15 calculates the transmittance of the third pixel of interest. The first transmittance setting unit 15 refers to the field third in order in the area luminance value information 55 (FIG. 17) stored in the storage unit 50. Since the third in order in the area luminance value information 55 is the fourth area AR4 and the coordinates x=0 and y=2 are associated with the maximum luminance value "0.7", α=0.7 is substituted into the above (Expression 2) based on the maximum luminance value "0.7".

Then, the first transmittance setting unit 15 refers to the area transmittance coefficient information 54 (FIG. 14), acquires the transmittance coefficient "0.5" associated with the fourth area AR4, and substitutes γ=0.5 into the above (Expression 2).

In addition, since the fourth area AR4 is the non-overlapping area NOA overlapping both the first pixel PX1a and the first pixel PX1c among the first pixels PX1a to the first pixel PX1d, the fourth area AR4 is influenced by transmitted light from both the first pixel PX1a and the first pixel PX1c. Since the transmittance of the first pixel PX1a among the first pixels PX1a and PX1c has already been set in step S1 (FIG. 18), the first transmittance setting unit 15 determines the one first pixel PX1c for which no transmittance has been set as a pixel of interest and substitutes δ=1, and since the transmittance of the first pixel PX1a that influences the fourth area AR4 with transmitted light together with the first pixel PX1c as the pixel of interest is 1.0, substitutes β=1.0. Therefore, Σβ=1.0 is satisfied.

The first transmittance setting unit 15 calculates the transmittance of the first pixel PX1c, which is the pixel of interest, from (Expression 2) as follows.

$$(0.7-(1.0)\times 0.5)/(0.5\times 1)=0.4$$

As described above, among the first pixel PX1a and the first pixel PX1c (FIG. 8) overlapping the fourth area AR4 that is the overlapping area OA, the first transmittance setting unit 15 sets, as the transmittance of the first pixel PX1c that is the pixel of interest, an insufficient value of the transmittance of the first pixel PX1a for which the transmittance has already been set to influence the fourth area AR4 for the maximum luminance value "0.7" (FIG. 17) associated with the fourth area AR4.

Specifically, the first transmittance setting unit 15 multiplies the transmittance coefficient "0.5" (FIG. 14) indicating the proportion at which the first pixel PX1a influences the fourth area AR4 with transmitted light by the transmittance "1.0" (FIG. 18) of the first pixel PX1a for which the transmittance has already been set among the first pixel PX1a and the first pixel PX1c overlapping the fourth area AR4 which is the overlapping area OA, thereby obtaining the transmittance "0.5" ("1.0"×"0.5") at which the first pixel PX1a influences the fourth area AR4.

As a result, it can be seen that whereas the transmittance required for the fourth area AR4 is the maximum luminance value "0.7" (FIG. 17), the first pixel PX1a for which the transmittance has already been set influences the fourth area AR4 at the transmittance "0.5".

Thus, the first transmittance setting unit 15 divides the value "0.2", which is obtained by subtracting the transmittance "0.5" at which the one first pixel PX1a influences the fourth area AR4 for transmittance from the maximum luminance value "0.7" which is the transmittance required for the fourth area AR4, by the value "0.5" (the transmittance coefficient "0.5"×the number of pixels of interest "1.0") indicating the proportion at which the one first pixel PX1c as the pixel of interest influences the fourth area AR4 with transmitted light, thereby obtaining the "insufficient value" "0.4". The first transmittance setting unit 15 sets "0.4", which is the "insufficient value", as the transmittance of the first pixel PX1c.

In this way, the first transmittance setting unit 15 sets the transmittance of the first pixel PX1c, which is the pixel of interest for which the transmittance is to be set, among the plurality of first pixels PX1 of the first liquid crystal panel PN1, in the order set for the fourth area AR4, which is the overlapping area OA overlapping the first pixel PX1c, among the first area AR1 to the ninth area AR9, based on the maximum luminance value associated with the fourth area AR4 overlapping the first pixel PX1c.

In particular, the first transmittance setting unit 15 sets the transmittance of the first pixel PX1c, which is the pixel of interest, among the first pixels PX1a and PX1c overlapping the fourth area AR4, which is the overlapping area OA, based on the transmittance coefficient "0.5" (FIG. 14) indicating the proportion at which each of the first pixels PX1a and PX1c overlapping the fourth area AR4, which is the overlapping area OA, influences the fourth area AR4 with transmitted light.

As a result, the image processing device 10 according to the first embodiment can prevent the transmittance of the first pixel PX1 (for example, the first pixel PX1c) from being set higher than necessary, as compared to an image processing device that independently sets the transmittances of other pixels without considering the degree at which some pixels, among a plurality of pixels that influence the overlapping area with transmitted light, influence the overlapping area with transmitted light, regardless of whether the transmittances of these some pixels has been set. For this reason, according to the image processing device 10 of the first embodiment, it is possible to curb black floating in which black images are displayed brighter than they should.

Next, in step S4, the first transmittance setting unit 15 calculates the transmittance of the fourth pixel of interest. The first transmittance setting unit 15 refers to the field fourth in order in the area luminance value information 55 (FIG. 17) stored in the storage unit 50. Since the fourth in order in the area luminance value information 55 is the fifth area AR5 and the coordinates x=2 and y=2 are associated with the maximum luminance value "0.6", α=0.6 is substituted into the above (Expression 2) based on the maximum luminance value "0.6".

Then, the first transmittance setting unit 15 refers to the area transmittance coefficient information 54 (FIG. 14), acquires the transmittance coefficient "0.25" associated with the fifth area AR5, and substitutes γ=0.25 into the above (Expression 2).

In addition, since the fifth area AR5 is the overlapping area OA overlapping all of the four first pixel PX1$a$ to the first pixel PX1$d$, the fifth area AR5 is influenced by transmitted light from all of the four first pixel PX1$a$ to the first pixel PX1$d$. Since the transmittances of the first pixel PX1$a$, the first pixel PX1$b$, and the first pixel PX1$c$ among the first pixels PX1$a$ to PX1$d$ have already been set in steps S1 to S3 (FIG. 18), the first transmittance setting unit 15 determines the one first pixel PX1$d$ for which no transmittance has been set as a pixel of interest and substitutes δ=1, and since the transmittances of the first pixel PX1$a$, the first pixel PX1$b$, and the first pixel PX1$c$ that influence the fifth area AR5 with transmitted light together with the first pixel PX1$d$ as the pixel of interest are 1.0, 0.9, and 0.4 (FIG. 18), substitutes Σβ=1.0+0.9+0.4.

The first transmittance setting unit 15 calculates the transmittance of the first pixel PX1$d$, which is the pixel of interest, from (Expression 2) as follows.

(0.6−(1.0+0.9+0.4)×0.25)/(0.25×1)=0.1

As described above, among the first pixel PX1$a$, the first pixel PX1$b$, the first pixel PX1$c$, and the first pixel PX1$d$ (FIG. 8) overlapping the fifth area AR5 that is the overlapping area OA, the first transmittance setting unit 15 sets, as the transmittance of the first pixel PX1$d$ that is the pixel of interest, an insufficient value of the transmittances of the first pixel PX1$a$, the first pixel PX1$b$, and the first pixel PX1$c$ for which the transmittances have already been set to influence the fifth area AR5 for the maximum luminance value "0.6" (FIG. 17) associated with the fifth area AR5.

To be more specific, the first transmittance setting unit 15 sums up the transmittance "1.0" of the first pixel PX1$a$, the transmittance "0.9" of the first pixel PX1$b$, and the transmittance "0.4" of the first pixel PX1$c$ (FIG. 18) for which the transmittances have already been set among the first pixels PX1$a$, PX1$b$, PX1$c$, and PX1$d$ overlapping the fifth area AR5 that is the overlapping area OA, and multiplies the sum by the transmittance coefficient "0.25" (FIG. 14) indicating the proportion at which the first pixels PX1$a$, PX1$b$, and PX1$c$ influence the fifth area AR5 with transmitted light, thereby obtaining the transmittance "0.575" (=("1.0"+ "0.9"+"0.4")×"0.25") at which the first pixels PX1$a$, PX1$b$, and PX1$c$ influence the fifth area AR5.

As a result, it can be seen that whereas the transmittance required for the fifth area AR5 is the maximum luminance value "0.6" (FIG. 17), the first pixels PX1$a$, PX1$b$, and PX1$c$ for which the transmittances have already been set influence the fifth area AR5 at the transmittance "0.575".

Thus, the first transmittance setting unit 15 divides the value "0.025", which is obtained by subtracting the transmittance "0.575" at which the first pixels PX1$a$, PX1$b$, and PX1$c$ influence the fifth area AR5 for transmittance from the maximum luminance value "0.6" which is the transmittance required for the fifth area AR5, by the value "0.25" (the transmittance coefficient "0.25"×the number of pixels of interest "1.0") indicating the proportion at which the one first pixel PX1$d$ as the pixel of interest influences the fifth area AR5 with transmitted light, thereby obtaining the "insufficient value" "0.1". The first transmittance setting unit 15 sets "0.1", which is the "insufficient value", as the transmittance of the first pixel PX1$d$.

In this way, the first transmittance setting unit 15 sets the transmittance of the first pixel PX1$d$, which is the pixel of interest for which the transmittance is to be set, among the plurality of first pixels PX1 of the first liquid crystal panel PN1, in the order set for the fifth area AR5, which is the overlapping area OA overlapping the first pixel PX1$d$, among the first area AR1 to the ninth area AR9, based on the maximum luminance value associated with the fifth area AR5 overlapping the first pixel PX1$d$.

In particular, the first transmittance setting unit 15 sets the transmittance of the first pixel PX1$d$, which is the pixel of interest, among the first pixel PX1$a$, the first pixel PX1$b$, the first pixel PX1$c$, and the first pixel PX1$d$ overlapping the fifth area AR5, which is the overlapping area OA, based on the transmittance coefficient "0.25" (FIG. 14) indicating the proportion at which each of the first pixel PX1$a$, the first pixel PX1$b$, the first pixel PX1$c$, and the first pixel PX1$d$ overlapping the fifth area AR5 influences the fifth area AR5 with transmitted light.

As a result, according to the image processing device 10 of the present embodiment, it is possible to prevent the transmittance of a first pixel PX1 (for example, the first pixel PX1$d$) from being set higher than necessary, as compared to an image processing device that independently sets the transmittances of a plurality of pixels that influence an overlapping area with transmitted light. For this reason, according to the image processing device 10 of the present embodiment, it is possible to curb black floating in which black images are displayed brighter than they should.

Going through step S1 to step S4 shown in FIG. 18, the first transmittance setting unit 15 generates the first liquid crystal panel display signal 56 for setting the transmittance "1.0" for the first pixel PX1$a$, the transmittance "0.9" for the first pixel PX1$b$, the transmittance "0.4" for the first pixel PX1$c$, and the transmittance "0.1" for the first pixel PX1$d$, and stores the generated first liquid crystal panel display signal 56 in the storage unit 50.

In addition, the first transmittance setting unit 15 outputs the first liquid crystal panel display signal 56 to the first liquid crystal panel PN1, thereby driving the first pixel PX1$a$, the first pixel PX1$b$, the first pixel PX1$c$, and the first pixel PX1$d$ to have the transmittances set in the first liquid crystal panel display signal 56 of "1.0", "0.9", "0.4", and "0.1", respectively. Furthermore, the first transmittance setting unit 15 outputs the first liquid crystal panel display signal 56 to the first luminance distribution generation unit 16.

FIG. 19 is a diagram illustrating the first luminance distribution 57 according to the first embodiment. When the first luminance distribution generation unit 16 (FIG. 7) acquires the first liquid crystal panel display signal 56 from the first transmittance setting unit 15, the first luminance distribution generation unit 16 generates the first luminance distribution 57, which is information indicating a percentage of light transmitted through the first liquid crystal panel PN1 for each of the plurality of second pixels PX2 ($x$, $y$), based on the transmittance set for each of the plurality of first pixels PX1.

As illustrated in FIG. 19, in the first luminance distribution 57, percentages of light from the backlight BL transmitted by the first liquid crystal panel PN1 are assigned to each second pixel PX2 ($x$, $y$). In other words, the first luminance distribution 57 indicates the intensity of light received from one or more first pixels PX1 that each second pixel PX2 ($x$, $y$) faces. The percentage "100%" is the maximum value of the intensity of light from the backlight BL that each first pixel PX1 can transmit.

For example, the first luminance distribution generation unit 16 generates the first luminance distribution 57 by convolving the transmittance of each first pixel PX1 of the first liquid crystal panel PN1 with a "point spread function (PSF)" indicating how light spreads from each first pixel PX1 to the second liquid crystal panel PN2. After generating the first luminance distribution 57, the first luminance distribution generation unit 16 outputs the first luminance distribution 57 to the second transmittance setting unit 17 (FIG. 7).

Further, while the first liquid crystal panel display signal 56 is data of the resolution of the first liquid crystal panel PN1 (data of the transmittance set for each of the plurality of first pixels PX1), the first luminance distribution 57 is data of the resolution of the second liquid crystal panel PN2 (data of the percentages of light set for each of the plurality of second pixels PX2).

FIG. 20 is a diagram illustrating the second liquid crystal panel display signal 58 according to the first embodiment. When the second transmittance setting unit 17 (FIG. 7) acquires the first luminance distribution 57 from the first transmittance setting unit 15, the second transmittance setting unit 17 corrects the input image Sin based on the first luminance distribution 57 and generates the second liquid crystal panel display signal 58 in which the transmittance of each of the plurality of second pixels PX2 of the second liquid crystal panel PN2 is set. For example, the second transmittance setting unit 17 generates the luminance image LIM (FIG. 15) based on the input image Sin (FIG. 7), and sets a transmittance (for example, "0.99" of the luminance pixel LPX2 (2, 2) illustrated in FIG. 20) for each second pixel PX2 ($x, y$) by dividing the luminance value (for example, "0.6" of the luminance pixel LPX2 (2, 2) shown in FIG. 15) assigned to each luminance pixel LPX2 ($x, y$) in the luminance image LIM by the intensity (for example, "0.604" (=60.4%) of the second pixel PX2 (2, 2) shown in FIG. 19) assigned to each second pixel PX2 ($x, y$) in the first luminance distribution 57. Thus, the second transmittance setting unit 17 generates the second liquid crystal panel display signal 58 in which a transmittance is set for each of the plurality of second pixels PX2 ($x, y$).

The second transmittance setting unit 17 outputs the generated second liquid crystal panel display signal 58 to the second liquid crystal panel PN2, thereby driving each of the plurality of second pixels PX2 ($x, y$) of the second liquid crystal panel PN2 to have the transmittance set for each of the plurality of second pixels PX2 ($x, y$) in the second liquid crystal panel display signal 58.

Figures 21, 22:
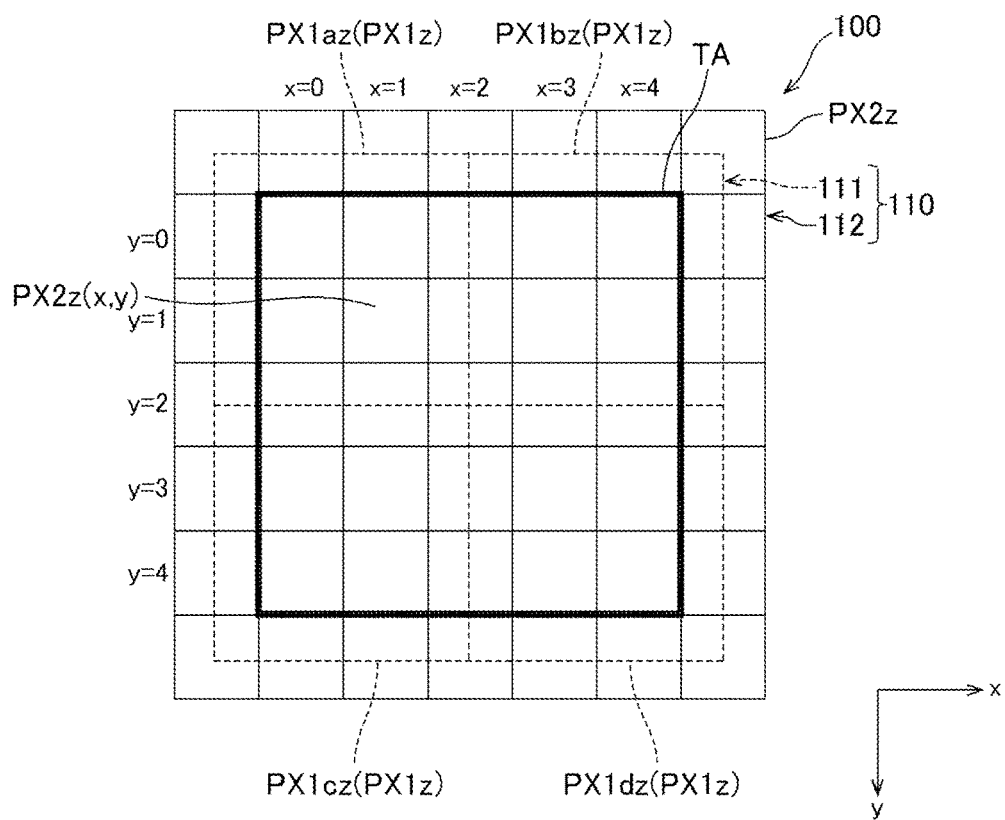
FIG. 21 is a diagram showing percentages of light from a backlight transmitted through second pixels of the second liquid crystal panel according to the first embodiment.
FIG. 22 is a diagram illustrating a schematic configuration of a display unit included in an image display device according to a comparative example.

FIG. 21 is a diagram showing percentages of light from the backlight BL transmitted through each second pixel PX2 ($x, y$) of the second liquid crystal panel PN2 according to the first embodiment. Here, the contrast of the second liquid crystal panel PN2 is set to 100:1. Since the contrast is 100:1, even in the case of a second pixel PX2 ($x, y$) (for example, the second pixel PX2 (1, 0) illustrated in FIG. 20) with the transmittance "0" set in the second liquid crystal panel display signal 58, light leaks from the second pixel PX2 ($x, y$) (for example, the second pixel PX2 (1, 0) illustrated in FIG. 20), and thus the percentage of transmitted light is "1%".

Next, the flow of processing of an image display device according to a comparative example will be described. FIG. 22 is a diagram illustrating a schematic configuration of a display unit 110 included in an image display device 100 according to a comparative example. The display unit 110 includes a backlight (not illustrated), a first liquid crystal panel 111, and a second liquid crystal panel 112 arranged in that order from the back side to the front side in an overlapping manner. The first liquid crystal panel 111 includes a plurality of first pixels PX1$z$ corresponding to 2×2 pixels, and the second liquid crystal panel 112 includes a plurality of second pixels PX2$z$ corresponding to 7×7 pixels. One first pixel PX1$z$ has a size corresponding to 3×3 second pixels PX2$z$.

The plurality of first pixels PX1$z$ include a first pixel PX1$az$, a first pixel PX1$bz$, a first pixel PX1$cz$, and a first pixel PX1$dz$. In the row direction (lateral direction), the first pixel PX1$az$ and the first pixel PX1$bz$ are adjacent to each other, and the first pixel PX1$cz$ and the first pixel PX1$dz$ are adjacent to each other. In addition, in the column direction (longitudinal direction), the first pixel PX1$az$ and the first pixel PX1$cz$ are adjacent to each other, and the first pixel PX1$bz$ and the first pixel PX1$dz$ are adjacent to each other.

Also in the comparative example, a study target area TA is an area in which 5×5 second pixels PX2$z$ are arranged in a matrix shape surrounded by a plurality of second pixels PX2$z$ positioned at the edges in a frame-like shape. In addition, the plurality of second pixels PX2$z$ in the study target area TA are indicated by using xy coordinates like a second pixel PX2$z$ (x, y) and the like.

Also in the image display device 100 according to the comparative example, the luminance image LIM illustrated in FIG. 15 is generated based on the input image Sin (see FIG. 7) input from the outside.

Figure 23:
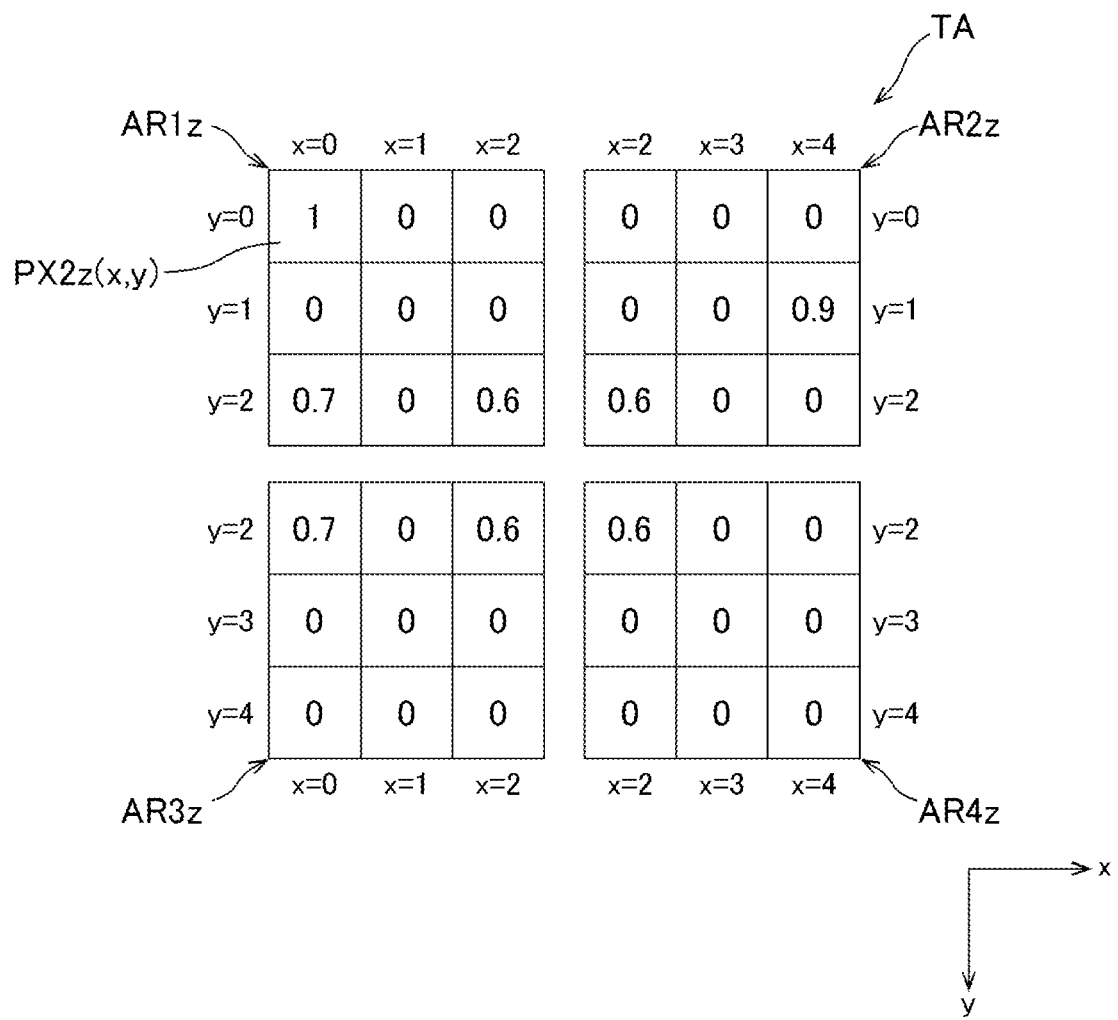
FIG. 23 is a diagram illustrating a state in which the image display device 100 according to the comparative example classifies a study target area TA into a plurality of areas overlapping each of a plurality of first pixels PX1z of a first liquid crystal panel 111.

FIG. 23 is a diagram illustrating a state in which the image display device 100 according to the comparative example classifies the study target area TA into a plurality of areas overlapping each of a plurality of first pixels PX1$z$ of the first liquid crystal panel 111. As illustrated in FIGS. 22 and 23, in the study target area TA, the image display device 100 sets an area overlapping the first pixel PX1$az$ as a first area AR1$z$, an area overlapping the first pixel PX1$bz$ as a second area AR2$z$, an area overlapping the first pixel PX1$cz$ as a third area AR3$z$, and an area overlapping the first pixel PX1$dz$ as a fourth area AR4$z$.

In addition, as illustrated in FIGS. 15 and 23, the image display device 100 sets the luminance value assigned to a luminance pixel LPX2 ($x, y$) corresponding to coordinates to the second pixel PX2$z$ (x, y) included in each of the first area AR1$z$ to the fourth area AR4$z$ based on the luminance image LIM (see FIG. 15). To be specific, in the first area AR1$z$, the image display device 100 sets the luminance value "1" to the second pixel PX2$z$ (0, 0), sets the luminance value "0.7" to the second pixel PX2$z$ (0, 2), sets the luminance value "0.6" to the second pixel PX2$z$ (2, 2), and sets the luminance value "0" to each of the other second pixels PX2$z$ (x, y). In addition, in the second area AR2$z$, the image display device 100 sets the luminance value "0.9" to the second pixel PX2$z$ (4, 1), sets the luminance value "0.6" to the second pixel PX2$z$ (2, 2), and sets the luminance value "0" to each of the other second pixels PX2$z$ (x, y). In addition, in the third area AR3$z$, the image display device 100 sets the luminance value "0.7" to the second pixel PX2$z$ (0, 2), sets the luminance value "0.6" to the second pixel PX2$z$ (2, 2), and sets the luminance value "0" to each of the other second pixels PX2$z$ (x, y). In addition, in the fourth area AR4$z$, the image display device 100 sets the luminance value "0.6" to the second pixel PX2$z$ (2, 2), and sets the luminance value "0" to each of the other second pixels PX2$z$ (x, y).

Figure 24:
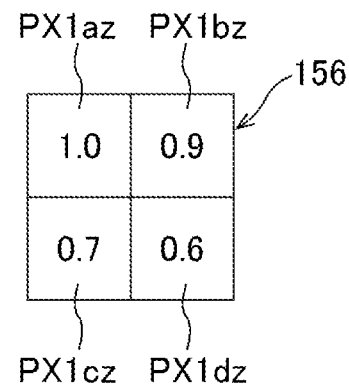
FIG. 24 is a diagram illustrating a first liquid crystal panel display signal of the image display device according to the comparative example in which a transmittance is set for each first pixel of a first liquid crystal panel.

FIG. 24 is a diagram illustrating a first liquid crystal panel display signal 156 of the image display device 100 according to the comparative example in which a transmittance is set for each first pixel PX1z of the first liquid crystal panel 111. As illustrated in FIGS. 23 and 24, the image display device 100 sets, as a transmittance of the first pixel PX1az, the luminance value "1" set for the second pixel PX2z (0, 0), which is the highest value among the luminance values set for the nine second pixels PX2z (x, y) included in the first area AR1z. In addition, the image display device 100 sets, as a transmittance of the first pixel PX1bz, the luminance value "0.9" set for the second pixel PX2z (4, 1), which is the highest value among the luminance values set for the nine second pixels PX2z (x, y) included in the second area AR2z. In addition, the image display device 100 sets, as a transmittance of the first pixel PX1cz, the luminance value "0.7" set for the second pixel PX2z (0, 2), which is the highest value among the luminance values set for the nine second pixels PX2z (x, y) included in the third area AR3z. In addition, the image display device 100 sets, as a transmittance of the first pixel PX1dz, the luminance value "0.6" set for the second pixel PX2z (2, 2), which is the highest value among the luminance values set for the nine second pixels PX2z (x, y) included in the fourth area AR4z. Accordingly, the image display device 100 generates the first liquid crystal panel display signal 156 in which the transmittance "1.0" is set for the first pixel PX1az, the transmittance "0.9" is set for the first pixel PX1bz, the transmittance "0.7" is set for the first pixel PX1cz, and the transmittance "0.6" is set for the first pixel PX1dz.

The image display device 100 outputs the first liquid crystal panel display signal 156 to the first liquid crystal panel 111, thereby driving the first pixel PX1az, the first pixel PX1bz, the first pixel PX1cz, and the first pixel PX1dz to have the transmittances set in the first liquid crystal panel display signal 156 of "1.0", "0.9", "0.7", and "0.6", respectively.

As described above, in the image display device 100 according to the comparative example, the transmittance of each of the first pixel PX1az, the first pixel PX1bz, the first pixel PX1cz, and the first pixel PX1dz is independently set without considering the influence of transmitted light transmitted by an adjacent pixel to the second liquid crystal panel 112, unlike in the image processing device 10 according to the first embodiment. Therefore, although the same luminance image LIM (FIG. 15) is used, the transmittance "0.7" of the first pixel PX1cz of the first liquid crystal panel display signal 156 generated by the image display device 100 is set higher than the transmittance "0.4" of the first pixel PX1c of the first liquid crystal panel display signal 56 (FIG. 18) generated by the image processing device 10, and the transmittance "0.6" of the first pixel PX1dz is set higher than the transmittance "0.1" of the first pixel PX1d. Therefore, according to the first liquid crystal panel display signal 156 generated by the image display device 100, black floating in which black images are displayed brighter than they should is likely to occur.

On the other hand, as described above, in the image processing device 10 according to the first embodiment, a transmittance of a first pixel PX1 (pixel of interest) for which no transmittance has been set among the plurality of first pixels PX1 overlapping the overlapping area OA is set based on the transmittance coefficient (FIG. 14) indicating the proportion at which each of the plurality of first pixels PX1 overlapping the overlapping area OA influences the overlapping area OA with transmitted light, and thus it is possible to prevent the transmittance of the first pixel PX1 (for example, the first pixel PX1c and the first pixel PX1d) from being set higher than necessary and to curb black floating.

FIG. 25 is a diagram illustrating a first luminance distribution 157 according to the comparative example. When the image display device 100 acquires the first liquid crystal panel display signal 156, the image display device 100 generates the first luminance distribution 157, which is information indicating a percentage of light transmitted through the first liquid crystal panel 111 for each of the plurality of second pixels PX2z (x, y), based on the transmittance set for each of the plurality of first pixels PX1z.

When the first luminance distribution 157 shown in FIG. 25 is compared to the first luminance distribution 57 shown in FIG. 19, it can be seen that the intensity of transmitted light to 5×3 pixels including the second pixel PX2 (0, 2) to the second pixel PX2 (4, 4) irradiated with the transmitted light by the first pixel PX1c and the first pixel PX1d is curbed in the first luminance distribution 57 (FIG. 19) according to the first embodiment and the occurrence of black floating is suppressed, as compared to the first luminance distribution 157 (FIG. 25) according to the comparative example.

FIG. 26 is a diagram illustrating a second liquid crystal panel display signal 158 according to the comparative example. The image display device 100 divides the luminance value assigned to each luminance pixel LPX2 (x, y) in the luminance image LIM (FIG. 15) by the percentage assigned to each second pixel PX2z (x, y) in the first luminance distribution 157 to generate the second liquid crystal panel display signal 158 in which a transmittance is set for each of the plurality of second pixels PX2z (x, y). The image display device 100 drives each of the plurality of second pixels PX2z (x, y) of the second liquid crystal panel 112 to obtain the transmittance set for each of the plurality of second pixels PX2z (x, y) in the second liquid crystal panel display signal 158.

When the second liquid crystal panel display signal 158 illustrated in FIG. 26 is compared to the second liquid crystal panel display signal 58 illustrated in FIG. 20, since the transmittance of the first pixel PX1c is set lower in the second liquid crystal panel display signal 58 (FIG. 20) according to the first embodiment than in the second liquid crystal panel display signal 158 (FIG. 26) according to the comparative example, the transmittances of the second pixel PX2 (0, 2) and the second pixel PX2 (2, 2) irradiated with transmitted light from the first pixel PX1c can be set higher than the transmittances of the second pixel PX2z (0, 2) and the second pixel PX2z (2, 2) according to the comparative example.

FIG. 27 is a diagram showing percentages of light from the backlight transmitted through each second pixel PX2z (x, y) of the second liquid crystal panel 112 according to the comparative example. Here, the contrast of the second liquid crystal panel 112 is set to 100:1. Since the contrast is 100:1, even in the case of a second pixel PX2z (x, y) (for example, the second pixel PX2z (1, 0) illustrated in FIG. 26) with the transmittance "0" set in the second liquid crystal panel display signal 158, light leaks from the second pixel PX2z (x, y) (for example, the second pixel PX2z (1, 0) illustrated in FIG. 26), and thus the percentage of transmitted light is "1%".

FIG. 28 is a diagram illustrating the luminance (degree of brightness) of each second pixel PX2z (x, y) of the second liquid crystal panel 112 driven by the image display device 100 according to the comparative example. FIG. 29 is a diagram illustrating the luminance (degree of brightness) of each second pixel PX2 (x, y) of the second liquid crystal panel PN2 driven by the image processing device 10 according to the first embodiment. FIG. 30 shows results of comparison between the luminance of each second pixel PX2z (x, y) according to the comparative example shown in FIG. 28 and the luminance of each second pixel PX2 (x, y) according to the first embodiment shown in FIG. 29.

Further, in FIGS. 28 and 29, each numerical value is obtained by calculation, and the unit is indicated by [nit]. It is assumed in calculation of the numerical values shown in FIGS. 28 and 29 that the luminance of the backlight with which the first liquid crystal panel and the second liquid crystal panel are irradiated is 1000 [nit] and is uniform in all pixels. Each numerical value shown in FIG. 30 is obtained by dividing each numerical value shown in FIG. 29 by each numerical value shown in FIG. 28 to obtain a percentage of the luminance of each second pixel observed as a result of two displays.

As illustrated in FIG. 30, it can be seen that, in the image processing device 10 according to the first embodiment, the luminance of the second pixel PX2 (for example, the second pixel PX2 (3, 3) illustrated in FIG. 20) having the transmittance "0" can be reduced to 18% at the maximum, as compared to the image display device 100 according to the comparative example, and the occurrence of black floating can be suppressed.

Figure 31:
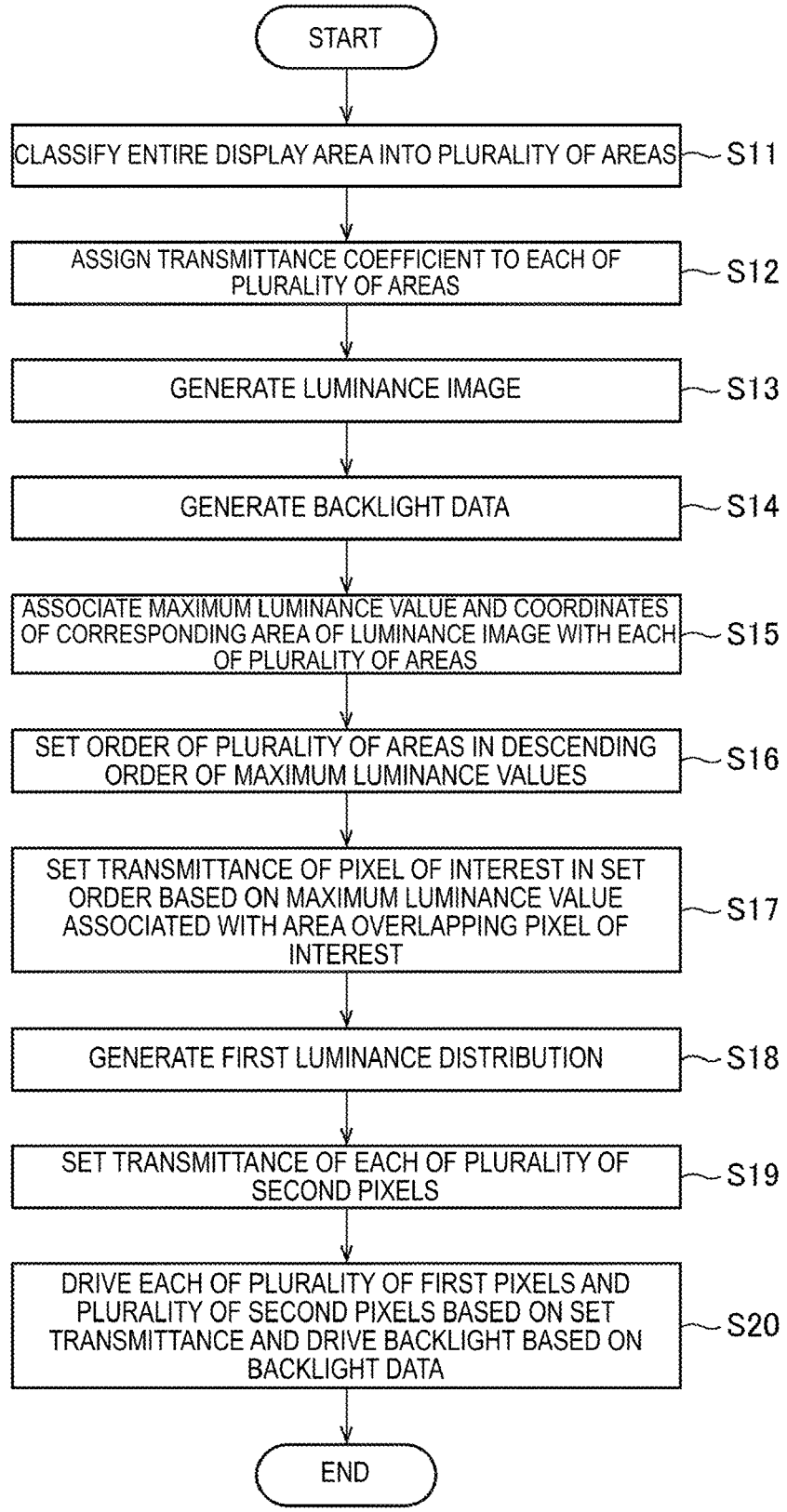
FIG. 31 is a flowchart depicting the flow of processing of the image processing device according to the first embodiment.

FIG. 31 is a flowchart depicting the flow of processing of the image processing device 10 according to the first embodiment. The image processing device 10 executes the processing depicted in FIG. 31 for each frame of an input image.

In step S11, the area classifying unit 20 (FIG. 7) classifies the entire display area DA into a plurality of areas based on the overlapping and non-overlapping area information 51 (FIG. 7), generates the area classification information 52, and stores the area classification information 52 in the storage unit 50. For example, as illustrated in FIGS. 8 and 9, the area classifying unit 20 (FIG. 7) classifies the study target area TA coinciding with the display area DA into a plurality of areas including the overlapping areas OA, for example, into a first area AR1 to a ninth area AR9. For example, the overlapping areas OA include the second area AR2, the fourth area AR4 to the sixth area AR6, and the eighth area AR8. Further, it is assumed in the first embodiment that the display area DA coincides with the study target area TA, and the area classifying unit 20 classifies the entire display area DA into a plurality of areas that are the first area AR1 to the ninth area AR9.

Next, in step S12, as illustrated in FIGS. 10 to 14, the area classifying unit 20 generates the area transmittance coefficient information 54 (FIG. 14) by assigning a transmittance coefficient to each of the plurality of areas that are the first area AR1 to the ninth area AR9 based on the transmittance coefficient information 53, and stores the area transmittance coefficient information 54 in the storage unit 50. Next, in step S13, the luminance image generation unit 11 generates the luminance image LIM based on the input image Sin input from the outside as illustrated in FIG. 15.

Next, in step S14, the backlight data generation unit 12 generates backlight data based on the luminance image LIM. Further, the backlight data generation unit 12 may generate backlight data based on the input image Sin instead of the luminance image LIM.

Next, in step S15, as illustrated in FIGS. 15 and 16, the maximum luminance setting unit 13 (FIG. 7) associates each of the plurality of areas that are the first area AR1 to the ninth area AR9 with the maximum luminance value that is the highest value among the luminance values of the corresponding areas in the luminance image LIM and the coordinates of the luminance pixel LPX2 (x, y) to which the maximum luminance value is assigned, thereby generating the area luminance value information 55 (FIG. 17) and storing the information in the storage unit 50.

Next, in step S16, the order setting unit 14 (FIG. 7) refers to the area luminance value information 55 (FIG. 17) and sets the plurality of areas that are the first area AR1 to the ninth area AR9 in descending order of maximum luminance values as illustrated in FIG. 17. The order setting unit 14 adds information about the order to the area luminance value information 55.

Next, in step S17, the first transmittance setting unit 15 (FIG. 7) sets the transmittances of the pixels of interest based on the maximum luminance value associated with the area overlapping the pixels of interest in the order set by the order setting unit 14 for the area overlapping the pixels of interest among the plurality of areas as shown in FIG. 18. In particular, as indicated in step S3 of FIGS. 8, 17, and 18, the first transmittance setting unit 15 sets the transmittance of the first pixel PX1c, which is the pixel of interest, among the first pixels PX1a and PX1c overlapping the fourth area AR4, which is the overlapping area OA, based on the transmittance coefficient "0.5" (FIG. 14) assigned to the fourth area AR4, which is the overlapping area QA. In addition, as indicated in step S4 of FIGS. 8, 17, and 18, the first transmittance setting unit 15 sets the transmittance of the first pixel PX1d, which is the pixel of interest, among the first pixels PX1a, PX1b, PX1c, and PX1d overlapping the fifth area AR5, which is the overlapping area QA, based on the transmittance coefficient "0.25" (FIG. 14) assigned to the fifth area AR5, which is the overlapping area OA. The first transmittance setting unit 15 generates the first liquid crystal panel display signal 56 (FIG. 18) in which the transmittance is set for each of the first pixels PX1a to PX1d, and stores the generated first liquid crystal panel display signal 56 in the storage unit 50.

Next, in step S18, the first luminance distribution generation unit 16 (FIG. 7) generates the first luminance distribution 57 as illustrated in FIG. 19 based on the transmittance set for each of the first pixels PX1a to PX1d. Next, in step S19, the second transmittance setting unit 17 (FIG. 7) corrects the input image Sin based on the first luminance distribution 57 (FIG. 19) to set the transmittance of each of the plurality of second pixels PX2 as illustrated in FIG. 20. The second transmittance setting unit 17 generates the second liquid crystal panel display signal 58 (FIG. 20) in which the transmittance is set for each of the plurality of second pixels PX2, and stores the generated second liquid crystal panel display signal 58 in the storage unit 50.

Next, in step S20, the first transmittance setting unit 15 (FIG. 7) drives each of the plurality of first pixels PX1a to PX1d based on the set transmittance based on the first liquid crystal panel display signal 56, the second transmittance setting unit 17 (FIG. 7) drives each of the plurality of second pixels PX2 based on the set transmittance based on the second liquid crystal panel display signal 58, and the backlight data generation unit 12 controls driving of the backlight BL based on the backlight data.

In this way, the image processing device 10 can drive the first liquid crystal panel PN1 and the second liquid crystal panel PN2 while suppressing the occurrence of black floating.

Further, the processing of step S11 and step S12 performed by the area classifying unit 20 may be executed outside the image processing device 10 in advance, and the area classification information 52 (FIG. 9) and the area transmittance coefficient information 54 (FIG. 14) which are the processing results may be stored in the storage unit 50.

In this case, the image processing device 10 may not include the area classifying unit 20, and may not store the overlapping and non-overlapping area information 51 and the transmittance coefficient information 53 in the storage unit 50.

Second Embodiment

In the first embodiment, the number of first pixels PX1 included in the first liquid crystal panel PN1 is described as being 2×2 (FIGS. 2 and 8) in order to simplify description. However, it is conceivable that the first liquid crystal panel PN1 include more than 2×2 first pixels PX1. Therefore, the image display device 1 may divide the display area DA into partial blocks and perform the above-described processing.

Figure 32:
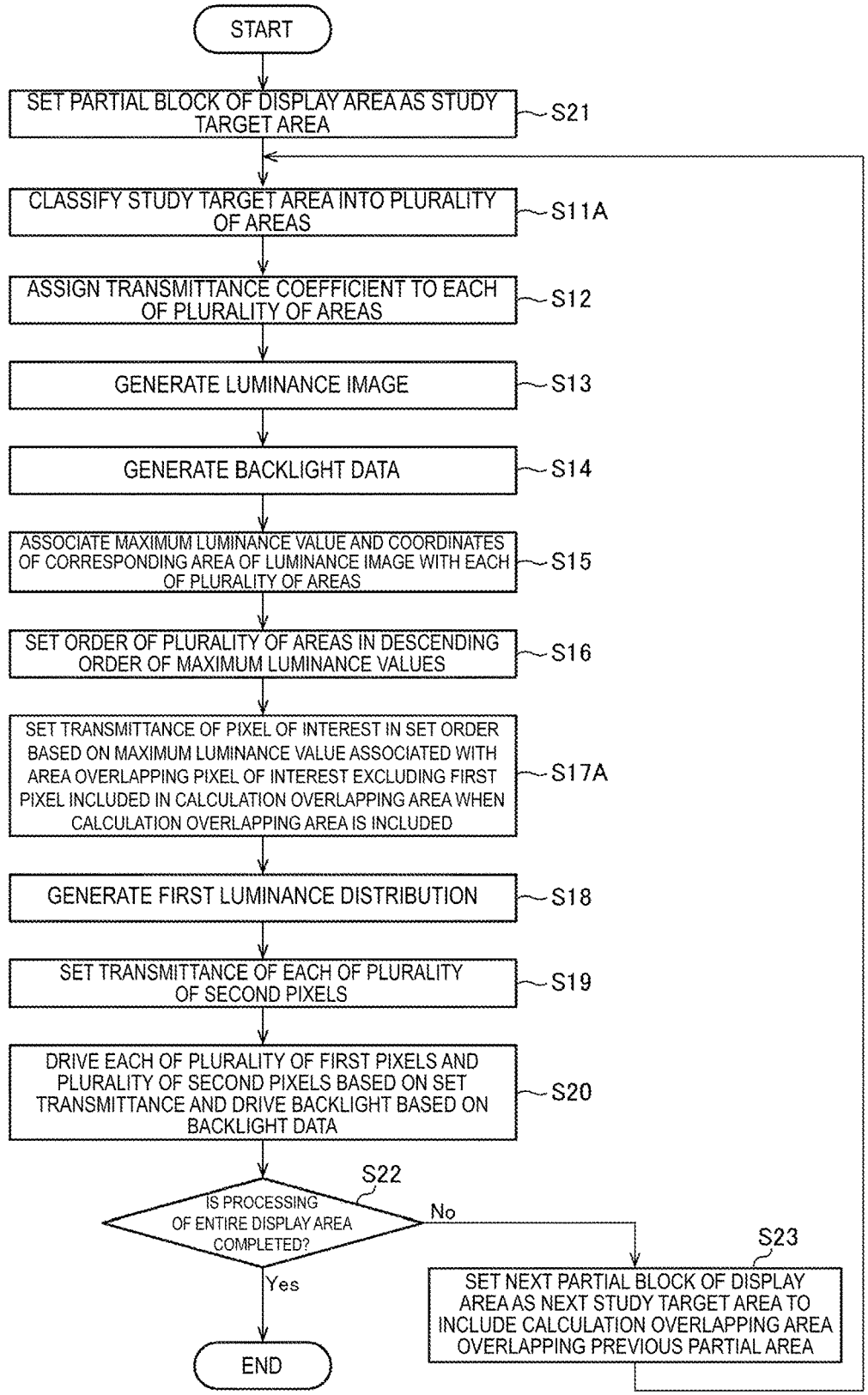
FIG. 32 is a flowchart depicting the flow of processing of an image processing device according to a second embodiment.

FIG. 32 is a flowchart depicting the flow of processing of an image processing device 10 according to a second embodiment. Further, the functional block diagram of the image display device 1 according to the second embodiment is the same as the functional block diagram illustrated in FIG. 7. The image processing device 10 executes the processing depicted in FIG. 32 for each frame of an input image.

In step S21 shown in FIG. 32, the image processing device 10 (FIG. 7) sets a partial block of the display area DA as a study target area TA1.

Figure 33:
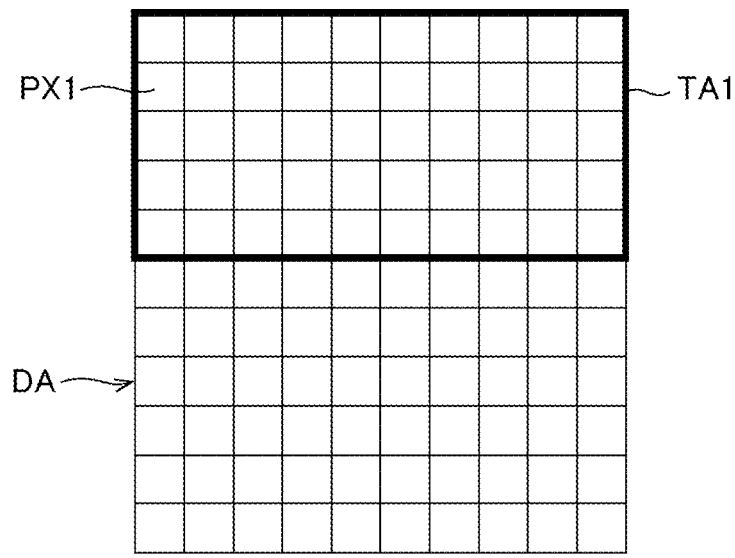
FIG. 33 is a diagram illustrating a state in which a partial block of a display area classified into a plurality of areas by an area classifying unit according to the second embodiment is set.

FIG. 33 is a diagram illustrating a state in which the image processing device 10 according to the second embodiment sets a partial block of the display area DA as the study target area TA1. For example, the image processing device 10 (FIG. 7) sets a partial block including 10×5 first pixels PX1, that is, 10 pixels in the row direction (lateral direction) and 5 pixels in the column direction (longitudinal direction), as the study target area TA1 as illustrated in FIG. 33.

Next, in step S11A, the area classifying unit 20 (FIG. 7) classifies the study target area TA1 into a plurality of areas based on the overlapping and non-overlapping area information 51 (FIG. 7), generates the area classification information 52, and stores the area classification information 52 in the storage unit 50. The method by which the area classifying unit 20 classifies the study target area TA1 into a plurality of areas is the same as that in step S11 of FIG. 31. Then, by performing the processing of steps S12 to S16 described with reference to FIG. 31, the area classifying unit 20 (FIG. 7) generates the area transmittance coefficient information 54 in which a transmittance coefficient is assigned to each of the plurality of areas obtained by classifying the study target area TA1 into multiple areas and stores the area transmittance coefficient information 54 in the storage unit 50 (step S12), the luminance image generation unit 11 generates the luminance image LIM (step S13), the backlight data generation unit 12 generates backlight data (step S14), and the maximum luminance setting unit 13 (FIG. 7) generates the area luminance value information 55 in which each of the plurality of areas is associated with a maximum luminance value and coordinates, and stores the area luminance value information 55 in the storage unit 50 (step S15). In addition, the order setting unit 14 (FIG. 7) refers to the area luminance value information 55 and sets the order of the plurality of areas in descending order of maximum luminance values (step S16).

Figure 34:
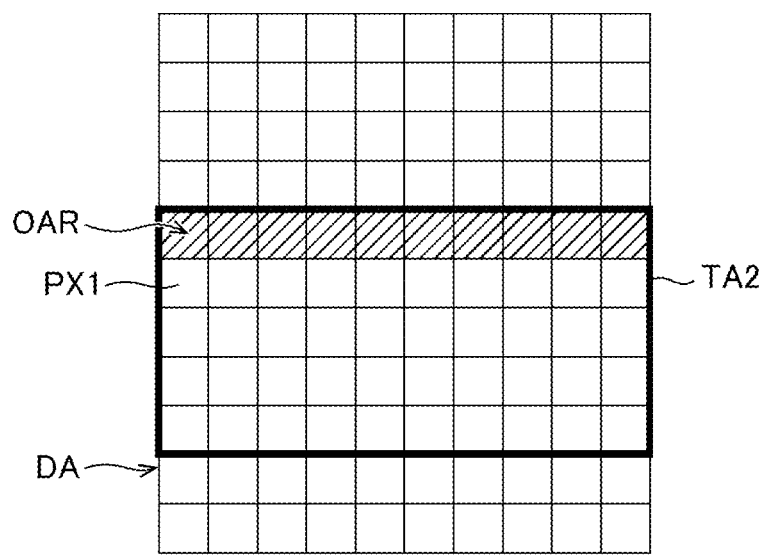
FIG. 34 is a diagram illustrating a state in which a next partial block of the display area classified into a plurality of areas by the area classifying unit according to the second embodiment is set.

Next, in step S17A, when a calculation overlapping area OAR (FIG. 34) to be described later is included in the plurality of areas, the first transmittance setting unit 15 (FIG. 7) sets the transmittances of the pixels of interest based on the maximum luminance value associated with the area overlapping the pixels of interest in the order set by the order setting unit 14 except for the first pixels PX1 included in the calculation overlapping area OAR (FIG. 34). Here, since the calculation overlapping area OAR (FIG. 34) is not included in the plurality of areas obtained by classifying the study target area TA1, the first transmittance setting unit 15 (FIG. 7) generates the first liquid crystal panel display signal 56 in which the transmittance is set for each of all of the plurality of first pixels PX1 included in the study target area TA1, and stores the generated first liquid crystal panel display signal 56 in the storage unit 50.

Next, by performing the processing of steps S18 to S20 described with reference to FIG. 31, the first luminance distribution generation unit 16 (FIG. 7) generates the first luminance distribution 57 for the study target area TA1 (step S18), the second transmittance setting unit 17 (FIG. 7) generates the second liquid crystal panel display signal 58 for the study target area TA1 (step S19), and the first transmittance setting unit 15 (FIG. 7) controls the driving of the plurality of first pixels PX1 corresponding to the study target area TA1 based on the first liquid crystal panel display signal 56 and the second transmittance setting unit 17 (FIG. 7) controls the driving of the plurality of second pixels PX2 corresponding to the study target area TA1, and the backlight data generation unit 12 controls the driving of the backlight BL based on the backlight data (step S20).

Next, in step S22, the image processing device 10 determines whether the processing over the entire display area DA has been completed. If the image processing device 10 determines that the processing over the entire display area DA has been completed in step S22 (in the case of Yes in step S22), the image processing device 10 can determine that the setting of the transmittances of all of the first pixels PX1 has been completed, and thus ends the processing. On the other hand, if the image processing device 10 determines that the processing over the entire display area DA has not been completed in step S22 (in the case of No in step S22), the image processing device 10 can determine that the setting of the transmittances of some of the first pixels PX1 has not been completed, and thus proceeds to the next step S23.

Next, in step S23, the image processing device 10 (FIG. 7) sets the next partial block of the display area DA as the next study target area TA2. At this time, the image processing device 10 causes some area already completed with the processing to be included in the next study target area TA2 again. Such an area to be included again in the next study target area TA2 is referred to as a calculation overlapping area OAR.

FIG. 34 is a diagram illustrating a state in which the image processing device 10 according to the second embodiment sets the next partial block of the display area DA as a study target area TA2. When setting a partial block of the display area DA to be set as the next study target area TA2, the image processing device 10 sets the partial block to be set as the next study target area TA2 to include the calculation overlapping area OAR which is an area included in another partial block having been set as the study target area TA1 (FIG. 33). The calculation overlapping area OAR is an area constituted by a plurality of first pixels PX1 for which the transmittance has already been set, the first pixels being included in the other partial block having been set as the study target area TA1 (FIG. 33). For example, the image processing device 10 sets a partial block of the display area DA including 10×5 first pixels PX1, that is, 10 pixels in the row direction (lateral direction) and 5 pixels in the column direction (longitudinal direction), as the study target area TA2, which includes the calculation overlapping area OAR constituted by 10 first pixels PX1 arranged in one column in the row direction at the end of the other partial block having been set as the study target area TA1 (FIG. 33). In other words, the image processing device 10 sets, as the study target area TA2, the block that includes 10×5 first pixels PX1 that are 10 first pixels in the row direction (lateral direction) and 5 first pixels in the column direction (longitudinal direction) and is shifted by four rows from the block included in the study target area TA1. Then, the processing proceeds from step S11A to step S17A.

In step S17A, since the calculation overlapping area OAR (FIG. 34) is included in the plurality of areas, the first transmittance setting unit 15 (FIG. 7) sets the transmittances of the pixels of interest based on the maximum luminance value associated with the area overlapping the pixels of interest in the order set by the order setting unit 14 except for the first pixels PX1 included in the calculation overlapping area OAR (FIG. 34). As described above, since the transmittance has already been set for each of the plurality of first pixels PX1 constituting the calculation overlapping area OAR, the transmittance of each of the plurality of first pixels PX1 constituting the calculation overlapping area OAR is not updated in the processing of the current step S17A, and the transmittance of the plurality of first pixels PX1 other than the calculation overlapping area OAR included in the study target area TA2 is set. Thereafter, the processing is continued until Yes is determined in step S22.

As described above, the image processing device 10 according to the second embodiment performs processing by dividing the display area DA into partial blocks. As a result, the maximum luminance setting unit 13 generates the area luminance value information 55 and stores the information in the storage unit 50, or the first transmittance setting unit 15 generates the first liquid crystal panel display signal 56 and stores the signal in the storage unit 50, for each partial block of the display area DA. Thus, because the data capacity can be reduced compared to a case in which the area luminance value information 55 and the first liquid crystal panel display signal 56 for all of the first pixels PX1 provided in the display area DA are generated, the circuit scale of the image processing device 10 can be reduced, or the storage capacity of the storage unit 50 required for storing the area luminance value information 55 and the first liquid crystal panel display signal 56 can be reduced.

In addition, the image processing device 10 according to the second embodiment sets a partial block constituting the study target area TA2 to include the calculation overlapping area OAR including the plurality of first pixels PX1 included in the other partial block constituting the study target area TA1 and for which the transmittances have been set. Then, the first transmittance setting unit 15 does not update the transmittances of the plurality of first pixels PX1 included in the calculation overlapping area OAR and for which the transmittances have been set among the plurality of first pixels PX1 included in the partial block constituting the study target area TA2, and sets the transmittances of the other plurality of first pixels PX1 constituting the study target area TA2.

Accordingly, for example, as in step S3 and step S4 (FIG. 18), the first transmittance setting unit 15 sets the transmittances of the first pixels PX1 adjacent to the calculation overlapping area OAR in the study target area TA2 in consideration of the transmittances of the first pixels PX1 in the calculation overlapping area OAR for which the transmittances have already been set, and thus it is possible to prevent an unnecessary increase in the transmittance of the first pixel PX1, as compared to a case where the calculation overlapping area OAR is not provided. As a result, it is possible to obtain the image processing device 10 in which the occurrence of black floating is further suppressed.

Further, the processing of step S11A and step S12 performed by the area classifying unit 20 may be executed outside the image processing device 10 in advance, and the area classification information 52 (FIG. 9) and the area transmittance coefficient information 54 (FIG. 14) which are the processing results may be stored in the storage unit 50. In this case, the image processing device 10 may not include the area classifying unit 20, and may not store the overlapping and non-overlapping area information 51 and the transmittance coefficient information 53 in the storage unit 50.

Third Embodiment

Figure 35:
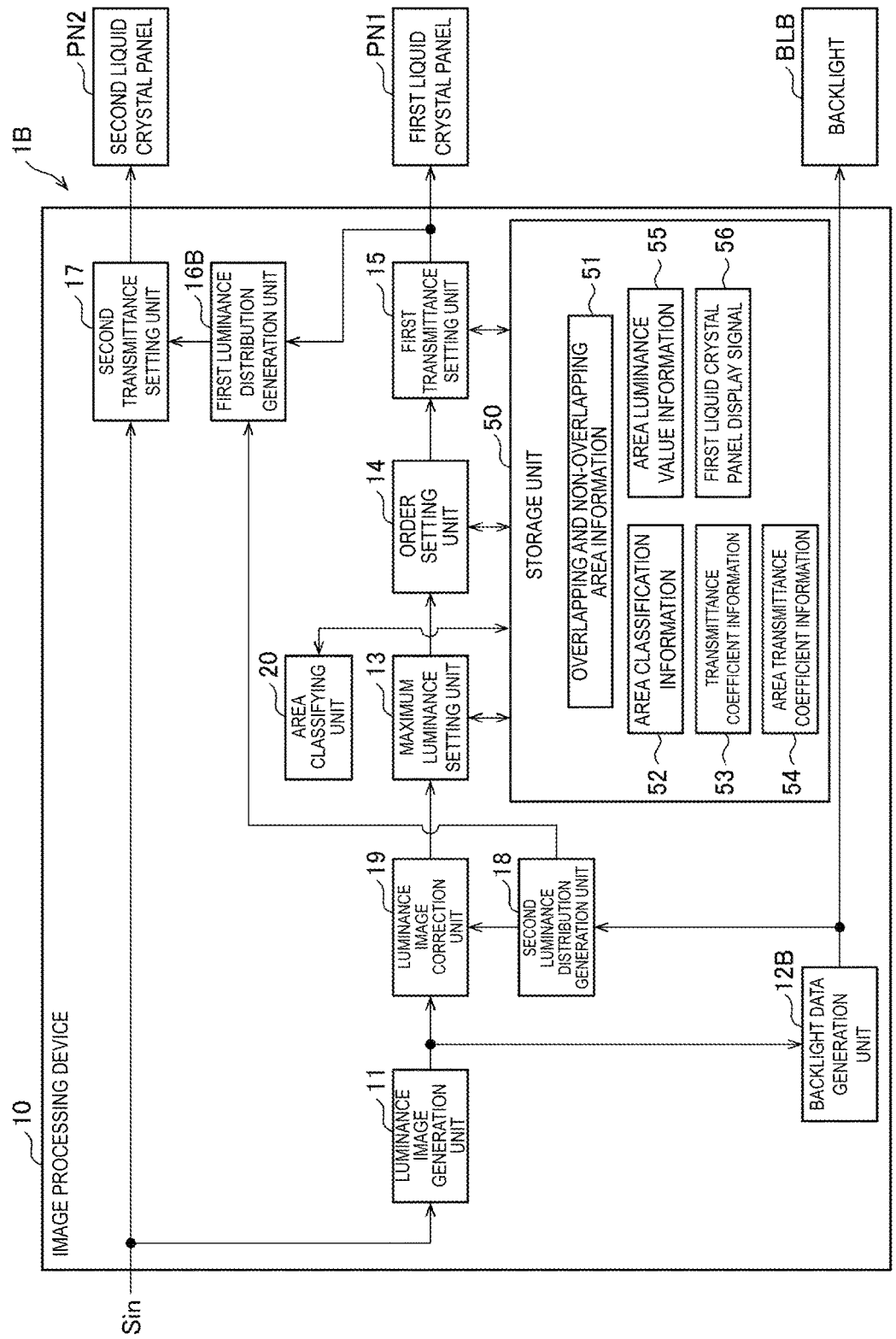
FIG. 35 is a functional block diagram illustrating a schematic configuration of an image display device according to a third embodiment.

FIG. 35 is a functional block diagram illustrating a schematic configuration of an image display device 1B according to a third embodiment. A backlight BLB included in the image display device 1B according to the third embodiment is configured to be capable of controlling light emission by local dimming.

The image display device 1B includes the backlight BLB, a backlight data generation unit 12B, and a first luminance distribution generation unit 16B, instead of the backlight BL, the backlight data generation unit 12, and the first luminance distribution generation unit 16 included in the image display device 1 illustrated in FIG. 7, and further includes a second luminance distribution generation unit (luminance distribution generation unit) 18 and a luminance image correction unit 19. The other configuration of the image display device 1B is similar to that of the image display device 1 illustrated in FIG. 7. Processing performed by the area classifying unit 20 and the luminance image generation unit 11 is similar to the processing described in the first embodiment.

The backlight BLB has a plurality of light sources. The backlight BLB can control luminance of the light sources for each of a plurality of light-emitting regions.

The backlight data generation unit 12B generates backlight data for controlling the luminance of each of the plurality of light-emitting regions in the backlight BLB based on an input image Sin. The backlight data generation unit 12B may generate backlight data based on the luminance image LIM (FIG. 15) generated by the luminance image generation unit 11, or may generate backlight data directly based on the input image Sin instead of the luminance image LIM. Further, since the backlight BLB according to the third embodiment is capable of independently controlling the plurality of light-emitting regions as described above, the backlight data generated by the backlight data generation unit 12B is control data for each of the plurality of light-emitting regions, that is, a plurality of pieces of control data.

For example, the backlight data generation unit 12B obtains the maximum value, the mean value, and the like of luminance values of a plurality of second pixels PX2 corresponding to the plurality of light-emitting regions in the backlight BLB, and sets the obtained values as the luminance values of the corresponding light-emitting regions in the backlight BLB, thereby generating the backlight data. The backlight data generation unit 12B controls the luminance of each of the plurality of light-emitting regions in the backlight BLB based on the generated backlight data, that is, performs local dimming driving of the backlight BLB.

FIG. 36 is a diagram illustrating a second luminance distribution 59 according to the third embodiment. The second luminance distribution generation unit 18 generates the second luminance distribution (luminance distribution) 59, which is a distribution of light emitted from each of the plurality of light-emitting regions in the backlight BLB based on the backlight data. A proportion of the amount of light emitted by the backlight BLB is assigned to each second pixel PX2 (x, y) of the second luminance distribution 59. For example, the second luminance distribution generation unit 18 generates the second luminance distribution 59 by convolving the luminance of each light-emitting region of the backlight BLB with a "point spread function (PSF)" indicating how light spreads from each light-emitting region of the backlight BLB. In the third embodiment, since the backlight BLB performs light emission control by local dimming, the second luminance distribution 59 may be a non-uniform luminance distribution as illustrated in FIG. 36. The second luminance distribution generation unit 18 outputs the second luminance distribution 59 to the luminance image correction unit 19 and the first luminance distribution generation unit 16B.

For example, the second luminance distribution generation unit 18 generates the second luminance distribution 59 (FIG. 36), which is a luminance distribution at the resolution of the second liquid crystal panel PN2, and a second luminance distribution, which is a luminance distribution at the resolution of the first liquid crystal panel PN1, which is not illustrated. The second luminance distribution generation unit 18 outputs the second luminance distribution 59 (FIG. 36), which is the luminance distribution at the resolution of the second liquid crystal panel PN2, to the luminance image correction unit 19, and outputs the second luminance distribution, which is the luminance distribution at the resolution of the first liquid crystal panel PN1, which is not illustrated, to the first luminance distribution generation unit 16B.

Further, the second luminance distribution 59 may be generated with one type of resolution, for example, and the resolution may be converted in each light-emitting region as necessary. Specifically, for example, the second luminance distribution 59 may be generated with the resolution of the second liquid crystal panel PN2, and when the first luminance distribution generation unit 16B uses the second luminance distribution 59, the resolution may be converted into the resolution of the first liquid crystal panel PN1.

FIG. 37 is a diagram illustrating a corrected luminance image LIMB according to the third embodiment. In the third embodiment, since the backlight BLB performs light emission control by local dimming, the distribution of light from the backlight BLB that reaches the first liquid crystal panel PN1 is not constant. As a result, the transmittance of the first pixels PX1 of the first liquid crystal panel PN1 does not match the amount of light transmitted through the first pixels PX1. For example, even when the transmittance of some first pixels PX1 of the first liquid crystal panel PN1 is increased, if the amount of light emitted from the backlight BLB to the first pixels PX1 of the first liquid crystal panel PN1 is small, the amount of light transmitted through the first pixels PX1 of the first liquid crystal panel PN1 would be small as well, and thus an appropriate transmittance of the first liquid crystal panel PN1 may not be determined. Therefore, the luminance image correction unit 19 corrects the luminance image LIM (FIG. 15) based on the second luminance distribution 59 (FIG. 36) representing the influence of the distribution of light of the backlight BLB in which light amounts differ for each of the plurality of light-emitting regions due to local dimming to obtain the corrected luminance image LIMB (FIG. 37), thereby making it possible to determine transmittances in order from the first pixels PX1 of the first liquid crystal panel PN1 corresponding to second pixels PX2 requiring a larger amount of light in the second liquid crystal panel PN2.

For example, the luminance image correction unit 19 obtains the corrected luminance image LIMB (FIG. 37) by dividing the luminance value of each luminance pixel LPX2 (x, y) (FIG. 15) of the luminance image LIM by the value assigned to the second pixel PX2 (x, y) of the second luminance distribution 59 (FIG. 36) at the position corresponding to the aforementioned luminance pixel LPX2 (x, y). A corrected luminance value corresponding to each second pixel PX2 of the second liquid crystal panel PN2 is assigned to each luminance pixel LPX2 of the corrected luminance image LIMB. The luminance image correction unit 19 outputs the corrected luminance image LIMB to the maximum luminance setting unit 13.

Figures 38, 39:
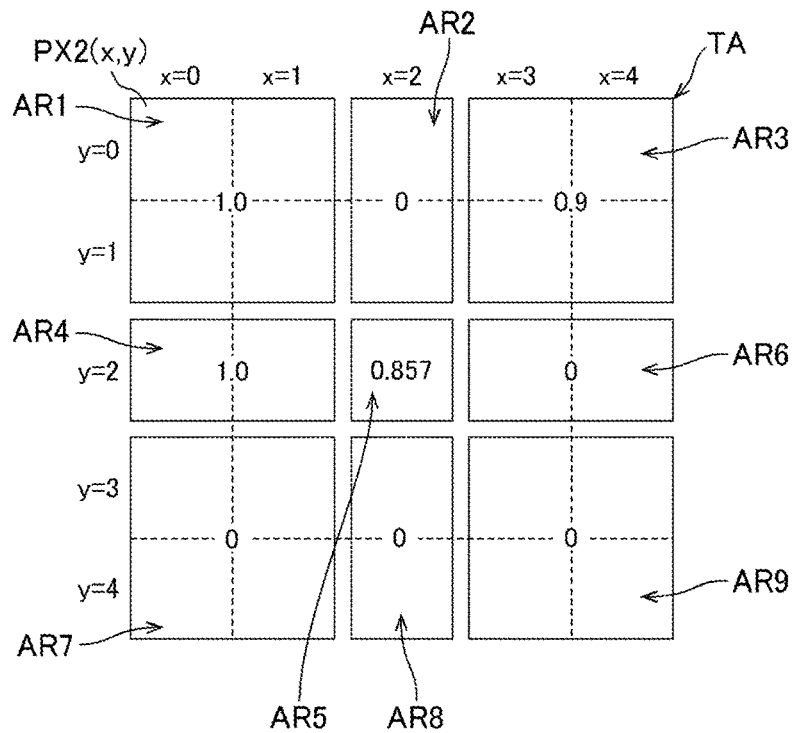
FIG. 38 is a diagram illustrating a study target area in which luminance values are associated with each of a plurality of areas according to the third embodiment.
FIG. 39 is a diagram schematically illustrating area luminance value information according to the third embodiment.

FIG. 38 is a diagram illustrating a study target area TA in which luminance values are associated with each of a plurality of areas according to the third embodiment. Based on the corrected luminance image LIMB (FIG. 37) acquired from the luminance image correction unit 19, the maximum luminance setting unit 13 sets a maximum luminance value which is the highest value among the luminance values of the corresponding areas in the corrected luminance image LIMB in association with each of the first area AR1 to the ninth area AR9 which are areas obtained by classifying the study target area TA (FIG. 8) into a plurality of areas.

Specifically, for example, the maximum luminance setting unit 13 acquires, as the maximum luminance value, the luminance value "1" associated with the luminance pixel LPX2 (0, 0), which is the highest value among the luminance values associated with each of the luminance pixels LPX2 (0, 0), LPX2 (1, 0), LPX2 (0, 1), and LPX2 (1, 1) corresponding to the first area AR1 in the corrected luminance image LIMB, and associates the maximum luminance value "1" with the first area AR1 as illustrated in FIGS. 8, 37, and 38. In addition, the maximum luminance setting unit 13 acquires x=0 and y=0 that are the coordinates of the luminance pixel LPX2 (0, 0) associated with the luminance value "1", associates the first area AR1 with the maximum luminance value "1" and the coordinates x=0 and y=0, and stores the associated values in the storage unit 50 as the area luminance value information 55.

In addition, the maximum luminance setting unit 13 acquires the highest value among the luminance values associated with each of the luminance pixels LPX2 (2, 0) and LPX2 (2, 1) corresponding to the second area AR2 in the corrected luminance image LIMB as a maximum luminance value. Since the luminance value "0" is associated with both the luminance pixels LPX2 (2, 0) and LPX2 (2, 1), the maximum luminance setting unit 13 acquires the luminance value "0" as a maximum luminance value, and associates the maximum luminance value "0" with the second area AR2. In addition, the maximum luminance setting unit 13 acquires the coordinates of one of the luminance pixel LPX2 (2, 0) and the luminance pixel LPX2 (2, 1) to which the luminance value "0" is assigned, for example, x=2 and y=0 which are the coordinates of the luminance pixel LPX2 (2, 0), associates the second area AR2 with the maximum luminance value "0" and the coordinates x=2 and y=0, and stores the associated values in the storage unit 50 as the area luminance value information 55.

In addition, the maximum luminance setting unit 13 acquires, as the maximum luminance value, the luminance value "0.9" associated with the luminance pixel LPX2 (4, 1), which is the highest value among the luminance values associated with each of the luminance pixels LPX2 (3, 0), LPX2 (4, 0), LPX2 (3, 1), and LPX2 (4, 1) corresponding to the third area AR3 in the corrected luminance image LIMB, and associates the maximum luminance value "0.9" with the third area AR3. In addition, the maximum luminance setting unit 13 acquires x=4 and y=1 that are the coordinates of the luminance pixel LPX2 (4, 1) associated with the luminance value "0.9", associates the third area AR3 with the maximum luminance value "0.9" and the coordinates x=4 and y=1, and stores the associated values in the storage unit 50 as the area luminance value information 55.

In addition, the maximum luminance setting unit 13 acquires, as the maximum luminance value, the luminance value "1" associated with the luminance pixel LPX2 (0, 2), which is the highest value among the luminance values associated with each of the luminance pixels LPX2 (0, 2) and LPX2 (1, 2) corresponding to the fourth area AR4 in the corrected luminance image LIMB, and associates the maximum luminance value "1" with the fourth area AR4. In addition, the maximum luminance setting unit 13 acquires x=0 and y=2 that are the coordinates of the luminance pixel LPX2 (0, 2) associated with the luminance value "1", associates the fourth area AR4 with the maximum luminance value "1" and the coordinates x=2 and y=2, and stores the associated values in the storage unit 50 as the area luminance value information 55.

In addition, since the luminance pixel LPX2 $(x, y)$ corresponding to the fifth area AR5 in the corrected luminance image LIMB is only the luminance pixel LPX2 (2, 2), the maximum luminance setting unit 13 acquires the luminance value "0.857" associated with the luminance pixel LPX2 (2, 2) as the maximum luminance value, and associates the maximum luminance value "0.857" with the fifth area AR5. In addition, the maximum luminance setting unit 13 acquires x=2 and y=2 that are the coordinates of the luminance pixel LPX2 (2, 2) associated with the luminance value "0.857", associates the fifth area AR5 with the maximum luminance value "0.857" and the coordinates x=2 and y=2, and stores the associated values in the storage unit 50 as the area luminance value information 55.

In addition, the maximum luminance setting unit 13 acquires the highest value among the luminance values associated with each of the luminance pixels LPX2 (3, 2) and LPX2 (4, 2) corresponding to the sixth area AR6 in the corrected luminance image LIMB as a maximum luminance value. Since the luminance value "0" is associated with both the luminance pixels LPX2 (3, 2) and LPX2 (4, 2), the maximum luminance setting unit 13 acquires the luminance value "0" as a maximum luminance value, and associates the maximum luminance value "0" with the sixth area AR6. In addition, the maximum luminance setting unit 13 acquires the coordinates of one of the luminance pixel LPX2 (3, 2) and the luminance pixel LPX2 (4, 2) to which the luminance value "0" is assigned, for example, x=3 and y=2 which are the coordinates of the luminance pixel LPX2 (3, 2), associates the sixth area AR6 with the maximum luminance value "0" and the coordinates x=3 and y=2, and stores the associated values in the storage unit 50 as the area luminance value information 55.

In addition, the maximum luminance setting unit 13 acquires the highest value among the luminance values associated with each of the luminance pixels LPX2 (0, 3), LPX2 (1, 3), LPX2 (0, 4), and LPX2 (1, 4) corresponding to the seventh area AR7 in the corrected luminance image LIMB as a maximum luminance value. Since the luminance value "0" is associated with all of the luminance pixels LPX2 (0, 3), LPX2 (1, 3), LPX2 (0, 4), and LPX2 (1, 4), the maximum luminance setting unit 13 acquires the luminance value "0" as the maximum luminance value, and associates the maximum luminance value "0" with the seventh area AR7. In addition, the maximum luminance setting unit 13 acquires the coordinates of any one of the luminance pixels LPX2 (0, 3), LPX2 (1, 3), LPX2 (0, 4), and LPX2 (1, 4) to which the luminance value "0" is assigned, for example, x=0 and y=3 which are the coordinates of the luminance pixel LPX2 (0, 3), associates the seventh area AR7 with the maximum luminance value "0" and the coordinates x=0 and y=3, and stores the associated values in the storage unit 50 as the area luminance value information 55.

In addition, the maximum luminance setting unit 13 acquires the highest value among the luminance values associated with each of the luminance pixels LPX2 (2, 3) and LPX2 (2, 4) corresponding to the eighth area AR8 in the corrected luminance image LIMB as a maximum luminance value. Since the luminance value "0" is associated with both the luminance pixels LPX2 (2, 3) and LPX2 (2, 4), the maximum luminance setting unit 13 acquires the luminance value "0" as a maximum luminance value, and associates the maximum luminance value "0" with the eighth area AR8. In addition, the maximum luminance setting unit 13 acquires the coordinates of one of the luminance pixel LPX2 (2, 3) and the luminance pixel LPX2 (2, 4) to which the luminance value "0" is assigned, for example, x=2 and y=3 which are the coordinates of the luminance pixel LPX2 (2, 3), associates the eighth area AR8 with the maximum luminance value "0" and the coordinates x=2 and y=3, and stores the associated values in the storage unit 50 as the area luminance value information 55.

In addition, the maximum luminance setting unit 13 acquires the highest value among the luminance values associated with each of the luminance pixels LPX2 (3, 3), LPX2 (4, 3), LPX2 (3, 4), and LPX2 (4, 4) corresponding to the ninth area AR9 in the corrected luminance image LIMB as a maximum luminance value. Since the luminance value "0" is associated with all of the luminance pixels LPX2 (3, 3), LPX2 (4, 3), LPX2 (3, 4), and LPX2 (4, 4), the maximum luminance setting unit 13 acquires the luminance value "0" as the maximum luminance value, and associates the maximum luminance value "0" with the ninth area AR9. In addition, the maximum luminance setting unit 13 acquires the coordinates of any one of the luminance pixels LPX2 (3, 3), LPX2 (4, 3), LPX2 (3, 4), and LPX2 (4, 4) to which the luminance value "0" is assigned, for example, x=3 and y=3 which are the coordinates of the luminance pixel LPX2 (3, 3), associates the ninth area AR9 with the maximum luminance value "0" and the coordinates x=3 and y=3, and stores the associated values in the storage unit 50 as the area luminance value information 55.

As described above, the maximum luminance setting unit 13 sets the maximum luminance value, which is the highest value among the luminance values in the corresponding area in the luminance image LIMB (FIG. 37) corrected with the second luminance distribution 59 (FIG. 36) representing the influence of the distribution of the light from the backlight BLB whose light emission is controlled by the local dimming, in association with each of the first area AR1 to the ninth area AR9 which are the plurality of areas. Thus, this makes it possible to determine transmittances in order from the first pixels PX1 of the first liquid crystal panel PN1 corresponding to the second pixels PX2 that require a larger amount of light in the second liquid crystal panel PN2 influenced with the light distribution due to the light emission control by the local dimming.

FIG. 39 is a diagram schematically illustrating the area luminance value information 55 according to the third embodiment. As illustrated in FIG. 39, the order setting unit 14 (see FIG. 35) refers to the area luminance value information 55 stored in the storage unit 50, and sets the order of the first area AR1 to the ninth area AR9 in descending order of maximum luminance values. The order setting unit 14 stores the area luminance value information 55 in which the order of the first area AR1 to the ninth area AR9 is set in descending order of associated maximum luminance values in the storage unit 50.

The order has changed in the example shown in FIG. 39 in which the first area is first in order, the fourth area is second in order, the third area is third in order, and the fifth area is fourth in order, from the order of the area luminance value information 55 (FIG. 17) of the first embodiment in which the first area is first in order, the third area is second in order, the fourth area is third in order, and the fifth area is fourth in order.

Figure 40:
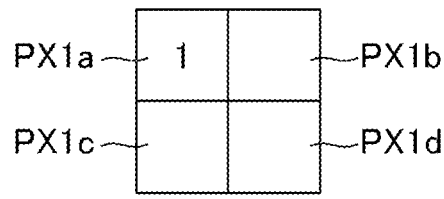
FIG. 40 is a diagram illustrating a state in which a transmittance is set for a first pixel of interest according to the third embodiment.

FIG. 40 is a diagram illustrating a state in which a transmittance is set for a first pixel of interest according to the third embodiment. The first transmittance setting unit 15 (FIG. 35) generates the transmittances of the plurality of first pixels PX1$a$, PX1$b$, PX1$c$, and PX1$d$ in the order set by the order setting unit 14 based on the maximum luminance values associated with the first area AR1 to the ninth area AR9, respectively.

As described in the first embodiment, the first transmittance setting unit 15 calculates the transmittance of a pixel of interest, which is a first pixel PX1 whose transmittance is to be determined, using the above-described (Expression 1), to be specific, the above-described (Expression 2).

Since the first transmittance setting unit 15 refers to the field first in order in the area luminance value information 55 (FIG. 39) stored in the storage unit 50, and the first in order is the first area AR1 and the coordinates x=0 and γ=0 are associated with the maximum luminance value "1", α=1 is substituted into the above-described (Expression 2) based on the maximum luminance value "1".

Then, the first transmittance setting unit 15 refers to the area transmittance coefficient information 54 (FIG. 14), acquires the transmittance coefficient "1.0" associated with the first area AR1, and substitutes γ=1.0 into the above (Expression 2).

Since the first area AR1 is the non-overlapping area NOA overlapping only the first pixel PX1$a$ among the first pixels PX1$a$ to PX1$d$, the first transmittance setting unit 15 determines that the pixel of interest is the one first pixel PX1$a$, substitutes δ=1, determines that there is no first pixel PX1 that influences the first area AR1 with transmitted light together with the pixel of interest, and substitutes β=0. Therefore, Σβ=0 is satisfied.

The first transmittance setting unit 15 calculates the transmittance of the first pixel PX1$a$, which is the pixel of interest, from (Expression 2) as follows.

(1.0−(0)×1.0)/(1.0×1)=1.0

That is, since the first area AR1 is the non-overlapping area NOA overlapping only the first pixel PX1$a$ and is not influenced by transmitted light from the first pixels PX1 other than the first pixel PX1$a$, the first transmittance setting unit 15 sets the maximum luminance value "1" without change as the transmittance of the first pixel PX1$a$ which is the pixel of interest.

Figure 41:
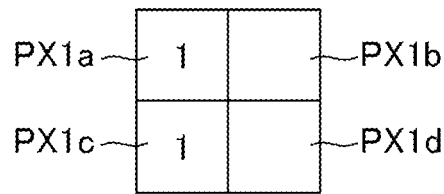
FIG. 41 is a diagram illustrating a state in which a transmittance is set for a second pixel of interest according to the third embodiment.

FIG. 41 is a diagram illustrating a state in which a transmittance is set for a second pixel of interest according to the third embodiment. Next, the first transmittance setting unit 15 calculates the transmittance of the second pixel of interest.

Since the first transmittance setting unit 15 refers to the field second in order in the area luminance value information 55 (FIG. 39) stored in the storage unit 50, and the second in order in the area luminance value information 55 is the fourth area AR4 and the coordinates x=0 and γ=2 are associated with the maximum luminance value "1", α=1 is substituted into the above-described (Expression 2) based on the maximum luminance value "1".

Then, the first transmittance setting unit 15 refers to the area transmittance coefficient information 54 (FIG. 14), acquires the transmittance coefficient "0.5" associated with the fourth area AR4, and substitutes γ=0.5 into the above (Expression 2).

In addition, since the fourth area AR4 is the non-overlapping area NOA overlapping both the first pixel PX1$a$ and the first pixel PX1$c$ among the first pixels PX1$a$ to the first pixel PX1$d$, the fourth area AR4 is influenced by transmitted light from both the first pixel PX1$a$ and the first pixel PX1$c$. Since the transmittance of the first pixel PX1$a$ among the first pixels PX1$a$ and PX1$c$ has already been set (FIG. 40), the first transmittance setting unit 15 determines the one first pixel PX1$c$ for which no transmittance has been set as a pixel of interest and substitutes δ=1, and since the transmittance of the first pixel PX1$a$ that influences the fourth area AR4 with transmitted light together with the first pixel PX1$c$ as the pixel of interest is 1.0, substitutes β=1.0. Therefore, Σβ=1.0 is satisfied.

The first transmittance setting unit 15 calculates the transmittance of the first pixel PX1$c$, which is the pixel of interest, from (Expression 2) as follows.

(1.0−(1.0)×0.5)/(0.5×1)=1.0

As described above, among the first pixel PX1$a$ and the first pixel PX1$c$ (FIG. 8) overlapping the fourth area AR4 that is the overlapping area OA, the first transmittance setting unit 15 sets, as the transmittance of the first pixel PX1$c$ that is the pixel of interest, an insufficient value of the transmittance of the first pixel PX1$a$ for which the transmittance has already been set to influence the fourth area AR4 for the maximum luminance value "1.0" (FIG. 39) associated with the fourth area AR4.

Specifically, the first transmittance setting unit 15 multiplies the transmittance coefficient "0.5" (FIG. 14) indicating the proportion at which the first pixel PX1$a$ influences the fourth area AR4 with transmitted light by the transmittance "1.0" (FIG. 40) of the first pixel PX1$a$ for which the transmittance has already been set among the first pixel PX1$a$ and the first pixel PX1$c$ overlapping the fourth area AR4 which is the overlapping area OA, thereby obtaining the transmittance "0.5" ("1.0"×"0.5") at which the first pixel PX1$a$ influences the fourth area AR4.

As a result, it can be seen that whereas the transmittance required for the fourth area AR4 is the maximum luminance value "1.0" (FIG. 39), the first pixel PX1$a$ for which the transmittance has already been set influences the fourth area AR4 at the transmittance "0.5".

Thus, the first transmittance setting unit 15 divides the value "0.5", which is obtained by subtracting the transmittance "0.5" at which the first pixel PX1$a$ influences the fourth area AR4 for transmittance from the maximum luminance value "1.0" which is the transmittance required for the fourth area AR4, by the value "0.5" (the transmittance coefficient "0.5"×the number of pixels of interest "1.0") indicating the proportion at which the one first pixel PX1c as the pixel of interest influences the fourth area AR4 with transmitted light, thereby obtaining the "insufficient value" "1.0". The first transmittance setting unit 15 sets "1.0", which is the "insufficient value", as the transmittance of the first pixel PX1c.

Figure 42:
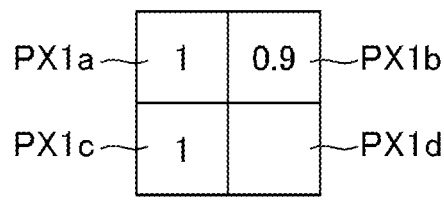
FIG. 42 is a diagram illustrating a state in which a transmittance is set for a third pixel of interest according to the third embodiment.

FIG. 42 is a diagram illustrating a state in which a transmittance is set for a third pixel of interest according to the third embodiment. Next, the first transmittance setting unit 15 calculates the transmittance of the third pixel of interest.

Since the first transmittance setting unit 15 refers to the field third in order in the area luminance value information 55 (FIG. 39) stored in the storage unit 50, and the third in order in the area luminance value information 55 is the third area AR3 and the coordinates x=4 and y=1 are associated with the maximum luminance value "0.9", at =0.9 is substituted into the above-described (Expression 2) based on the maximum luminance value "0.9".

Then, the first transmittance setting unit 15 refers to the area transmittance coefficient information 54 (FIG. 14), acquires the transmittance coefficient "1.0" associated with the third area AR3, and substitutes γ=1.0 into the above (Expression 2).

Since the third area AR3 is the non-overlapping area NOA overlapping only the first pixel PX1b among the first pixels PX1a to PX1d, the first transmittance setting unit 15 determines that the pixel of interest is the one first pixel PX1b, substitutes δ=1, determines that there is no first pixel PX1 that influences the third area AR3 with transmitted light together with the pixel of interest, and substitutes β=0. Therefore, Σβ=0 is satisfied.

The first transmittance setting unit 15 calculates the transmittance of the first pixel PX1b, which is the pixel of interest, from (Expression 2) as follows.

$(0.9-(0)\times1.0)/(1.0\times1)=0.9$

That is, since the third area AR3 is the non-overlapping area NOA overlapping only the first pixel PX1b and is not influenced by transmitted light from the first pixels PX1 other than the first pixel PX1b, the first transmittance setting unit 15 sets the maximum luminance value "0.9" without change as the transmittance of the first pixel PX1b which is the pixel of interest.

Figure 43:
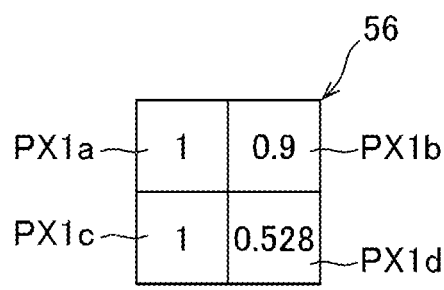
FIG. 43 is a diagram illustrating a state in which a transmittance is set for a fourth pixel of interest according to the third embodiment.

FIG. 43 is a diagram illustrating a state in which a transmittance is set for a fourth pixel of interest according to the third embodiment. Next, the first transmittance setting unit 15 calculates the transmittance of the fourth pixel of interest.

Since the first transmittance setting unit 15 refers to the field fourth in order in the area luminance value information 55 (FIG. 39) stored in the storage unit 50, and the fourth in order in the area luminance value information 55 is the fifth area AR5 and the coordinates x=2 and y=2 are associated with the maximum luminance value "0.857", α=0.857 is substituted into the above-described (Expression 2) based on the maximum luminance value "0.857".

Then, the first transmittance setting unit 15 refers to the area transmittance coefficient information 54 (FIG. 14), acquires the transmittance coefficient "0.25" associated with the fifth area AR5, and substitutes γ=0.25 into the above (Expression 2).

In addition, since the fifth area AR5 is the overlapping area OA overlapping all of the four first pixel PX1a to the first pixel PX1d, the fifth area AR5 is influenced by transmitted light from all of the four first pixel PX1a to the first pixel PX1d. Since the transmittances of the first pixel PX1a, the first pixel PX1b, and the first pixel PX1c among the first pixels PX1a to PX1d have already been set as illustrated in FIGS. 40 to 42, the first transmittance setting unit 15 determines the one first pixel PX1d for which no transmittance has been set as a pixel of interest and substitutes δ=1, and since the transmittances of the first pixel PX1a, the first pixel PX1b, and the first pixel PX1c that influence the fifth area AR5 with transmitted light together with the first pixel PX1d as the pixel of interest are 1.0, 0.9, and 1.0, substitutes Σβ=1.0+0.9+1.0.

The first transmittance setting unit 15 calculates the transmittance of the first pixel PX1d, which is the pixel of interest, from (Expression 2) as follows.

$(0.857-(1.0+0.9+1.0)\times0.25)/(0.25\times1)=0.528$

As described above, among the first pixel PX1a, the first pixel PX1b, the first pixel PX1c, and the first pixel PX1d (FIG. 8) overlapping the fifth area AR5 that is the overlapping area OA, the first transmittance setting unit 15 sets, as the transmittance of the first pixel PX1d that is the pixel of interest, an insufficient value of the transmittances of the first pixel PX1a, the first pixel PX1b, and the first pixel PX1c for which the transmittances have already been set to influence the fifth area AR5 for the maximum luminance value "0.857" (FIG. 39) associated with the fifth area AR5.

To be more specific, the first transmittance setting unit 15 sums up the transmittance "1.0" of the first pixel PX1a, the transmittance "0.9" of the first pixel PX1b, and the transmittance "1.0" of the first pixel PX1c (FIG. 43) for which the transmittances have already been set among the first pixels PX1a, PX1b, PX1c, and PX1d overlapping the fifth area AR5 that is the overlapping area OA, and multiplies the sum by the transmittance coefficient "0.25" (FIG. 14) indicating the proportion at which the first pixels PX1a, PX1b, and PX1c influence the fifth area AR5 with transmitted light, thereby obtaining the transmittance "0.725" (=("1.0"+ "0.9"+"1.0")×"0.25") at which the first pixels PX1a, PX1b, and PX1c influence the fifth area AR5.

As a result, it can be seen that whereas the transmittance required for the fifth area AR5 is the maximum luminance value "0.857" (FIG. 39), the first pixels PX1a, PX1b, and PX1c for which the transmittances have already been set influence the fifth area AR5 at the transmittance "0.725".

Thus, the first transmittance setting unit 15 divides the value "0.132", which is obtained by subtracting the transmittance "0.725" at which the first pixels PX1a, PX1b, and PX1c influence the fifth area AR5 for transmittance from the maximum luminance value "0.857" which is the transmittance required for the fifth area AR5, by the value "0.25" (the transmittance coefficient "0.25"×the number of pixels of interest "1.0") indicating the proportion at which the one first pixel PX1d as the pixel of interest influences the fifth area AR5 with transmitted light, thereby obtaining the "insufficient value" "0.528". The first transmittance setting unit 15 sets "0.528", which is the "insufficient value", as the transmittance of the first pixel PX1d.

Accordingly, the first transmittance setting unit 15 generates the first liquid crystal panel display signal 56 for setting the transmittance "1.0" for the first pixel PX1a, the transmittance "0.9" for the first pixel PX1b, the transmittance "1.0" for the first pixel PX1c, and the transmittance "0.528" for the first pixel PX1d, and stores the generated first liquid crystal panel display signal 56 in the storage unit 50.

In addition, the first transmittance setting unit 15 outputs the first liquid crystal panel display signal 56 to the first liquid crystal panel PN1, thereby driving the first pixel PX1a, the first pixel PX1b, the first pixel PX1c, and the first pixel PX1d to have the transmittances set in the first liquid crystal panel display signal 56 of "1.0", "0.9", "1.0", and "0.528", respectively. Furthermore, the first transmittance setting unit 15 outputs the first liquid crystal panel display signal 56 to the first luminance distribution generation unit 16B.

When the first luminance distribution generation unit 16B illustrated in FIG. 35 acquires the first liquid crystal panel display signal 56 from the first transmittance setting unit 15, and acquires the second luminance distribution that is a luminance distribution at the resolution of the first liquid crystal panel PN1 from the second luminance distribution generation unit 18, the first luminance distribution generation unit 16B generates the first luminance distribution 57, which is information indicating the percentage of light transmitted through the first liquid crystal panel PN1 for each of the plurality of second pixels PX2 ($x$, $y$), based on the transmittance set for each of the plurality of first pixels PX1. For example, the first luminance distribution generation unit 16B generates the corrected first liquid crystal panel display signal 56 by multiplying the transmittance of each first pixel PX1 of the first liquid crystal panel display signal 56 by the luminance at the corresponding position in the second luminance distribution which is the luminance distribution at the resolution of the first liquid crystal panel PN1. The corrected first liquid crystal panel display signal 56 corresponds to the amount of light transmitted through each first pixel PX1 of the first liquid crystal panel PN1.

The first luminance distribution 57 is generated by convolving the transmittance of each first pixel PX1 of the corrected first liquid crystal panel display signal 56 with a "point spread function (PSF)" indicating how light spreads from each first pixel PX1 of the first liquid crystal panel PN1 to the second liquid crystal panel PN2, similarly to the first embodiment. After generating the first luminance distribution 57, the first luminance distribution generation unit 16B outputs the first luminance distribution 57 to the second transmittance setting unit 17 (FIG. 35).

The second transmittance setting unit 17 (FIG. 35) corrects the input image Sin based on the first luminance distribution 57 to set the transmittance of the plurality of second pixels PX2, thereby generating the second liquid crystal panel display signal 58, similarly to the first embodiment. The second transmittance setting unit 17 controls the transmittance of each of the plurality of second pixels PX2 by outputting the generated second liquid crystal panel display signal 58 to the second liquid crystal panel PN2.

Figure 44:
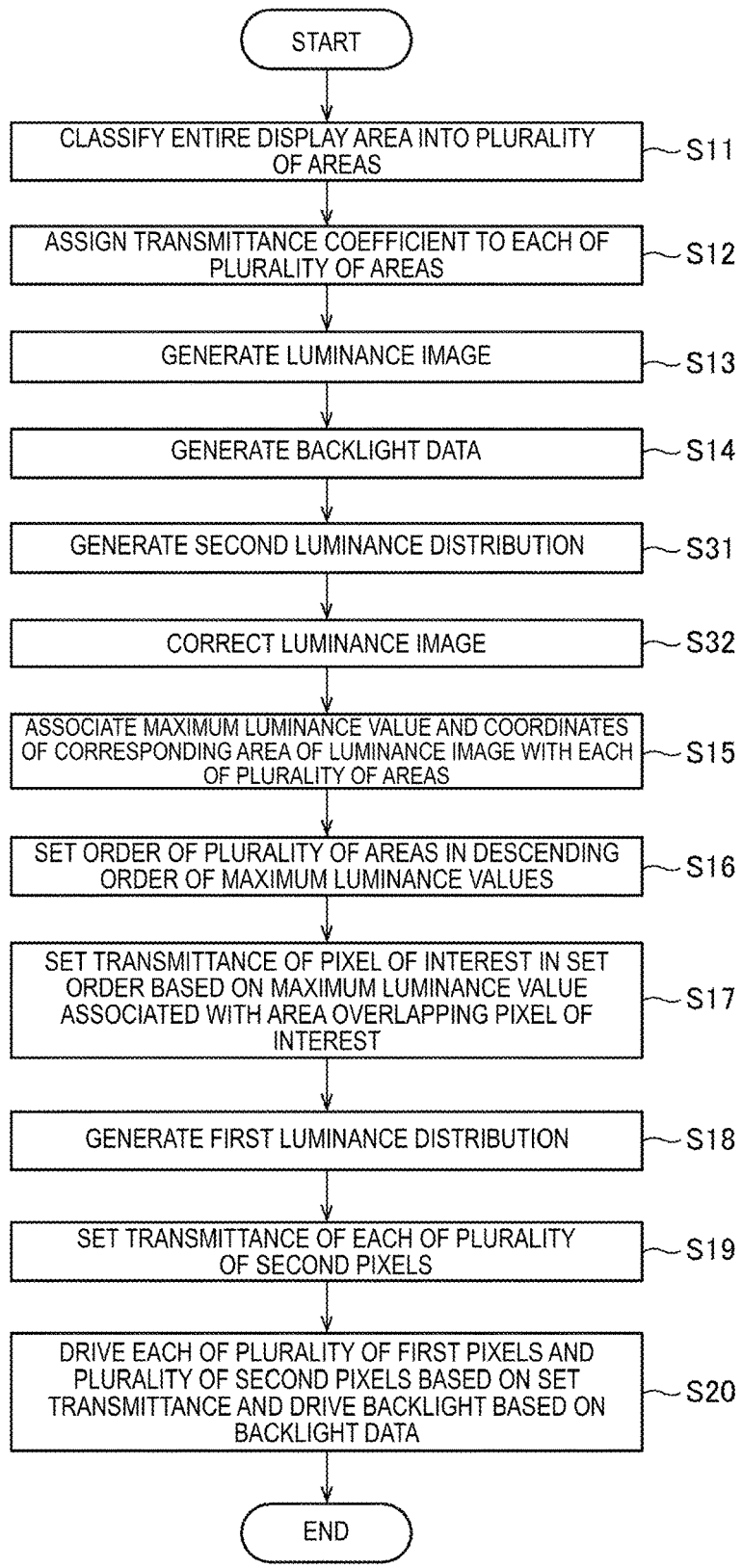
FIG. 44 is a flowchart depicting the flow of processing of the image display device according to the third embodiment.

FIG. 44 is a flowchart depicting the flow of processing of the image display device 1B according to the third embodiment. By performing the processing of steps S11 to S14 described with reference to FIG. 31, the area classifying unit 20 (FIG. 35) classifies the display area DA into a plurality of areas based on the overlapping and non-overlapping area information 51 to generate the area classification information 52 and store the area classification information 52 in the storage unit 50 (step S11), the area classifying unit 20 generates the area transmittance coefficient information 54 in which a transmittance coefficient is assigned to each of the plurality of areas obtained by classifying the study target area TA into multiple areas and stores the area transmittance coefficient information 54 in the storage unit 50 (step S12), the luminance image generation unit 11 generates the luminance image LIM (FIG. 15) (step S13), and the backlight data generation unit 12B generates the backlight data for controlling the luminance for each of a plurality of light-emitting regions in the backlight BLB (step S14).

Next, in step S31, the second luminance distribution generation unit 18 generates the second luminance distribution 59 based on the backlight data generated by the backlight data generation unit 12B. Next, in step S32, the luminance image correction unit 19 generates the corrected luminance image LIMB (FIG. 37) by correcting the luminance image LIM with the second luminance distribution 59.

Next, by performing the processing of steps S15 to S20 described with reference to FIG. 31, the maximum luminance setting unit 13 (FIG. 35) generates the area luminance value information 55 in which a maximum luminance value and coordinates are associated with each of the plurality of areas and stores the associated result in the storage unit 50 (step S15), the order setting unit 14 (FIG. 35) sets the order of the plurality of areas in descending order of maximum luminance values with reference to the area luminance value information 55 (step S16), the first transmittance setting unit 15 (FIG. 35) generates the first liquid crystal panel display signal 56 by setting a transmittance of each of a plurality of first pixels PX1 in the order set by the order setting unit 14 based on the maximum luminance value associated with an overlapping area (step S17), the first luminance distribution generation unit 16B (FIG. 35) generates the first luminance distribution 57 of the study target area TA (step S18), the second transmittance setting unit 17 (FIG. 35) generates the second liquid crystal panel display signal 58 of the study target area TA (step S19), the first transmittance setting unit 15 (FIG. 35) controls driving of the plurality of first pixels PX1 corresponding to the study target area TA based on the first liquid crystal panel display signal 56, and the second transmittance setting unit 17 (FIG. 35) controls driving of a plurality of second pixels PX2 corresponding to the study target area TA and the backlight data generation unit 12B controls driving of the backlight BLB based on the backlight data (step S20).

In step S17, the first transmittance setting unit 15 sets the transmittances for the first pixels PX1a to PX1d to be larger values overall, as in the first liquid crystal panel display signal 56 illustrated in FIG. 43, than those in the first liquid crystal panel display signal 56 illustrated in FIG. 18. Since light emission of the backlight BLB (FIG. 35) according to the third embodiment is controlled by local dimming, unlike the backlight BL (FIG. 7), the first transmittance setting unit 15 sets the transmittance of each of the first pixels PX1 of the first liquid crystal panel PN1 to increase the aperture ratio (transmittance) of each of the first pixels PX1 by the amount of light reduced, as compared to the backlight BL (FIG. 7) in which light emission is integrally controlled over the entire surface, rather than being controlled by local dimming. As described above, when the aperture ratio (transmittance) of the first liquid crystal panel PN1 increases, the amount of light from the backlight BLB blocked by the first liquid crystal panel PN1 decreases, and thus, it is possible to increase the usage efficiency of light from the backlight BLB and thereby to contribute to energy saving.

Further, the processing of step S11 and step S12 performed by the area classifying unit 20 may be executed outside the image processing device 10 in advance, and the area classification information 52 (FIG. 9) and the area transmittance coefficient information 54 (FIG. 14) which are the processing results may be stored in the storage unit 50. In this case, the image processing device 10 may not include the area classifying unit 20, and may not store the overlapping and non-overlapping area information 51 and the transmittance coefficient information 53 in the storage unit 50.

Fourth Embodiment

Figure 45:
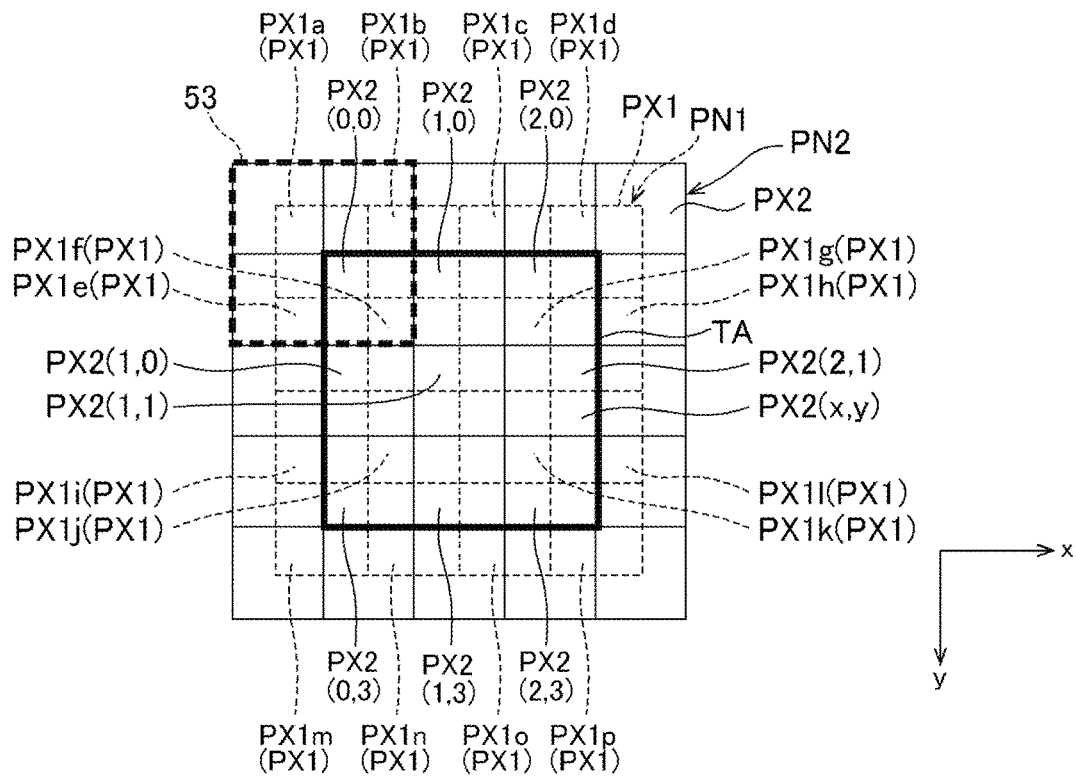
FIG. 45 is a diagram for describing each region in a second liquid crystal panel overlapping a first liquid crystal panel according to a fourth embodiment.

FIG. 45 is a diagram for describing each region in a second liquid crystal panel PN2 overlapping a first liquid crystal panel PN1 according to a fourth embodiment. Resolutions of the first liquid crystal panel PN1 and the second liquid crystal panel PN2 may be the same. Further, the functional block diagram of an image display device 1 according to the fourth embodiment is the same as the functional block diagram illustrated in FIG. 7.

As an example, the first liquid crystal panel PN1 is represented by a plurality of first pixels PX1 corresponding to 4×4 pixels, and the second liquid crystal panel PN2 is represented by a plurality of second pixels PX2 corresponding to 5×5 pixels. In the example illustrated in FIG. 45, the first pixels PX1 and the second pixels PX2 have the same size, and the second pixels PX2 are disposed being shifted by a half pixel in the x direction and the y direction with respect to the first pixels PX1.

With respect to the plurality of first pixels PX1, the four first pixels PX1 arranged in the row direction (lateral direction) in the topmost row are sequentially referred to as a first pixel PX1a, a first pixel PX1b, a first pixel PX1c, and a first pixel PX1d in the positive-x direction. In addition, the four first pixels PX1 arranged in the row direction (lateral direction) in the second row, which is one row lower from the top row, are sequentially referred to as a first pixel PX1e, a first pixel PX1f, a first pixel PX1g, and a first pixel PX1h in the positive-x direction. In addition, the four first pixels PX1 arranged in the row direction (lateral direction) in the third row, which is two rows lower from the top row, are sequentially referred to as a first pixel PX1i, a first pixel PX1j, a first pixel PX1k, and a first pixel PX1l in the positive-x direction. In addition, the four first pixels PX1 arranged in the row direction (lateral direction) in the fourth row (bottom row), which is three rows lower from the top row, are sequentially referred to as a first pixel PX1m, a first pixel PX1n, a first pixel PX1o, and a first pixel PX1p in the positive-x direction.

In the example illustrated in FIG. 45, the transmittance coefficient information 53 indicates that the first pixel PX1a of the first liquid crystal panel PN1 influences 2×2 second pixels PX2 of the second liquid crystal panel PN2 with transmitted light.

In order to simplify description, it is assumed that a study target area TA is an area in which 3×3 second pixels PX2 are arranged in a matrix shape surrounded by a plurality of second pixels PX2 positioned at the edges in a frame-like shape. Further, the number of pixels included in the study target area TA is not limited to 3×3 pixels, and even more pixels may be included in the area.

Figure 46:
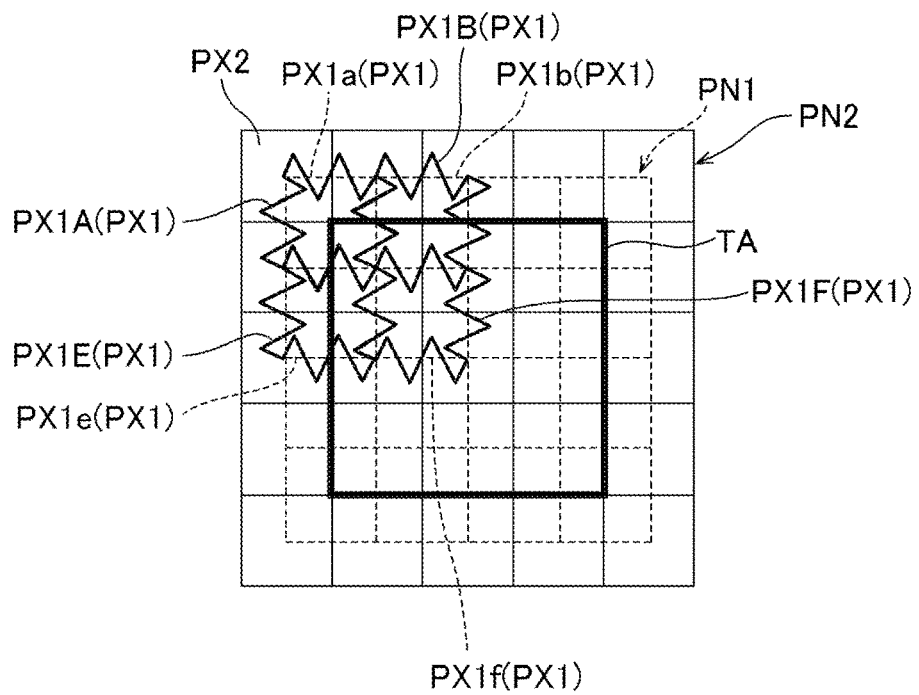
FIG. 46 is a diagram illustrating a state in which a first pixel of the first liquid crystal panel overlaps a second pixel of the second liquid crystal panel according to the fourth embodiment.

FIG. 46 is a diagram illustrating a state in which first pixels PX1 of the first liquid crystal panel PN1 overlap second pixel PX2 of the second liquid crystal panel PN2 according to the fourth embodiment. Although the first pixels PX1 are illustrated having the square shape in FIG. 45, the first pixels may have edges with an uneven shape and may fit into the adjacent pixels as illustrated in FIG. 46. In other words, the edges of the first pixels PX1 having the uneven shape in the first liquid crystal panel PN1 may be engaged with the edges of the adjacent first pixels PX1 having the uneven shape. For example, the first pixel PX1a illustrated having the square shape may be a first pixel PX1A having an edge with an uneven shape, the first pixel PX1b illustrated having the square shape may be a first pixel PX1B having an edge with an uneven shape, the first pixel PX1e illustrated having the square shape may be a first pixel PX1E having an edge with an uneven shape, and the first pixel PX1f illustrated having the square shape may be a first pixel PX1F having an edge with an uneven shape.

Figure 47:
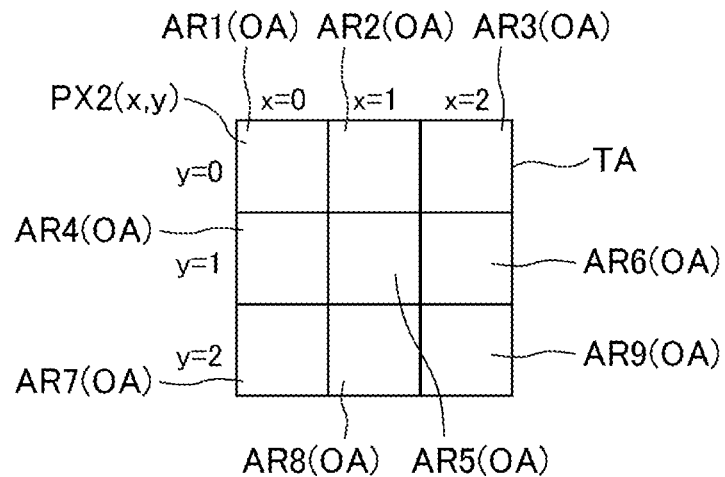
FIG. 47 is a diagram illustrating a study target area classified into a plurality of areas according to the fourth embodiment.

FIG. 47 is a diagram illustrating a study target area TA classified into a plurality of areas according to the fourth embodiment. As illustrated in FIGS. 45 and 47, the study target area TA is an area constituted by 3×3 second pixels PX2 (x, y). The area classifying unit 20 (FIG. 7) refers to the overlapping and non-overlapping area information 51 (FIG. 7) stored in the storage unit 50 and classifies the study target area TA into a plurality of areas. The area classifying unit 20 stores information about the classification of the area thus obtained in the storage unit 50 as the area classification information 52.

Specifically, the area classifying unit 20 refers to the overlapping and non-overlapping area information 51 (FIG. 7) to determine that the second pixel PX2 (0, 0) overlaps the edges of each of the first pixel PX1a, the first pixel PX1b, the first pixel PX1e, and the first pixel PX1f, and that pixels that mainly receive transmitted light are the first pixel PX1a, the first pixel PX1b, the first pixel PX1e, and the first pixel PX1f in the overlapping area OA, and classifies the area constituted by the second pixel PX2 (0, 0) as a first area AR1. In addition, the area classifying unit 20 refers to the overlapping and non-overlapping area information 51 (FIG. 7) to determine that the second pixel PX2 (1, 0) overlaps the edges of each of the first pixel PX1b, the first pixel PX1c, the first pixel PX1f, and the first pixel PX1g, and that pixels that mainly receive transmitted light are the first pixel PX1b, the first pixel PX1c, the first pixel PX1f, and the first pixel PX1g in the overlapping area OA, and classifies the area constituted by the second pixel PX2 (1, 0) as a second area AR2. In addition, the area classifying unit 20 refers to the overlapping and non-overlapping area information 51 (FIG. 7) to determine that the second pixel PX2 (2, 0) overlaps the edges of each of the first pixel PX1c, the first pixel PX1d, the first pixel PX1g, and the first pixel PX1h, and that pixels that mainly receive transmitted light are the first pixel PX1c, the first pixel PX1d, the first pixel PX1g, and the first pixel PX1h in the overlapping area OA, and classifies the area constituted by the second pixel PX2 (2, 0) as a third area AR3.

In addition, the area classifying unit 20 refers to the overlapping and non-overlapping area information 51 (FIG. 7) to determine that the second pixel PX2 (0, 1) overlaps the edges of each of the first pixel PX1e, the first pixel PX1f, the first pixel PX1i, and the first pixel PX1j, and that pixels that mainly receive transmitted light are the first pixel PX1e, the first pixel PX1f, the first pixel PX1i, and the first pixel PX1j in the overlapping area OA, and classifies the area constituted by the second pixel PX2 (0, 1) as a fourth area AR4. In addition, the area classifying unit 20 refers to the overlapping and non-overlapping area information 51 (FIG. 7) to determine that the second pixel PX2 (1, 1) overlaps the edges of each of the first pixel PX1f, the first pixel PX1g, the first pixel PX1j, and the first pixel PX1k, and that pixels that mainly receive transmitted light are the first pixel PX1f, the first pixel PX1g, the first pixel PX1j, and the first pixel PX1k in the overlapping area OA, and classifies the area constituted by the second pixel PX2 (1, 1) as a fifth area AR5. In addition, the area classifying unit 20 refers to the overlapping and non-overlapping area information 51 (FIG. 7) to determine that the second pixel PX2 (2, 1) overlaps the edges of each of the first pixel PX1*g*, the first pixel PX1*h*, the first pixel PX1*k*, and the first pixel PX1*l*, and that pixels that mainly receive transmitted light are the first pixel PX1*g*, the first pixel PX1*h*, the first pixel PX1*k*, and the first pixel PX1*l* in the overlapping area OA, and classifies the area constituted by the second pixel PX2 (2, 1) as a sixth area AR6.

In addition, the area classifying unit 20 refers to the overlapping and non-overlapping area information 51 (FIG. 7) to determine that the second pixel PX2 (0, 2) overlaps the edges of each of the first pixel PX1*i*, the first pixel PX1*j*, the first pixel PX1*m*, and the first pixel PX1*n*, and that pixels that mainly receive transmitted light are the first pixel PX1*i*, the first pixel PX1*j*, the first pixel PX1*m*, and the first pixel PX1*n* in the overlapping area OA, and classifies the area constituted by the second pixel PX2 (0, 2) as a seventh area AR7. In addition, the area classifying unit 20 refers to the overlapping and non-overlapping area information 51 (FIG. 7) to determine that the second pixel PX2 (1, 2) overlaps the edges of each of the first pixel PX1*j*, the first pixel PX1*k*, the first pixel PX1*n*, and the first pixel PX1*o*, and that pixels that mainly receive transmitted light are the first pixel PX1*j*, the first pixel PX1*k*, the first pixel PX1*n*, and the first pixel PX1*o* in the overlapping area OA, and classifies the area constituted by the second pixel PX2 (2, 1) as an eighth area AR8. In addition, the area classifying unit 20 refers to the overlapping and non-overlapping area information 51 (FIG. 7) to determine that the second pixel PX2 (2, 2) overlaps the edges of each of the first pixel PX1*k*, the first pixel PX1*l*, the first pixel PX1*o*, and the first pixel PX1*p*, and that pixels that mainly receive transmitted light are the first pixel PX1*k*, the first pixel PX1*l*, the first pixel PX1*o*, and the first pixel PX1*p* in the overlapping area OA, and classifies the area constituted by the second pixel PX2 (2, 2) as a ninth area AR9.

As described above, each of the second pixels PX2 ($x$, $y$) constituting the study target area TA according to the fourth embodiment is one area, and all of the areas (the first area AR1 to the ninth area AR9) are the overlapping areas OA.

Figure 48:
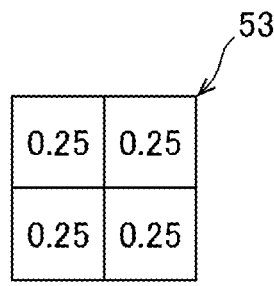
FIG. 48 is a diagram illustrating transmittance coefficient information according to the fourth embodiment.

FIG. 48 is a diagram illustrating transmittance coefficient information 53 according to the fourth embodiment. The transmittance coefficient information 53 according to the fourth embodiment includes 2×2 transmittance coefficient pixels IPX which are pixels corresponding to each of a plurality of second pixels PX2. Since each second pixel PX2 ($x$, $y$) according to the fourth embodiment overlaps four first pixels PX1, "0.25" which is the value obtained by dividing "1.0" which is the maximum transmittance coefficient by 4, is assigned to each of the 2×2 transmittance coefficient pixels IPX.

Figure 49:
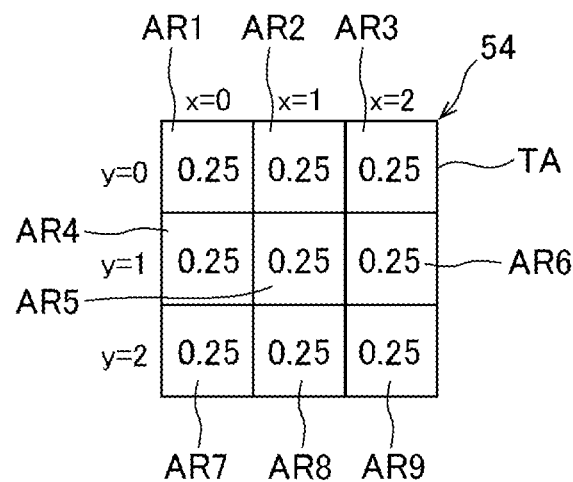
FIG. 49 is a diagram illustrating area transmittance coefficient information according to the fourth embodiment.

FIG. 49 is a diagram illustrating area transmittance coefficient information 54 according to the fourth embodiment. The area classifying unit 20 generates the area transmittance coefficient information 54 in which the transmittance coefficient "0.25" is associated to each of the first area AR1 to the ninth area AR9 in the study target area TA based on the transmittance coefficient information 53.

Figure 50:
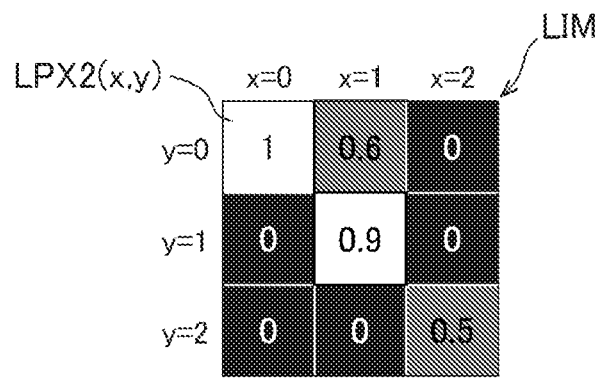
FIG. 50 is a diagram illustrating a luminance image according to the fourth embodiment.

FIG. 50 is a diagram illustrating a luminance image LIM according to the fourth embodiment. The luminance image generation unit 11 (see FIG. 7) generates a luminance image LIM representing luminance values corresponding to each of the plurality of pixels PX2 ($x$, $y$) of the second liquid crystal panel PN2 based on an input image Sin input from the outside. The luminance image LIM includes 3×3 luminance pixels LPX2 ($x$, $y$) which are pixels corresponding to each of the plurality of second pixels PX2 ($x$, $y$) of the study target area TA. For example, the luminance pixel LPX2 (0, 0) is associated with the luminance value "1", the luminance pixel LPX2 (1, 0) is associated with the luminance value "0.6", the luminance pixel LPX2 (1, 1) is associated with the luminance value "0.9", the luminance pixel LPX2 (2, 2) is associated with the luminance value "0.5", and the other luminance pixels LPX2 ($x$, $y$) are associated with the luminance value "0".

Figure 51:
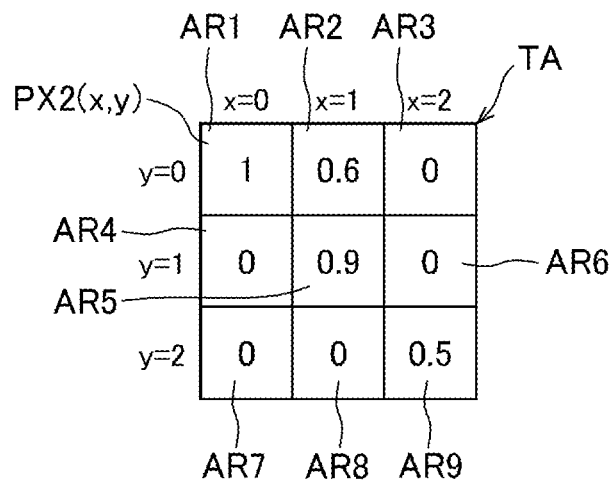
FIG. 51 is a diagram illustrating a study target area in which luminance values are associated with each of a plurality of areas according to the fourth embodiment.

FIG. 51 is a diagram illustrating a study target area TA in which the luminance values are associated with each of the plurality of areas according to the fourth embodiment. As illustrated in FIGS. 50 and 51, the maximum luminance setting unit 13 (FIG. 7) sets each of the first area AR1 to the ninth area AR9 in the study target area TA in association with the maximum luminance value that is the highest value among the luminance values of the corresponding areas in the luminance image LIM based on the luminance image LIM (FIG. 50) acquired from the luminance image generation unit 11 and the area classification information 52. In other words, each second pixel PX2 ($x$, $y$) is associated with a luminance value associated with the luminance pixel LPX2 ($x$, $y$) at the corresponding position in the luminance image LIM.

In particular, as illustrated in FIGS. 50 and 51, for example, the maximum luminance setting unit 13 acquires the luminance value "1" associated with the luminance pixel LPX2 (0, 0) in the luminance image LIM corresponding to the coordinates of the second pixel PX2 (0, 0) included in the first area AR1 as the maximum luminance value, and associates the maximum luminance value "1" with the first area AR1. In addition, the maximum luminance setting unit 13 acquires $x=0$ and $y=0$ that are the coordinates of the luminance pixel LPX2 (0, 0) associated with the luminance value "1", associates the first area AR1 with the maximum luminance value "1" and the coordinates $x=0$ and $y=0$, and stores the associated values in the storage unit 50 as the area luminance value information 55. In addition, the maximum luminance setting unit 13 acquires the luminance value "0.6" associated with the luminance pixel LPX2 (1, 0) in the luminance image LIM corresponding to the coordinates of the second pixel PX2 (1, 0) included in the second area AR2 as the maximum luminance value, and associates the maximum luminance value "0.6" with the second area AR2. In addition, the maximum luminance setting unit 13 acquires $x=1$ and $y=0$ that are the coordinates of the luminance pixel LPX2 (1, 0) associated with the luminance value "0.6", associates the second area AR2 with the maximum luminance value "0.6" and the coordinates $x=1$ and $y=0$, and stores the associated values in the storage unit 50 as the area luminance value information 55. In addition, the maximum luminance setting unit 13 acquires the luminance value "0" associated with the luminance pixel LPX2 (2, 0) in the luminance image LIM corresponding to the coordinates of the second pixel PX2 (2, 0) included in the third area AR3 as the maximum luminance value, and associates the maximum luminance value "0" with the third area AR3. In addition, the maximum luminance setting unit 13 acquires $x=2$ and $y=0$ that are the coordinates of the luminance pixel LPX2 (2, 0) associated with the luminance value "0", associates the third area AR3 with the maximum luminance value "0" and the coordinates $x=2$ and $y=0$, and stores the associated values in the storage unit 50 as the area luminance value information 55.

In addition, the maximum luminance setting unit 13 acquires the luminance value "0" associated with the luminance pixel LPX2 (0, 1) in the luminance image LIM corresponding to the coordinates of the second pixel PX2 (0, 1) included in the fourth area AR4 as the maximum luminance value, and associates the maximum luminance value "0" with the fourth area AR4. In addition, the maximum luminance setting unit 13 acquires x=0 and γ=1 that are the coordinates of the luminance pixel LPX2 (0, 1) associated with the luminance value "0", associates the fourth area AR4 with the maximum luminance value "0" and the coordinates x=0 and γ=1, and stores the associated values in the storage unit 50 as the area luminance value information 55. In addition, the maximum luminance setting unit 13 acquires the luminance value "0,9" associated with the luminance pixel LPX2 (1, 1) in the luminance image LIM corresponding to the coordinates of the second pixel PX2 (1, 1) included in the fifth area AR5 as the maximum luminance value, and associates the maximum luminance value "0.9" with the fifth area AR5. In addition, the maximum luminance setting unit 13 acquires x=1 and γ=1 that are the coordinates of the luminance pixel LPX2 (1, 1) associated with the luminance value "0.9", associates the fifth area AR5 with the maximum luminance value "0.9" and the coordinates x=1 and γ=1, and stores the associated values in the storage unit 50 as the area luminance value information 55. In addition, the maximum luminance setting unit 13 acquires the luminance value "0" associated with the luminance pixel LPX2 (2, 1) in the luminance image LIM corresponding to the coordinates of the second pixel PX2 (2, 1) included in the sixth area AR6 as the maximum luminance value, and associates the maximum luminance value "0" with the sixth area AR6. In addition, the maximum luminance setting unit 13 acquires x=2 and γ=1 that are the coordinates of the luminance pixel LPX2 (2, 1) associated with the luminance value "0", associates the sixth area AR6 with the maximum luminance value "0" and the coordinates x=2 and γ=1, and stores the associated values in the storage unit 50 as the area luminance value information 55.

In addition, the maximum luminance setting unit 13 acquires the luminance value "0" associated with the luminance pixel LPX2 (0, 2) in the luminance image LIM corresponding to the coordinates of the second pixel PX2 (0, 2) included in the seventh area AR7 as the maximum luminance value, and associates the maximum luminance value "0" with the seventh area AR7. In addition, the maximum luminance setting unit 13 acquires x=0 and γ=2 that are the coordinates of the luminance pixel LPX2 (0, 2) associated with the luminance value "0", associates the seventh area AR7 with the maximum luminance value "0" and the coordinates x=0 and γ=2, and stores the associated values in the storage unit 50 as the area luminance value information 55. In addition, the maximum luminance setting unit 13 acquires the luminance value "0" associated with the luminance pixel LPX2 (1, 2) in the luminance image LIM corresponding to the coordinates of the second pixel PX2 (1, 2) included in the eighth area AR8 as the maximum luminance value, and associates the maximum luminance value "0" with the eighth area AR8. In addition, the maximum luminance setting unit 13 acquires x=1 and γ=2 that are the coordinates of the luminance pixel LPX2 (1, 2) associated with the luminance value "0", associates the eighth area AR8 with the maximum luminance value "0" and the coordinates x=1 and γ=2, and stores the associated values in the storage unit 50 as the area luminance value information 55. In addition, the maximum luminance setting unit 13 acquires the luminance value "0.5" associated with the luminance pixel LPX2 (2, 2) in the luminance image LIM corresponding to the coordinates of the second pixel PX2 (2, 2) included in the ninth area AR9 as the maximum luminance value, and associates the maximum luminance value "0.5" with the ninth area AR9. In addition, the maximum luminance setting unit 13 acquires x=2 and γ=2 that are the coordinates of the luminance pixel LPX2 (2, 2) associated with the luminance value "0.5", associates the ninth area AR9 with the maximum luminance value "0.5" and the coordinates x=2 and γ=2, and stores the associated values in the storage unit 50 as the area luminance value information 55.

Figures 52, 53:
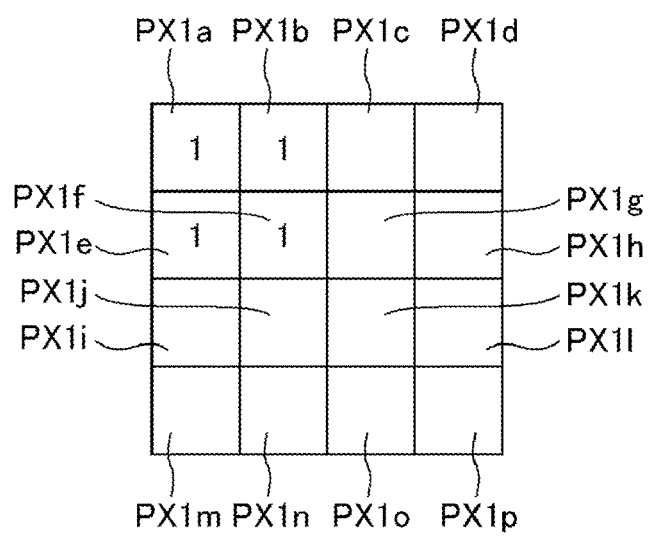
FIG. 52 is a diagram schematically illustrating area luminance value information according to the fourth embodiment.
FIG. 53 is a diagram illustrating a state in which a transmittance is set for first pixels of interest according to the fourth embodiment.

FIG. 52 is a diagram schematically illustrating the area luminance value information 55 according to the fourth embodiment. As illustrated in FIG. 52, the order setting unit 14 (see FIG. 7) refers to the area luminance value information 55 stored in the storage unit 50, and sets the order of the first area AR1 to the ninth area AR9 in descending order of maximum luminance values.

In the example shown in FIG. 52, the order of the first area AR1 associated with the highest maximum luminance value "1" is first in order, the order of the fifth area AR5 associated with the next highest maximum luminance value "0.9" is second in order, the order of the second area AR2 associated with the next highest maximum luminance value "0.6" is third in order, and the ninth area AR9 associated with the next highest maximum luminance value "0.5" is fourth in order.

FIG. 53 is a diagram illustrating a state in which a transmittance is set for first pixels of interest according to the fourth embodiment. The first transmittance setting unit 15 (FIG. 7) generates the transmittances of the plurality of first pixels PX1a to PX1p (FIG. 45) in the order set by the order setting unit 14 based on the maximum luminance values associated with the first area AR1 to the ninth area AR9, respectively.

As described in the first embodiment, the first transmittance setting unit 15 calculates the transmittance of a pixel of interest, which is a first pixel PX1 whose transmittance is to be determined, using the above-described (Expression 1), to be specific, the above-described (Expression 2).

Since the first transmittance setting unit 15 refers to the field first in order in the area luminance value information 55 (FIG. 52) stored in the storage unit 50, and the first in order is the first area AR1 and the coordinates x=0 and γ=0 are associated with the maximum luminance value "1", α=1 is substituted into the above-described (Expression 2) based on the maximum luminance value "1".

Then, the first transmittance setting unit 15 refers to the area transmittance coefficient information 54 (FIG. 49), acquires the transmittance coefficient "0.25" associated with the first area AR1, and substitutes γ=0.25 into the above (Expression 2).

In addition, since the first area AR1 (i.e., the second pixel PX2 (0, 0)) is an overlapping area OA overlapping the first pixel PX1a, the first pixel PX1b, the first pixel PX1e, and the first pixel PX1f among the first pixels PX1a to PX1p (FIG. 45), and no transmittance is set for any of the first pixel PX1a, the first pixel PX1b, the first pixel PX1e, and the first pixel PX1f, the first transmittance setting unit 15 determines that the four pixels being the first pixel PX1a, the first pixel PX1b, the first pixel PX1e, and the first pixel PX1f are pixels of interest and substitutes δ=4, determines that there is no first pixel PX1 that influences the first area AR1 with transmitted light together with the pixels of interest, and substitutes β=0. Therefore, Σβ=0 is satisfied.

The first transmittance setting unit 15 calculates the transmittances of the first pixel PX1a, the first pixel PX1b, the first pixel PX1e, and the first pixel PX1f, which are the pixels of interest, using the above-described Expression (2) as follows.

$$(1.0-(0) \times 0.25)/(0.25 \times 4) = 1.0$$

That is, for the first area AR1, the transmittances of all of the first pixel PX1a, the first pixel PX1b, the first pixel PX1e, and the first pixel PX1f, which are the pixels of interest overlapping the first area AR1, are not set, and thus the first transmittance setting unit 15 sets the maximum luminance value "1" as is as the transmittances of the first pixel PX1a, the first pixel PX1b, the first pixel PX1e, and the first pixel PX1f, which are the pixels of interest.

Figures 54, 55:
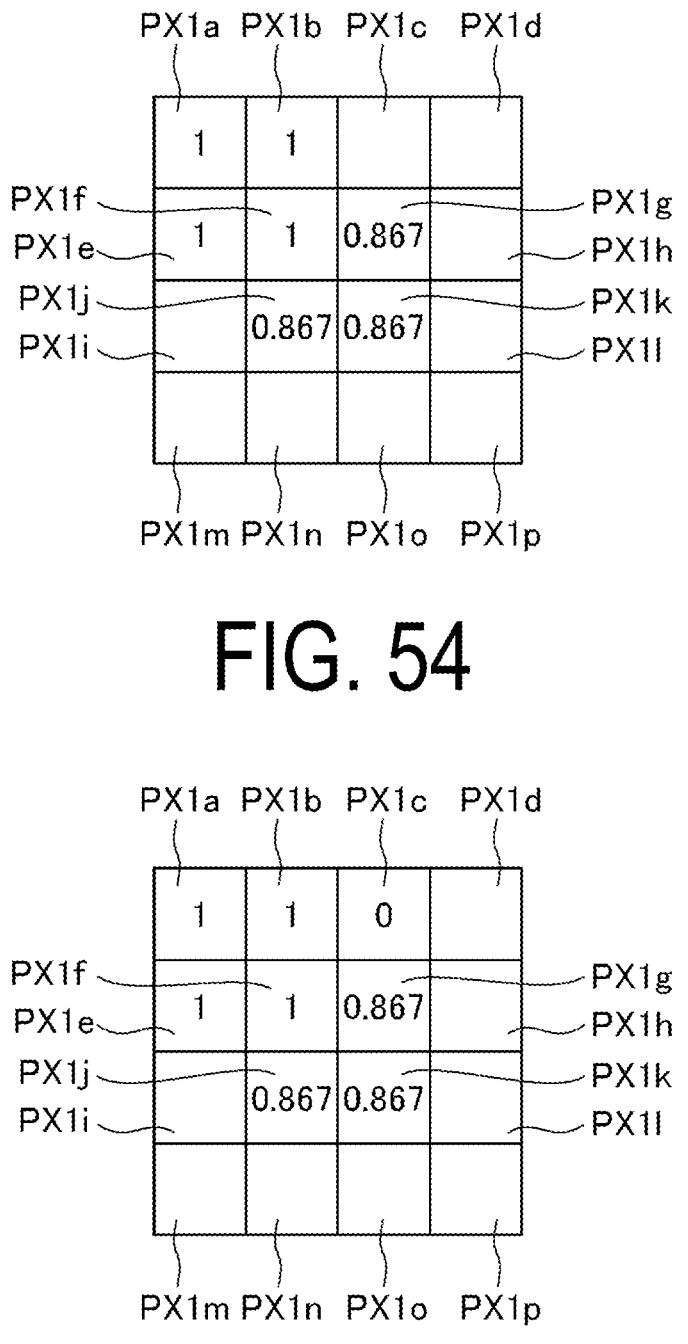

FIG. 54 is a diagram illustrating a state in which a transmittance is set for second pixels of interest according to the fourth embodiment. Since the first transmittance setting unit 15 refers to the field second in order in the area luminance value information 55 (FIG. 52) stored in the storage unit 50, and the second in order in the area luminance value information 55 is the fifth area AR5 and the coordinates x=1 and y=1 are associated with the maximum luminance value "0.9", at =0.9 is substituted into the above-described (Expression 2) based on the maximum luminance value "0.9".

Then, the first transmittance setting unit 15 refers to the area transmittance coefficient information 54 (FIG. 49), acquires the transmittance coefficient "0.25" associated with the fifth area AR5, and substitutes γ=0.25 into the above (Expression 2).

In addition, since the fifth area AR5 is the overlapping area OA overlapping all of the four first pixel PX1f, first pixel PX1g, first pixel PX1j, and first pixel PX1k, the fifth area AR5 is influenced by transmitted light from all of the four first pixels PX1f, PX1g, PX1j, and PX1k. Since the transmittance of the first pixel PX1f among the first pixel PX1f, the first pixel PX1g, the first pixel PX1j, and the first pixel PX1k has already been set as illustrated in FIG. 53, the first transmittance setting unit 15 determines the three first pixels PX1g, PX1j, and PX1k for which no transmittance has been set as pixels of interest and substitutes δ=3, and since the transmittance of the first pixel PX1f that influences the fifth area AR5 with transmitted light together with the first pixels PX1g, PX1j, and PX1k as pixels of interest is 1.0, substitutes β=1.0. Therefore, Σβ=1.0 is satisfied.

The first transmittance setting unit 15 calculates the transmittances of the first pixel PX1g, the first pixel PX1j, and the first pixel PX1k, which are the pixels of interest, using the above-described Expression (2) as follows.

$$(0.9-(1.0)\times 0.25)/(0.25\times 3) \approx 0.867$$

As described above, among the first pixel PX1f, the first pixel PX1g, the first pixel PX1j, and the first pixel PX1k (FIGS. 45 and 47) overlapping the fifth area AR5 that is the overlapping area OA, the first transmittance setting unit 15 sets, as the transmittances of the first pixel PX1g, the first pixel PX1j, and the first pixel PX1k that are the pixels of interest, an insufficient value of the transmittance of the first pixel PX1f for which the transmittance has already been set to influence the fifth area AR5 for the maximum luminance value "0.9" (FIG. 52) associated with the fifth area AR5.

Specifically, the first transmittance setting unit 15 multiplies the transmittance coefficient "0.25" (FIG. 49) indicating the proportion at which the first pixel PX1f influences the fifth area AR5 with transmitted light by the transmittance "1.0" (FIG. 53) of the first pixel PX1f for which the transmittance has already been set among the first pixel PX1f, the first pixel PX1g, the first pixel PX1j, and the first pixel PX1k (FIGS. 45 and 47) overlapping the fifth area AR5 which is the overlapping area OA, thereby obtaining the transmittance "0.25" ("1.0"×"0.25") at which the first pixel PX1f influences the fifth area AR5.

As a result, it can be seen that whereas the transmittance required for the fifth area AR5 is the maximum luminance value "0.9" (FIG. 53), the first pixel PX1f for which the transmittance has already been set influences the fifth area AR5 at the transmittance "0.25".

Thus, the first transmittance setting unit 15 divides the value "0.65", which is obtained by subtracting the transmittance "0.25" at which the first pixel PX1f influences the fifth area AR5 for transmittance from the maximum luminance value "0.9" which is the transmittance required for the fifth area AR5, by the value "0.75" (the transmittance coefficient "0.25"×the number of pixels of interest "3.0") indicating the proportion at which the three first pixels PX1g, PX1j, and PX1k as the pixels of interest influence the fifth area AR5 with transmitted light, thereby obtaining the "insufficient value" "0.867". The first transmittance setting unit 15 sets "0.867", which is the "insufficient value", as the transmittance of each of the first pixel PX1g, the first pixel PX1j, and the first pixel PX1k.

FIG. 55 is a diagram illustrating a state in which a transmittance is set for a third pixel of interest according to the fourth embodiment. Since the first transmittance setting unit 15 refers to the field third in order in the area luminance value information 55 (FIG. 52) stored in the storage unit 50, and the third in order in the area luminance value information 55 is the second area AR2, and the coordinates x=1 and y=0 are associated with the maximum luminance value "0.6", α=0.6 is substituted into the above-described (Expression 2) based on the maximum luminance value "0.6".

Then, the first transmittance setting unit 15 refers to the area transmittance coefficient information 54 (FIG. 49), acquires the transmittance coefficient "0.25" associated with the second area AR2, and substitutes γ=0.25 into the above (Expression 2).

In addition, since the second area AR2 is the overlapping area OA (FIGS. 45 and 47) overlapping all of the four first pixels PX1b, first pixel PX1c, first pixel PX1f, and first pixel PX1g, the second area AR2 is influenced with transmitted light from all of the four first pixels PX1b, PX1c, PX1f, and PX1g. Since the transmittances of the first pixel PX1b, the first pixel PX1f, and the first pixel PX1g among the first pixels PX1b, PX1c, PX1f, and PX1g have already been set as illustrated in FIG. 53, the first transmittance setting unit 15 determines the one first pixel PX1c for which no transmittance has been set as a pixel of interest and substitutes δ=1, and since the transmittances of the first pixel PX1b, the first pixel PX1f, and the first pixel PX1g that influence the second area AR2 with transmitted light together with the first pixel PX1c as the pixel of interest are "1.0", "1.0", and "0.867", substitutes Σβ=1.0+1.0+0.867=2.867.

The first transmittance setting unit 15 calculates the transmittance of the first pixel PX1c, which is the pixel of interest, from (Expression 2) as follows.

$$(0.6-(2.867)\times 0.25)/(0.25\times 1) = -0.467$$

Since the transmittance of the pixel of interest is a negative value (that is, a value equal to or less than 0), the first transmittance setting unit 15 determines that there is no insufficient transmittance and sets the transmittance of the first pixel PX1c, which is the pixel of interest, to "0".

As described above, among the first pixel PX1b, the first pixel PX1c, the first pixel PX1f, and the first pixel PX1g (FIGS. 45 and 47) overlapping the second area AR2 that is the overlapping area OA, the first transmittance setting unit 15 sets, as the transmittance of the first pixel PX1c that is the pixel of interest, an insufficient value of the transmittances of the first pixel PX1b, the first pixel PX1f, and the first pixel PX1g for which the transmittances have already been set to influence the second area AR2 for the maximum luminance value "0.6" (FIG. 52) associated with the second area AR2.

To be more specific, the first transmittance setting unit 15 multiplies the transmittance coefficient "0.25" (FIG. 49) indicating the proportion at which each of the first pixels PX1b, PX1f, and PX1g influences the second area AR2 with transmitted light by the transmittances "1.0", "1.0" and "0.867" (FIG. 54) of the first pixels PX1b, PX1f, and PX1g for which the transmittances have already been set among the first pixels PX1b, PX1c, PX1f, and PX1g (FIGS. 45 and 47) overlapping the second area AR2 which is the overlapping area OA, thereby obtaining the transmittance "11.468" (=("1.0"+"1.0"+"0.867")×"0.25") at which the first pixels PX1b, PX1f, and PX1g influence the second area AR2.

As a result, whereas the transmittance required for the second area AR2 is the maximum luminance value "0.6" (FIG. 52), the transmittance "11.468" at which the second area AR2 is influenced by the first pixels PX1b, PX1f, and PX1g for which the transmittances have already been set is higher, and thus the first transmittance setting unit 15 determines that there is no "insufficient value" for the transmittance required for the second area AR2, and sets "0" as the transmittance of the first pixel PX1c.

FIG. 56 is a diagram illustrating a state in which a transmittance is set for fourth pixels of interest according to the fourth embodiment. Since the first transmittance setting unit 15 refers to the field fourth in order in the area luminance value information 55 (FIG. 52) stored in the storage unit 50, and the fourth in order in the area luminance value information 55 is the ninth area AR9 and the coordinates x=2 and y=2 are associated with the maximum luminance value "0.5", α=0.5 is substituted into the above-described (Expression 2) based on the maximum luminance value "0.5".

Then, the first transmittance setting unit 15 refers to the area transmittance coefficient information 54 (FIG. 49), acquires the transmittance coefficient "0.25" associated with the ninth area AR9, and substitutes γ=0.25 into the above (Expression 2).

In addition, since the ninth area AR9 is the overlapping area OA (FIGS. 45 and 47) overlapping all of the four first pixels PX1k, first pixel PX1l, first pixel PX1o, and first pixel PX1p, the ninth area AR9 is influenced with transmitted light from all of the four first pixels PX1k, PX1l, PX1o, and PX1p. Since the transmittance of the first pixel PX1k among the first pixel PX1k, the first pixel PX1l, the first pixel PX1o, and the first pixel PX1p has already been set as illustrated in FIG. 55, the first transmittance setting unit 15 determines the three first pixels PX1l, PX1o, and PX1p for which no transmittance has been set as pixels of interest and substitutes δ=3, and since the transmittance of the first pixel PX1k that influences the ninth area AR9 with transmitted light together with the first pixels PX1l, PX1o, and PX1p as pixels of interest is "0.867", substitutes Σβ=0.867.

The first transmittance setting unit 15 calculates the transmittances of the first pixel PX1l, the first pixel PX1o, and the first pixel PX1p, which are the pixels of interest, using the above-described Expression (2) as follows.

(0.5−(0.867)×0.25)/(0.25×3)≈0.378

As described above, among the first pixel PX1k, the first pixel PX1l, the first pixel PX1o, and the first pixel PX1p (FIGS. 45 and 47) overlapping the ninth area AR9 that is the overlapping area OA, the first transmittance setting unit 15 sets, as the transmittances of the first pixel PX1l, the first pixel PX1o, and the first pixel PX1p that are the pixels of interest, an insufficient value of the transmittance of the first pixel PX1k for which the transmittance has already been set to influence the ninth area AR9 for the maximum luminance value "0.5" (FIG. 52) associated with the ninth area AR9.

Specifically, the first transmittance setting unit 15 multiplies the transmittance coefficient "0.25" (FIG. 49) indicating the proportion at which the first pixel PX1k influences the ninth area AR9 with transmitted light by the transmittance "0.867" (FIG. 55) of the first pixel PX1k for which the transmittance has already been set among the first pixel PX1k, the first pixel PX1l, the first pixel PX1o, and the first pixel PX1p (FIGS. 45 and 47) overlapping the ninth area AR9 which is the overlapping area OA, thereby obtaining the transmittance "0.21675" ("0.867"×"0.25") at which the first pixel PX1k influences the ninth area AR9.

As a result, it can be seen that the transmittance required for the ninth area AR9 is the maximum luminance value "0.5" (FIG. 52), whereas the first pixel PX1k for which the transmittance has already been set influences the ninth area AR9 at the transmittance "0.21675".

Thus, the first transmittance setting unit 15 divides the value "0.28325", which is obtained by subtracting the transmittance "0.21675" at which the first pixel PX1k influences the ninth area AR9 for transmittance from the maximum luminance value "0.5" which is the transmittance required for the ninth area AR9, by the value "0.75" (the transmittance coefficient "0.25"×the number of pixels of interest "3.0") indicating the proportion at which the three first pixels PX1l, PX1o, and PX1p as the pixels of interest influence the ninth area AR9 with transmitted light, thereby obtaining the "insufficient value" "0.378". The first transmittance setting unit 15 sets "0.378", which is the "insufficient value", as the transmittance of each of the first pixel PX1l, the first pixel PX1o, and the first pixel PX1p.

FIG. 57 is a diagram illustrating a state in which a transmittance is set for fifth and subsequent pixels of interest according to the fourth embodiment. In the area luminance value information 55 (FIG. 52), since the maximum luminance value of each of the fifth and subsequent areas in order is "0", the first transmittance setting unit 15 sets the transmittance "0" to each of the first pixel PX1d, the first pixel PX1h, the first pixel PX1j, the first pixel PX1m, and the first pixel PX1n for which no transmittance is set.

As described above, even if the first pixels PX1 and the second pixels PX2 have the same size, the first transmittance setting unit 15 can set transmittances to the first pixels PX1.

Fifth Embodiment

Figure 58:
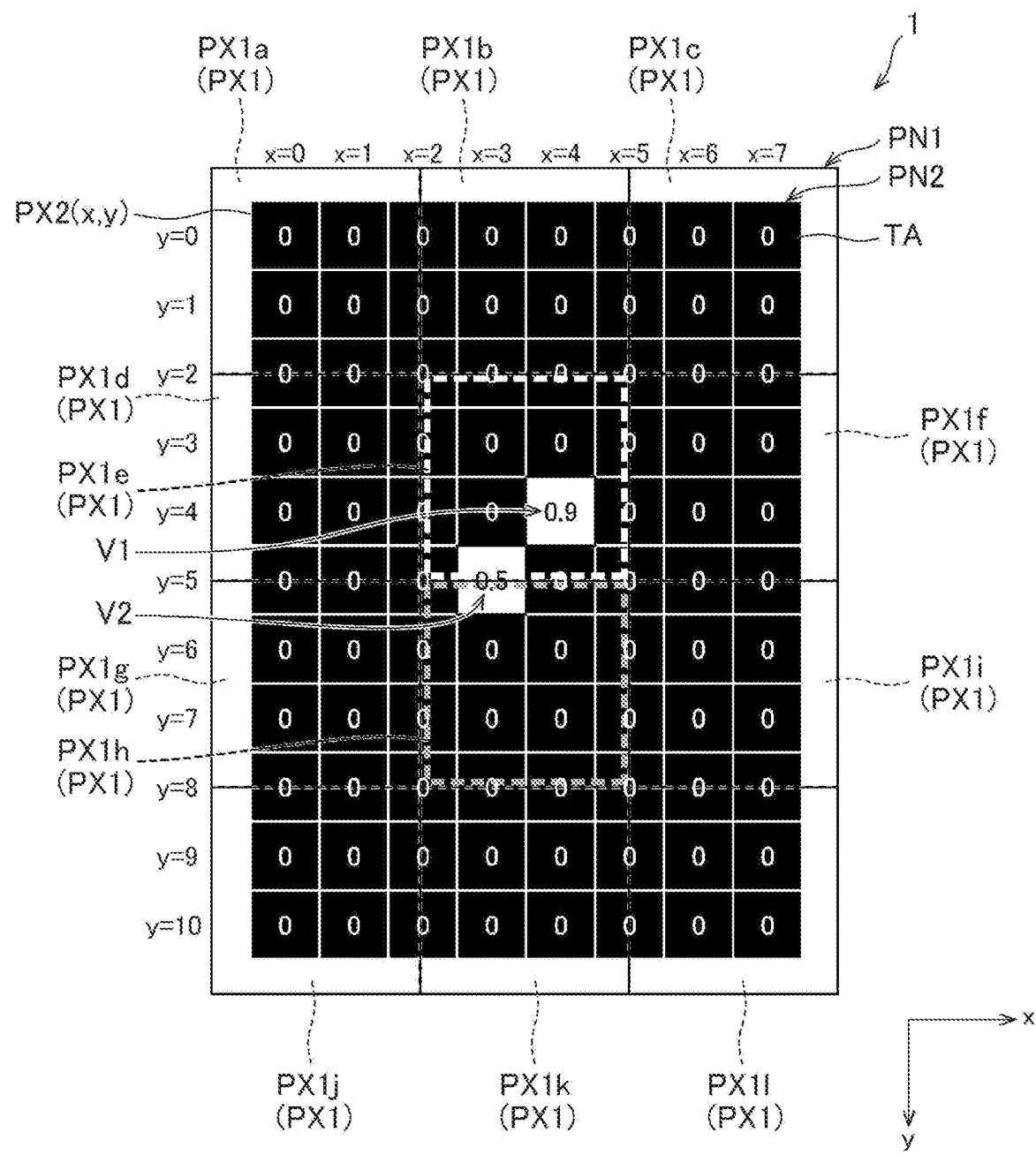
FIG. 58 is a diagram schematically illustrating an image display device in which a first liquid crystal panel overlaps a second liquid crystal panel according to a fifth embodiment.

FIG. 58 is a diagram schematically illustrating an image display device 1 in which a first liquid crystal panel PN1 overlaps a second liquid crystal panel PN2 according to a fifth embodiment. Further, the functional block diagram of the image display device 1 according to the fifth embodiment is the same as the functional block diagram illustrated in FIG. 7. In FIG. 58, each second pixel PX2 is illustrated to be associated with a luminance value at a luminance pixel LPX2 (x, y) at the corresponding coordinates in a luminance image LIM. As an example, the first liquid crystal panel PN1 is represented by a plurality of first pixels PX1 corresponding to 3×4 pixels, and the second liquid crystal panel PN2 is represented by a plurality of second pixels PX2 corresponding to 8×11 pixels. Further, in the fifth embodiment, a backlight BL will be described on the assumption that it integrally controls light emission over the entire surface, rather than controlling light emission by local dimming.

With respect to the plurality of first pixels PX1, the three first pixels PX1 arranged in the row direction (lateral direction) in the topmost row are sequentially referred to as a first pixel PX1a, a first pixel PX1b, and a first pixel PX1c in the positive-x direction. In addition, the three first pixels PX1 arranged in the row direction (lateral direction) in the second row, which is one row lower from the top row, are sequentially referred to as a first pixel PX1d, a first pixel PX1e, and a first pixel PX1f in the positive-x direction. In addition, the three first pixels PX1 arranged in the row direction (lateral direction) in the third row, which is two rows lower from the top row, are sequentially referred to as a first pixel PX1g, a first pixel PX1h, and a first pixel PX1i in the positive-x direction. In addition, the three first pixels PX1 arranged in the row direction (lateral direction) in the fourth row (bottom row),e which is three rows lower from the top row, are sequentially referred to as a first pixel PX1j, a first pixel PX1k, and a first pixel PX1l in the positive-x direction.

In order to simplify description, it is assumed that a study target area TA is an area in which 8×11 second pixels PX2 are arranged in a matrix shape. Further, the number of pixels included in the study target area TA is not limited to 8×11 pixels, and even more pixels may be included in the area.

In the image processing device 10, after passing through the processing of steps S11 and S12 depicted in FIG. 31, the luminance image generation unit 11 generates the luminance image LIM in step S13.

Here, among the plurality of first pixels PX1, for example, the first pixel PX1e is referred to as a first pixel of interest to be focused on, and the first pixel PX1 h adjacent to the first pixel PX1e is referred to as an adjacent first pixel.

In addition, among the plurality of second pixels PX2 (x, y), for example, the second pixel PX2 (4, 4) included in the non-overlapping area NOA (FIG. 59) overlapping only the first pixel PX1e, which is the first pixel of interest, is referred to as a second pixel of interest. In addition, among the plurality of second pixels PX2 (x, y), for example, the second pixel PX2 (3, 5) that is included in the overlapping area QA (FIG. 59) overlapping only the first pixel PX1e which is the first pixel of interest and the first pixel PX1h which is the adjacent first pixel, and that is adjacent to the second pixel PX2 (4, 4) which is the second pixel of interest, is referred to as an adjacent second pixel.

In addition, among the luminance values of the input image, the luminance value corresponding to the second pixel PX2 (4, 4) as the second pixel of interest is V1 (where V1>0), and the luminance value corresponding to the second pixel PX2 (3, 5) as the adjacent second pixel is V2 (where V2<V1). In addition, in the fifth embodiment, among the luminance values corresponding to the plurality of second pixels PX2, the luminance value corresponding to the second pixels PX2 (x, y) other than the second pixel PX2 (4, 4) as the second pixel of interest and the second pixel PX2 (3, 5) as the adjacent second pixel is assumed to be 0. For example, V1=0.9 and V2=0.5.

Next, after passing through the processing of step S14 depicted in FIG. 31, the image processing device 10 sets a maximum luminance value, which is the highest value among the luminance values of the corresponding areas in the luminance image LIM, in association with each of the plurality of areas in step S15.

Figures 59, 60:
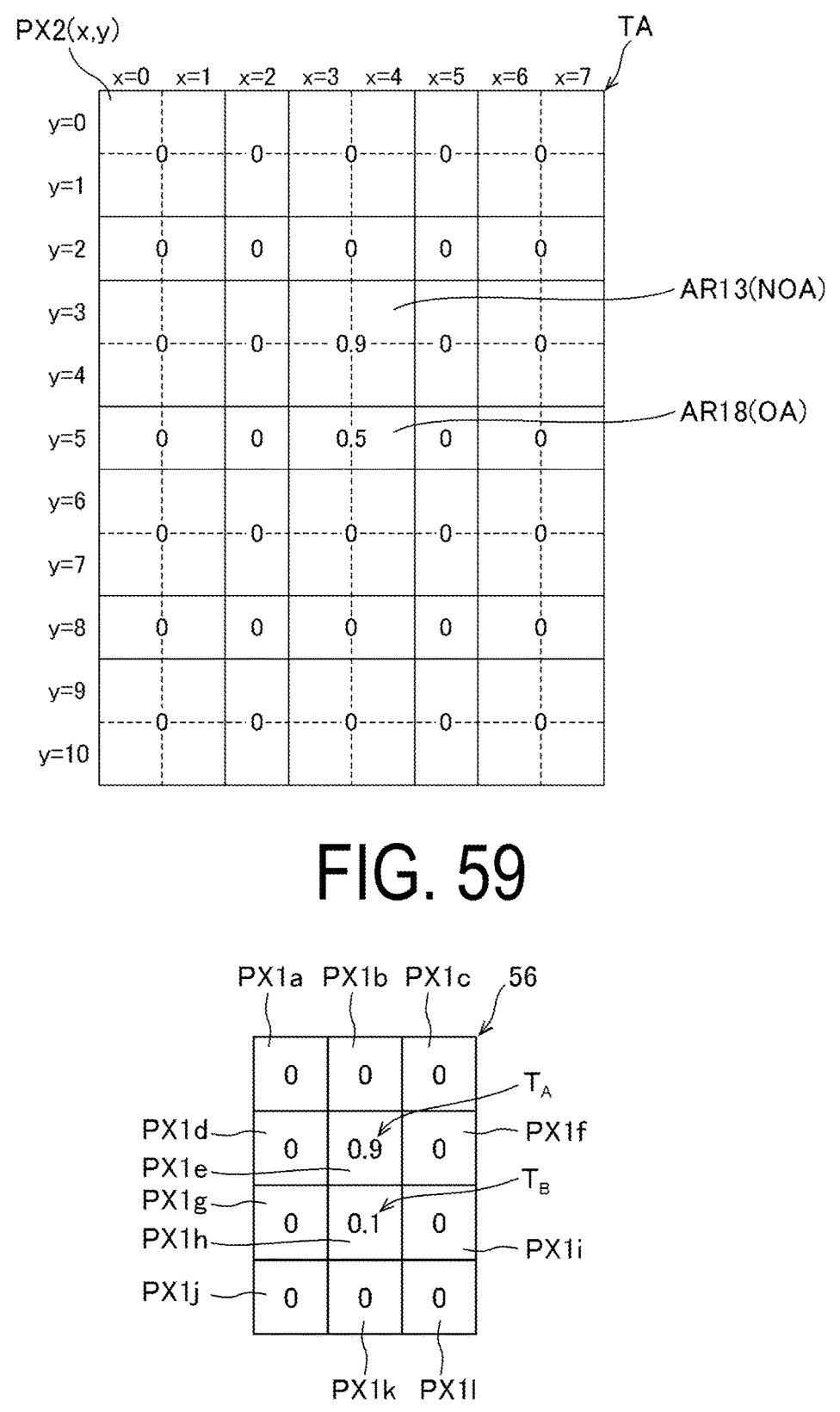

FIG. 59 is a diagram illustrating a study target area TA in which the luminance values are associated with each of the plurality of areas according to the fifth embodiment. As illustrated in FIG. 59, the maximum luminance setting unit 13 (FIG. 7) associates the luminance value "0.9" as a maximum luminance value with the thirteenth area AR13 constituted by the second pixel PX2 (3, 3), the second pixel PX2 (4, 3), the second pixel PX2 (3, 4), and the second pixel PX2 (4, 4) in the study target area TA. In addition, the maximum luminance setting unit 13 (FIG. 7) associates the luminance value "0.5" as the maximum luminance value with the eighteenth area AR18 constituted by the second pixel PX2 (3, 5) and the second pixel PX2 (4, 5) in the study target area TA. In addition, the maximum luminance setting unit 13 (FIG. 7) associates the luminance value "0" as the maximum luminance value with the areas other than the thirteenth area AR13 and the eighteenth area AR18 among the plurality of areas in the study target area TA.

Next, in the image processing device 10, after passing through the processing of step S16 depicted in FIG. 31, the first transmittance setting unit 15 (FIG. 7) sets the transmittance of each of the plurality of first pixels PX1 based on the maximum luminance value associated with the overlapping area in the order set by the order setting unit 14 (FIG. 7) in step S17.

FIG. 60 is a diagram illustrating a first liquid crystal panel display signal 56 according to the fifth embodiment. The first transmittance setting unit 15 (FIG. 7) sets a transmittance for each of the first pixels PX1a to PX1l as illustrated in FIG. 60. For example, among the first pixels PX1a to PX1l, the first transmittance setting unit 15 associates the transmittance "0.9" with the first pixel PX1e, associates the transmittance "0.1" with the first pixel PX1h, and associates the transmittance "0" with the pixels other than the first pixel PX1e and the first pixel PX1h.

Thereafter, the image processing device 10 performs the processing of steps S17 to S20 depicted in FIG. 31.

Here, the first transmittance setting unit 15 sets the transmittance of the first pixel PX1e first, among the first pixel PX1e and the first pixel PX1h overlapping the eighteenth area AR18 (FIG. 59) which is an overlapping area OA. Then, among the first pixel PX1e and the first pixel PX1h, a transmittance of the first pixel PX1h for which no transmittance has been set is set based on the transmittance coefficient indicating the proportion at which the first pixel PX1e and the first pixel PX1h influence the eighteenth area AR18, which is the overlapping area OA, with transmitted light.

In other words, when the first transmittance setting unit 15 sets the transmittance set for the first pixel PX1e as a first pixel of interest as $T_A$ and the transmittance set for the first pixel PX1h as an adjacent first pixel as $T_B$, the first transmittance setting unit 15 sets the transmittance of the first pixel PX1e as the first pixel of interest and the transmittance of the first pixel PX1h as an adjacent first pixel to satisfy $V2/V1>T_B/T_A$ in the fifth embodiment.

That is, for example, the first transmittance setting unit 15 sets the ratio between the transmittance ($T_A$=0.9) of the first pixel of interest having a higher transmittance and the transmittance ($T_B$=0.1) of the adjacent first pixel having a lower transmittance to be smaller than the ratio between the luminance value (V1=0.9) of the second pixel of interest having a higher luminance value and the luminance value (V2=0.5) of the adjacent second pixel having a lower luminance value.

Accordingly, it is possible to prevent the transmittance of the first pixel PX1h, which overlaps the eighteenth area AR18 that is an overlapping area OA and which emits light to the eighteenth area AR18, from being set higher than necessary. Therefore, the occurrence of black floating in the image display device 1 can be suppressed.

Sixth Embodiment

Although the example in which the edges of each of the adjacent first pixels PX1 of the first liquid crystal panel PN1 have an uneven shape has been described mainly with reference to FIGS. 2 and 46, the edges of each of the adjacent first pixels PX1 may have a linear shape.

Figure 61:
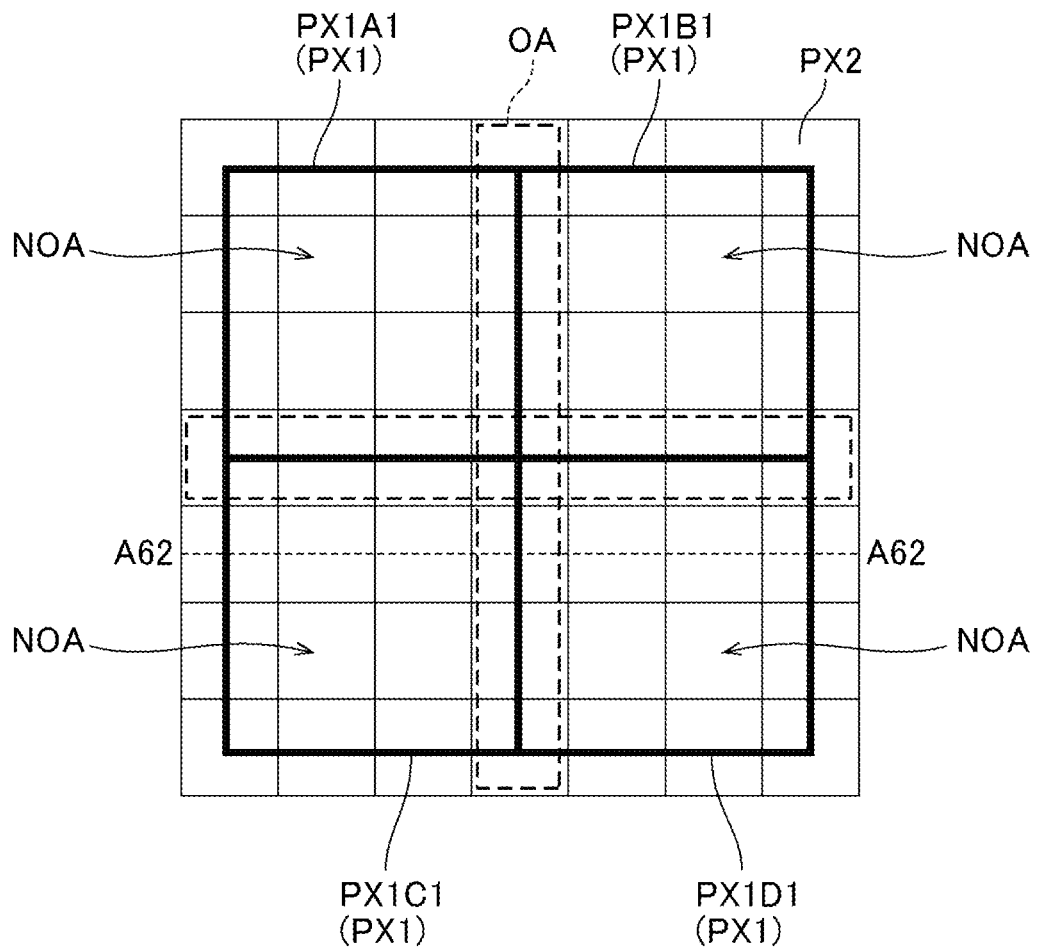
FIG. 61 is a diagram illustrating a state in which a first pixel of a first liquid crystal panel overlaps a second pixel of a second liquid crystal panel according to a sixth embodiment.

FIG. 61 is a diagram illustrating a state in which first pixels PX1 of a first liquid crystal panel PN1 overlap second pixels PX2 of a second liquid crystal panel PN2 according to a sixth embodiment.

A plurality of first pixels PX1 include a first pixel PX1A1, a first pixel PX1B1, a first pixel PX1C1, and a first pixel PX1D1. In the row direction (lateral direction), the first pixel PX1A1 and the first pixel PX1B1 are adjacent to each other, and the first pixel PX1C1 and the first pixel PX1D1 are adjacent to each other. In addition, in the column direction (longitudinal direction), the first pixel PX1A1 and the first pixel PX1C1 are adjacent to each other, and the first pixel PX1B1 and the first pixel PX1D1 are adjacent to each other.

For example, each of a plurality of second pixels PX2 of the second liquid crystal panel PN2 has a square shape. A plurality of second pixels PX2 overlapping the boundary between an edge of the first pixel PX1A1 and an edge of the first pixel PX1B1 that are adjacent to each other are arranged side by side in the column direction. A plurality of second pixels PX2 overlapping the boundary between an edge of the first pixel PX1C1 and an edge of the first pixel PX1D1 that are adjacent to each other are arranged side by side in the column direction. A plurality of second pixels PX2 overlapping the boundary between an edge of the first pixel PX1A1 and an edge of the first pixel PX1C1 that are adjacent to each other are arranged side by side in the row direction. A plurality of second pixels PX2 overlapping the boundary between an edge of the first pixel PX1B1 and an edge of the first pixel PX1D1 that are adjacent to each other are arranged side by side in the row direction.

Figure 62:
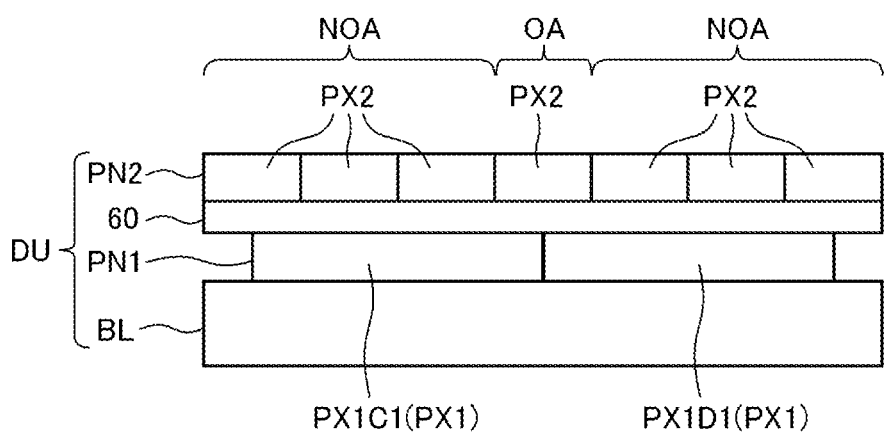
FIG. 62 is a diagram schematically illustrating a cross section along line A62-A62 illustrated in FIG. 61.

FIG. 62 is a diagram schematically illustrating a cross section along line A62-A62 illustrated in FIG. 61. As illustrated in FIG. 62, a display unit DU includes a light diffusion member 60 disposed between the first liquid crystal panel PN1 and the second liquid crystal panel PN2, in addition to a backlight BL, the first liquid crystal panel PN1, and the second liquid crystal panel PN2. The first liquid crystal panel PN1 directly faces the backlight BL. In addition, the second liquid crystal panel PN2 faces the first liquid crystal panel PN1 across the light diffusion member 60. An example of the light diffusion member 60 may include a light diffusion plate or a light diffusion sheet that diffuses light from the backlight BL.

As described above, by providing the light diffusion member 60 for diffusing light from the backlight BL between the first liquid crystal panel PN1 and the second liquid crystal panel PN2, changes in luminance at the boundary portion between the edges of the adjacent first pixels PX1 are averaged and thus appear to change smoothly even if there is a large difference in luminance between adjacent first pixels PX1, as compared to a configuration in which the light diffusion member 60 is not provided, and thus, the boundary portion between the edges of the adjacent first pixels PX1 becomes less visible in the overlapping area OA. As a result, it is possible to curb deterioration in the display quality of a display image caused by a difference in luminance between the adjacent first pixels PX1. In addition, since the edges of each of the first pixels PX1 have a linear shape, it is easier to manufacture the first liquid crystal panel PN1 and possible to curb a decrease in yield, compared to the case in which the edges of each of the first pixels PX1 have an uneven shape.

Further, the shape and the number of each of the plurality of first pixels PX1 and the plurality of second pixels PX2 illustrated in FIG. 61 are examples, and the shape and the number of each of the plurality of first pixels PX1 and the plurality of second pixels PX2 may be different from those of the example illustrated in FIG. 61. In addition, although one pixel of the first liquid crystal panel PN1 is described as being larger than one pixel of the second liquid crystal panel PN2 as an example in the present embodiment, no such limitation is intended, and one pixel of the first liquid crystal panel PN1 and one pixel of the second liquid crystal panel PN2 may have the same size.

Further, the numbers, shapes, sizes, and the like of the first pixels PX1 and the second pixels PX2 described in the embodiments are merely examples, and are not limited to those in the examples described above.

Although one first pixel PX1 is described as having a size of 3×3 second pixels PX2 in the first embodiment (FIG. 8) and one first pixel PX1 is described as having a size of 1×1 second pixel PX2 in the fourth embodiment (FIG. 45) as an example, the sizes of a first pixel PX1 and a second pixel PX2 are not limited thereto, and one first pixel PX1 may have a size other than the sizes described in the embodiments, such as a size of 2×4 second pixels PX2 or a size of 5×3 second pixels PX2.

In addition, each of the first pixels PX1 and the second pixels PX2 may be a quadrilateral such as a square or a rectangle, or may have another shape.

In addition, although a first pixel PX1 is disposed being shifted by a half pixel from a second pixel PX2 in the first embodiment (FIG. 8) and the fourth embodiment (FIG. 45), a relative positional relationship between a first pixel PX1 and a second pixel PX2 is not limited thereto, and for example, a relative positional relationship in which a first pixel PX1 is disposed without being shifted from a second pixel PX2 may be adopted.

In addition, although the overlapping area OA is described as having a width equivalent to one second pixel PX2 in the first embodiment (FIG. 8) as an example, no such limitation is intended, and the overlapping area OA may have a width greater than one second pixel PX2, such as a width equivalent to two or three second pixels PX2.

The disclosure is not limited to the embodiments described above, and may be substituted with a configuration that is substantially the same as the configuration described in the embodiments described above, a configuration that achieves the same action and effect, or a configuration capable of achieving the same object.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An image processing device comprising:
a memory in which an image processing program is stored in advance or to which the image processing program is supplied via a communication network; and
a processor executing the image processing program, wherein
the memory stores area classification information that is information obtained by classifying a display area for an image on a second liquid crystal panel into a plurality of areas including an overlapping area overlapping a plurality of first pixels for one pixel of a plurality of second pixels, the second liquid crystal panel being disposed facing a first liquid crystal panel directly or across an optical member, the first liquid crystal panel including the plurality of first pixels and facing a backlight, and the processor generates a luminance image representing a luminance value corresponding to each of the plurality of second pixels of the second liquid crystal panel based on an input image, sets a maximum luminance value that is the highest value among luminance values included in a corresponding area of the luminance image in association with each of the plurality of areas, sets an order of each of the plurality of areas in a descending order of the maximum luminance values, sets a transmittance of a pixel of interest based on one of the maximum luminance values associated with the overlapping area overlapping the pixel of interest in the order set for the overlapping area overlapping the pixel of interest among the plurality of areas when a first pixel, for which the transmittance is to be set among the plurality of first pixels of the first liquid crystal panel, is set as the pixel of interest, and sets the transmittance of the pixel of interest among the plurality of first pixels overlapping the overlapping area based on a transmittance coefficient indicating a prescribed value divided by a number of the plurality of first pixels overlapping the overlapping area.

2. The image processing device according to claim 1, wherein among the plurality of first pixels overlapping the overlapping area, the processor sets, as the transmittance of the pixel of interest, an insufficient value of one or more transmittances of one or more first pixels for which the transmittance has been set to influence the overlapping area for the one of the maximum luminance values associated with the overlapping area.

3. The image processing device according to claim 2, wherein the processor obtains the one or more transmittances at which the one or more first pixels influence the overlapping area by multiplying the one or more transmittances set for the one or more first pixels by the transmittance coefficient, and obtains the insufficient value by dividing a value obtained by subtracting the one or more transmittances at which the one or more first pixels influence the overlapping area from the one of the maximum luminance values associated with the overlapping area by a value obtained by multiplying the transmittance coefficient by a number of pixels of interest.

4. The image processing device according to claim 1, wherein processing by the processor is performed by dividing the display area into partial blocks.

5. The image processing device according to claim 4, wherein the processor does not update the transmittances of the plurality of first pixels included in a calculation overlapping area and sets the transmittances of other plurality of first pixels among the plurality of first pixels included in a first partial block set to include the calculation overlapping area including the plurality of first pixels for which the transmittances included in a second partial block different from the first partial block have been set.

6. The image processing device according to claim 1, wherein the backlight is capable of controlling luminance for each of a plurality of light-emitting regions, and the processor generates backlight data for controlling the luminance of each of the plurality of light-emitting regions based on the input image, generates a luminance distribution based on the backlight data, the luminance distribution being a distribution of light emitted from the plurality of light-emitting regions, corrects the luminance image based on the generated luminance distribution, and sets a maximum luminance value in association with each of a plurality of areas of the corrected luminance image, the maximum luminance value being the highest value among luminance values of a corresponding area of the corrected luminance image.

7. The image processing device according to claim 1, wherein an edge of each of adjacent pixels of the first liquid crystal panel has an uneven shape.

8. An image display device comprising:
the image processing device according to claim 1;
the backlight;
the first liquid crystal panel; and
the second liquid crystal panel.

9. The image display device according to claim 8, further comprising:
a light diffusion member disposed between the first liquid crystal panel and the second liquid crystal panel.

10. An image processing device comprising:
a memory in which an image processing program is stored in advance or to which the image processing program is supplied via a communication network; and
a processor executing the image processing program, wherein
the memory stores area classification information that is information obtained by classifying a display area for an image on a second liquid crystal panel into a plurality of areas including an overlapping area overlapping a plurality of first pixels for one pixel of a plurality of second pixels and a non-overlapping area overlapping only one first pixel for the one pixel, the second liquid crystal panel being disposed facing a first liquid crystal panel directly or across an optical member, the first liquid crystal panel including a plurality of first pixels and facing a backlight; and the processor sets a maximum luminance value that is the highest value among luminance values included in a corresponding area of an input image in association with each of the plurality of areas; and sets a transmittance of a pixel of interest based on one of the maximum luminance values associated with the overlapping area overlapping the pixel of interest among the plurality of areas when a first pixel, for which the transmittance is to be set among the plurality of first pixels of the first liquid crystal panel, is set as the pixel of interest, wherein, when:

among the plurality of first pixels, a first pixel to be focused on is set as a first pixel of interest and a first pixel adjacent to the first pixel of interest is set as an adjacent first pixel, among the plurality of second pixels, a second pixel included in the non-overlapping area overlapping only the first pixel of interest is set as a second pixel of interest and a second pixel included in the overlapping area overlapping only the first pixel of interest and the adjacent first pixel and adjacent to the second pixel of interest is set as an adjacent second pixel, and among luminance values of the input image, a luminance value corresponding to the second pixel of interest is set to V1 (wherein V1>0), a luminance value corresponding to the adjacent second pixel is set to V2 (wherein V2<V1), and a luminance value corresponding to the plurality of second pixels other than the second pixel of interest and the adjacent second pixel is set to 0, the processor
sets a transmittance of the first pixel of interest as $T_A$ and a transmittance of the adjacent first pixel as $T_B$, and the transmittance setting unit-sets the transmittance of the first pixel of interest and the transmittance of the adjacent first pixel to satisfy $V2/V1 > T_B/T_A$.

11. An image processing method comprising:
generating a luminance image representing a luminance value corresponding to each of a plurality of second pixels of a second liquid crystal panel based on an input image, the second liquid crystal panel being disposed facing a first liquid crystal panel directly or across an optical member, the first liquid crystal panel including a plurality of first pixels and facing a backlight;

setting a maximum luminance value that is the highest value among luminance values included in a corresponding area of the luminance image in association with each of a plurality of areas classified based on area classification information that is information obtained by classifying a display area for an image on the second liquid crystal panel into the plurality of areas including an overlapping area overlapping the plurality of first pixels of the first liquid crystal panel for one pixel of the plurality of second pixels;

setting an order of each of the plurality of areas in descending order of the maximum luminance values;

setting, when a first pixel, for which a transmittance is to be set among the plurality of first pixels of the first liquid crystal panel, is set as a pixel of interest, the transmittance of the pixel of interest based on one of the maximum luminance values associated with the overlapping area overlapping the pixel of interest in the order set for the overlapping area overlapping the pixel of interest among the plurality of areas; and setting the transmittance of the pixel of interest among the plurality of first pixels overlapping the overlapping area based on a transmittance coefficient indicating a prescribed value divided by a number of the plurality of first pixels overlapping the overlapping area.

* * * * *